United States Patent
Krishnamurthi

(10) Patent No.: US 12,472,810 B2
(45) Date of Patent: Nov. 18, 2025

(54) THERMAL MANAGEMENT SYSTEM FOR AT LEAST ONE MODULE OF AN ELECTRICALLY POWERED VEHICLE

(71) Applicant: Girish Mandakolathur Krishnamurthi, Bengaluru (IN)

(72) Inventor: Girish Mandakolathur Krishnamurthi, Bengaluru (IN)

(*) Notice: Subject to any disclaimer, the term of this patent is extended or adjusted under 35 U.S.C. 154(b) by 221 days.

(21) Appl. No.: 18/237,927

(22) Filed: Aug. 25, 2023

(65) Prior Publication Data

US 2025/0065708 A1    Feb. 27, 2025

(51) Int. Cl.
*B60H 1/00* (2006.01)
*B60K 11/02* (2006.01)
*B60L 58/26* (2019.01)

(52) U.S. Cl.
CPC .......... *B60K 11/02* (2013.01); *B60H 1/00278* (2013.01); *B60H 1/00392* (2013.01); *B60H 1/00914* (2013.01); *B60L 58/26* (2019.02); *B60H 2001/00307* (2013.01); *B60L 2210/44* (2013.01); *B60L 2240/545* (2013.01)

(58) Field of Classification Search
CPC ................ B60H 11/02; B60H 1/00278; B60H 1/00392; B60H 1/00904; B60H 2001/00307; B60L 58/26; B60L 2210/44; B60L 2240/545
See application file for complete search history.

(56) References Cited

U.S. PATENT DOCUMENTS

| | | | |
|---|---|---|---|
| 6,023,935 A | * | 2/2000 | Okazaki ............. F25B 39/04 62/472 |
| 8,184,436 B2 | | 5/2012 | Campbell et al. |
| 8,345,423 B2 | | 1/2013 | Campbell et al. |
| 8,369,091 B2 | | 2/2013 | Campbell et al. |
| 8,619,425 B2 | | 12/2013 | Campbell et al. |
| 8,713,957 B2 | | 5/2014 | Campbell et al. |
| 8,947,873 B2 | | 2/2015 | Campbell et al. |
| 8,964,390 B2 | | 2/2015 | Campbell et al. |
| 9,282,678 B2 | | 3/2016 | Campbell et al. |
| 10,015,905 B2 | | 7/2018 | Watanabe et al. |

(Continued)

FOREIGN PATENT DOCUMENTS

| | | |
|---|---|---|
| ES | 2880481 T3 | 11/2021 |
| ES | 2943656 T3 | 6/2023 |

(Continued)

*Primary Examiner* — Marc E Norman

(57) ABSTRACT

A thermal management system for at least one module of an electrically powered vehicle is disclosed. The thermal management system comprises a cooling chamber defined in the at least one module and receives a refrigerant therein for directly cooling at least one inner wall of the cooling chamber. A compressor is in flow communication with an outlet of the cooling chamber and compresses the refrigerant received from the cooling chamber. A condenser is in flow communication with an outlet of the compressor and discharges heat from the refrigerant received therein. An expansion valve is in flow communication with an outlet of the condenser at its inlet and in flow communication with an inlet of the cooling chamber at its outlet. The expansion valve controls a flow of refrigerant from the condenser to the cooling chamber to directly cool at least one inner wall of the cooling chamber is also disclosed.

35 Claims, 7 Drawing Sheets

(56) References Cited

U.S. PATENT DOCUMENTS

| | | | |
|---|---|---|---|
| 10,080,308 B2 | 9/2018 | Hirai et al. | |
| 10,653,043 B2 | 5/2020 | Enright et al. | |
| 2007/0221371 A1* | 9/2007 | Ichikawa | B60H 1/00914 |
| | | | 165/204 |
| 2019/0186843 A1* | 6/2019 | Takeuchi | H01M 10/63 |
| 2019/0198954 A1* | 6/2019 | Miura | H01M 10/613 |
| 2019/0357385 A1 | 11/2019 | Miyazaki | |
| 2020/0112073 A1* | 4/2020 | He | H01M 50/204 |

FOREIGN PATENT DOCUMENTS

| | | |
|---|---|---|
| JP | 4903295 B2 | 3/2012 |
| JP | 6278053 B2 | 2/2018 |
| JP | 6720752 B2 | 7/2020 |
| KR | 102288462 B1 | 8/2021 |

\* cited by examiner

THERMAL MANAGEMENT SYSTEM FOR AT LEAST ONE MODULE OF AN ELECTRICALLY POWERED VEHICLE

FIELD OF THE INVENTION

This invention relates generally to a thermal management system for at least one module of an electrically powered vehicle, and more particularly to the thermal management system for regulating a temperature of at least one machine and/or device of the electrically powered vehicle by direct refrigerant heating/cooling methodology.

BACKGROUND OF THE INVENTION

In a current mechanical design of an electrically powered vehicle such as but not limited to an electrically powered automobile that is commonly referred to as an EV, liquid coolant such as G48 coolant from a radiator is allowed to flow to a thermal management system for the electrically powered vehicle. The liquid coolant from the radiator that flows to the thermal management system for the electrically powered vehicle is channeled through a plurality of modules including but not limited to an electronic control unit (ECU), an electric battery containing a plurality of cells, a power conversion system that includes an onboard charger and a DC converter, an inverter for converting DC current to AC current, an electrically powered motor, and a heat exchanger for cooling oil at high temperature that is supplied from a gearbox (transmission) and a differential of the electrically powered vehicle. A transfer of heat from each of the plurality of modules of the electrically powered vehicle that are at high temperature to liquid coolant at low temperature cools each of the plurality of modules of the electrically powered vehicle to a lower operating temperature that is within its acceptable operating temperature limits. The liquid coolant that flows through each of the plurality of modules of the electrically powered vehicle is at high temperature when it emerges from the last module of the plurality of modules of the electrically powered vehicle. This liquid coolant at high temperature from the last module is channeled to the radiator of the electrically powered vehicle and stored therein. The liquid coolant that is channeled from the last module of the plurality of modules of the electrically powered vehicle at high temperature to the radiator is cooled in the radiator by means of high-speed cooling air that is directed towards the radiator by means of a cooling fan. Once excess heat from the liquid coolant is dissipated in the radiator due to transfer of heat from the high temperature liquid coolant to the high-speed cooling air that is directed towards the radiator by means of the cooling fan, the liquid coolant at low temperature from the radiator of the electrically powered vehicle is therein channeled to an electric coolant pump. The liquid coolant that is channeled from the radiator to the electric coolant pump at low temperature is circulated by means of the electric coolant pump through a plurality of cooling chambers that are defined in the plurality of modules for cooling at least one mechanical component that is positioned within each of the plurality of cooling chambers defined in each of the plurality of modules of the electrically powered vehicle respectively. An electronic control unit regulates a speed of the electric coolant pump. More specifically, the speed of the electric coolant pump is regulated by the electronic control unit based on a speed of an electrically powered motor of the electrically powered vehicle. Therefore, an operating speed of the electric coolant pump is directly proportional to an operating speed of the electrically powered motor of the electrically powered vehicle and is controlled by the electronic control unit accordingly.

However, as the liquid coolant is in a liquid state and has a high specific heat absorption capacity/unit mass of the liquid coolant, absorption rate of heat from the at least one mechanical component that is positioned within each of the plurality of cooling chambers defined in each of the plurality of modules of the electrically powered vehicle is low/unit mass of liquid coolant that flows through each of the plurality of cooling chambers that are defined in each of the plurality of modules of the electrically powered vehicle. Moreover, as the liquid coolant in the liquid state from the electric coolant pump is channeled through the plurality of cooling chambers that are defined in each of the plurality of modules of the electrically powered vehicle and channeled back to the electric coolant pump via the radiator, a number of iterations in which a unit mass of liquid coolant is required to be circulated through the plurality of cooling chambers that are defined in each of the plurality of modules of the electrically powered vehicle until each at least one mechanical component that is positioned within each of the plurality of modules of the electrically powered vehicle is cooled by a required temperature differential is high. Therefore, energy expended by the electric coolant pump to circulate the liquid coolant through the thermal management system for at least one module of the electrically powered vehicle multiple times iteratively until each of the at least one mechanical component that is positioned within each of the plurality of modules of the electrically powered vehicle is cooled by the required temperature differential is correspondingly high. In addition, as the liquid coolant is in the liquid state, energy expended by the electric coolant pump to circulate the liquid coolant from the radiator through each of the plurality of cooling chambers and that surrounds each of the at least one mechanical component that is positioned within each of the plurality of modules of the electrically powered vehicle and back to the electric coolant pump via the radiator is high. This is because a force exerted by the electric coolant pump to cause liquid coolant to flow from the radiator through each of the plurality of cooling chambers and that surrounds each of the at least one mechanical component that is positioned within each of the plurality of modules of the electrically powered vehicle and back to the electric coolant pump via the radiator is high due to a high viscosity and a corresponding high inertia of the liquid coolant. A solution is hereby proposed in this manuscript to circulate a refrigerant through each of the plurality of cooling/heating chambers that surround each of the at least one mechanical component that is positioned within each of the plurality of modules of the electrically powered vehicle and submerged and in direct contact with the refrigerant to cool/heat each of the at least one mechanical component that is positioned within each of the plurality of modules of the electrically powered vehicle by the required temperature differential in accordance with each module requirements. Thereby, an overall increase in an operating efficiency of each module of the thermal management system of the electrically powered vehicle is achieved. In addition, the thermal management system for at least one module of the electrically powered vehicle may be deployed in a cooling mode and/or in a heating mode for cooling and/or heating the required each of the at least one mechanical component that is positioned within each of the plurality of modules of the electrically powered vehicle in accordance with the requirements of each module of the electrically powered vehicle. Moreover, as the refrigerant is in a gaseous state after absorbing heat from the required each of the at least one mechanical component that is positioned within each of the plurality of modules of the electrically powered vehicle, energy required to circulate gaseous refrigerant through the thermal management system for at least one module of the electrically powered vehicle is much lower than energy required to circulate liquid coolant through the thermal management system for at least one module of the electrically powered vehicle. In addition, the specific heat absorption capacity/unit mass of the refrigerant is much lower than the specific heat absorption capacity/unit mass of the liquid coolant. Therefore, a heat absorption rate of the refrigerant is much higher than a heat absorption rate of liquid coolant. Consequently, an efficiency of heat absorption by the refrigerant that is channeled through the thermal management system for at least one module of the electrically powered vehicle is higher than the efficiency of heat absorption by the liquid coolant that is channeled through the thermal management system for at least one module of the electrically powered vehicle. In an exemplary example, the liquid coolant may be but is not limited to Inorganic Additive Technology, Organic Acid Technology, and Hybrid Organic Acid Technology. In recent times, liquid glycol such as G48 is a preferred choice of liquid coolant for cooling each module of the plurality of modules of the electrically powered vehicle.

A traditional thermal management system for at least one module of the electrically powered vehicle comprises each of the plurality of modules of the electrically powered vehicle that contains a cooling chamber that includes an inlet port and an outlet port. The inlet port of the cooling chamber defined in a first module of the plurality of modules is in flow communication with an outlet port of the radiator and receives liquid coolant at low temperature that is discharged from the radiator. The liquid coolant at low temperature that is channeled to the inlet port of the cooling chamber defined in the first module flows through the cooling chamber that surrounds at least one mechanical component that is present in the first module of the electrically powered vehicle. More specifically, the cooling chamber that surrounds the at least one mechanical component that is positioned within the first module of the electrically powered vehicle is in flow communication with the inlet port of the cooling chamber that is defined in the first module of the electrically powered vehicle at its first end. In addition, the cooling chamber that surrounds the at least one mechanical component that is positioned within the first module of the electrically powered vehicle is in flow communication with the outlet port of the cooling chamber that is defined in the first module of the electrically powered vehicle at its opposite second end. The liquid coolant at low temperature that is channeled from the outlet port of the radiator is channeled through the cooling chamber that is defined in the first module of the electrically powered vehicle via the inlet port that is defined in the first module of the electrically powered vehicle. After absorbing heat from the at least one mechanical component that is positioned within the cooling chamber of the first module of the electrically powered vehicle while flowing through the cooling chamber that is defined in the first module of the electrically powered vehicle, liquid coolant at high temperature is channeled through the outlet port that is defined in the first module of the electrically powered vehicle. Consequently, a temperature of the at least one mechanical component that is positioned within the cooling chamber that is defined in the first module of the electrically powered vehicle is decreased by pre-determined temperature differences for various operating speeds of the electrically powered motor of the electrically powered vehicle. However, a mass flow rate of liquid coolant that is required to be channeled through the cooling chamber that is defined in each module of the electrically powered vehicle to achieve the required temperature decrease in each at least one mechanical component that is positioned within each module of the electrically powered vehicle is high due to the low heat absorption rate and high specific heat absorption capacity/unit mass of the liquid coolant. Moreover, due to the high mass flow rate of liquid coolant that flows through the cooling chamber and also because the coolant is in the liquid state with a corresponding high viscosity and high inertia, energy expended by the electric coolant pump that is received from the electric battery to circulate the liquid coolant through each cooling chamber that is defined in each module of the electrically powered vehicle in order to achieve the required temperature decrease in each of the at least one mechanical component that is positioned within each module of the electrically powered vehicle is high. Owing to the low heat absorption rate, the high heat absorption capacity, the high mass flow rate, the high viscosity, and the high inertia of the liquid coolant, a thermal efficiency of the thermal management system for at least one module of the electrically powered vehicle is low. Consequently, there exists a need for an improved thermal management system for each of the plurality of modules of the electrically powered vehicle that would enable a low mass flow rate, a low viscosity, and a low inertia of refrigerant in contrast to the same parameters of the liquid coolant to be channeled through each cooling chamber that is defined in each of the plurality of modules of the electrically powered vehicle in order to achieve the required temperature reduction in each of the at least one mechanical component that is positioned within each cooling chamber that is defined in each of the plurality of modules of the electrically powered vehicle due to the lower specific heat absorption capacity and higher heat absorption rate/unit mass of the refrigerant in contrast to that of the liquid coolant. Due to the change in the phase of the refrigerant from the liquid phase to the gaseous phase as refrigerant flows through each cooling chamber that is defined in each of the plurality of modules of the electrically powered vehicle with a corresponding higher heat absorption rate, lower specific heat absorption capacity, lower viscosity, lower inertia, and lower mass flow rate, energy expended by a compressor to compress and circulate gaseous refrigerant through each cooling chamber that is defined in each of the plurality of modules of the electrically powered vehicle in order to achieve the required temperature reduction in each of the at least one mechanical component that is positioned within each cooling chamber that is defined in each of the plurality of modules of the electrically powered vehicle is lower than that of the electric coolant pump.

The need has existed for many years, yet there is no fully satisfactory system to meet the need. In accordance with a long-recognized need, there has been developed a thermal management system for at least one module of an electrically powered vehicle that would enable refrigerant to be channeled through each cooling/heating chamber that is defined in each of the plurality of modules of the electrically powered vehicle, wherein the electrically powered vehicle may be but is not limited to an electrically powered automobile. The refrigerant that is channeled through each cooling chamber that is defined in each of the plurality of modules of the electrically powered vehicle changes its phase from the liquid phase to the gaseous phase as refrigerant flows from the inlet port that is in flow communication with the cooling chamber that is defined in the first module of the plurality of modules to the outlet port that is in flow communication with the cooling chamber that is defined in the last module of the plurality of modules of the electrically powered vehicle. The refrigerant that is channeled through each cooling chamber that is defined in each of the plurality of modules of the electrically powered vehicle is designed to increase a thermal and operating efficiency of each module of the thermal management system for at least one module of the electrically powered vehicle. More specifically, as the specific heat absorption capacity/unit mass of the refrigerant is lower in contrast to the specific heat absorption capacity/unit mass of the liquid coolant that is higher, the mass flow rate of the refrigerant that is required to be channeled through each cooling chamber that is defined in each of the plurality of modules of the electrically powered vehicle can be substantially decreased in contrast to a high mass flow rate of the liquid coolant that is required to be channeled through each cooling chamber that is defined in each of the plurality of modules of the electrically powered vehicle in order to achieve a substantially same temperature reduction in each of the at least one mechanical component that is positioned within each cooling chamber that is defined in each of the plurality of modules of the electrically powered vehicle. In addition, the heat absorption rate of refrigerant is much higher than the heat absorption rate of liquid coolant. Moreover, as the refrigerant changes from the liquid state to the gaseous state as refrigerant flows from the inlet port that is in flow communication with the cooling chamber that is defined in the first module of the plurality of modules to the outlet port that is in flow communication with the cooling chamber that is defined in the last module of the plurality of modules of the electrically powered vehicle, energy required to circulate the gaseous refrigerant through the thermal management system for at least one module of the electrically powered vehicle by means of the compressor may be substantially decreased in contrast to energy required to circulate the liquid coolant through the thermal management system for at least one module of the electrically powered vehicle by means of the electric coolant pump.

BRIEF DESCRIPTION OF THE INVENTION

In one aspect of the invention, a thermal management system for at least one module of an electrically powered vehicle is described. The thermal management system comprises a cooling chamber defined in the at least one module of the electrically powered vehicle and receives a refrigerant therein. The refrigerant substantially fills the cooling chamber and is in direct contact with at least one inner wall of the cooling chamber. The refrigerant that is received within the cooling chamber and that substantially fills the cooling chamber and in direct contact with at least one inner wall of the cooling chamber flows through the cooling chamber that is defined in the at least one module of the electrically powered vehicle to directly cool the at least one inner wall of the cooling chamber that is defined in the at least one module of the electrically powered vehicle. A compressor is in flow communication with an outlet of the cooling chamber defined in the at least one module of the electrically powered vehicle at its inlet. The compressor receives the refrigerant that flows through the outlet of the cooling chamber that is defined in the at least one module of the electrically powered vehicle. The compressor compresses the refrigerant that is received in the compressor. A condenser is in flow communication with an outlet of the compressor at its inlet and receives the refrigerant that flows through the outlet of the compressor. The condenser discharges heat from the refrigerant that is received in the condenser. An expansion valve is in flow communication with an outlet of the condenser at its inlet and receives the refrigerant that flows through the outlet of the condenser. The expansion valve is in flow communication with an inlet of the cooling chamber defined in the at least one module of the electrically powered vehicle at its outlet. The expansion valve controls a flow of refrigerant that flows through the outlet of the condenser to the inlet of the cooling chamber that is defined in the at least one module of the electrically powered vehicle to directly cool the at least one inner wall of the cooling chamber that is defined in the at least one module of the electrically powered vehicle.

In another aspect of the invention, a thermal management system for at least one module of an electrically powered vehicle is described. The thermal management system comprises a temperature regulating chamber defined in the at least one module of the electrically powered vehicle and receives a refrigerant therein, wherein the refrigerant substantially fills the temperature regulating chamber and is in direct contact with at least one inner wall of the temperature regulating chamber. The refrigerant that is received within the temperature regulating chamber and that substantially fills the temperature regulating chamber and in direct contact with at least one inner wall of the temperature regulating chamber flows through the temperature regulating chamber that is defined in the at least one module of the electrically powered vehicle to directly regulate a temperature of the at least one inner wall of the temperature regulating chamber that is defined in the at least one module of the electrically powered vehicle. A compressor is in flow communication with an outlet of the temperature regulating chamber defined in the at least one module of the electrically powered vehicle at its inlet. The compressor receives the refrigerant that flows through the outlet of the temperature regulating chamber that is defined in the at least one module of the electrically powered vehicle. The compressor compresses the refrigerant that is received in the compressor. An expansion valve is in flow communication with an outlet of the compressor at its inlet and receives the refrigerant that flows through the outlet of the compressor. The expansion valve is in flow communication with an inlet of the temperature regulating chamber defined in the at least one module of the electrically powered vehicle at its outlet. The expansion valve controls a flow of refrigerant that flows through the outlet of the compressor to the inlet of the temperature regulating chamber that is defined in the at least one module of the electrically powered vehicle to directly regulate the temperature of the at least one inner wall of the temperature regulating chamber that is defined in the at least one module of the electrically powered vehicle.

In yet another aspect of the invention, a thermal management system for at least one module of an electrically powered vehicle is described. The thermal management system comprises a heating chamber defined in the at least one module of the electrically powered vehicle and receives a refrigerant therein, the refrigerant substantially fills the heating chamber and is in direct contact with at least one inner wall of the heating chamber. The refrigerant that is received within the heating chamber and that substantially fills the heating chamber and in direct contact with at least one inner wall of the heating chamber flows through the heating chamber that is defined in the at least one module of the electrically powered vehicle to directly heat the at least one inner wall of the heating chamber that is defined in the at least one module of the electrically powered vehicle. A compressor is in flow communication with an outlet of the heating chamber defined in the at least one module of the electrically powered vehicle at its inlet. The compressor receives the refrigerant that flows through the outlet of the heating chamber that is defined in the at least one module of the electrically powered vehicle. The compressor compresses the refrigerant that is received in the compressor. An expansion valve is in flow communication with an outlet of the compressor at its inlet and receives the refrigerant that flows through the outlet of the compressor. The expansion valve is in flow communication with an inlet of the heating chamber defined in the at least one module of the electrically powered vehicle at its outlet. The expansion valve controls a flow of refrigerant that flows through the outlet of the compressor to the inlet of the heating chamber that is defined in the at least one module of the electrically powered vehicle to directly heat the at least one inner wall of the heating chamber that is defined in the at least one module of the electrically powered vehicle.

In a further aspect of the invention, a module of an electrically powered vehicle is described. The module comprises a housing, and a temperature regulating chamber defined in the housing of the module of the electrically powered vehicle and receives a refrigerant therein. The refrigerant that is received within the temperature regulating chamber flows through the temperature regulating chamber that is defined in the housing of the module of the electrically powered vehicle to directly regulate a temperature of at least one inner wall of the temperature regulating chamber that is defined in the housing of the module of the electrically powered vehicle.

DETAILED DESCRIPTION OF THE INVENTION

Figure 1:
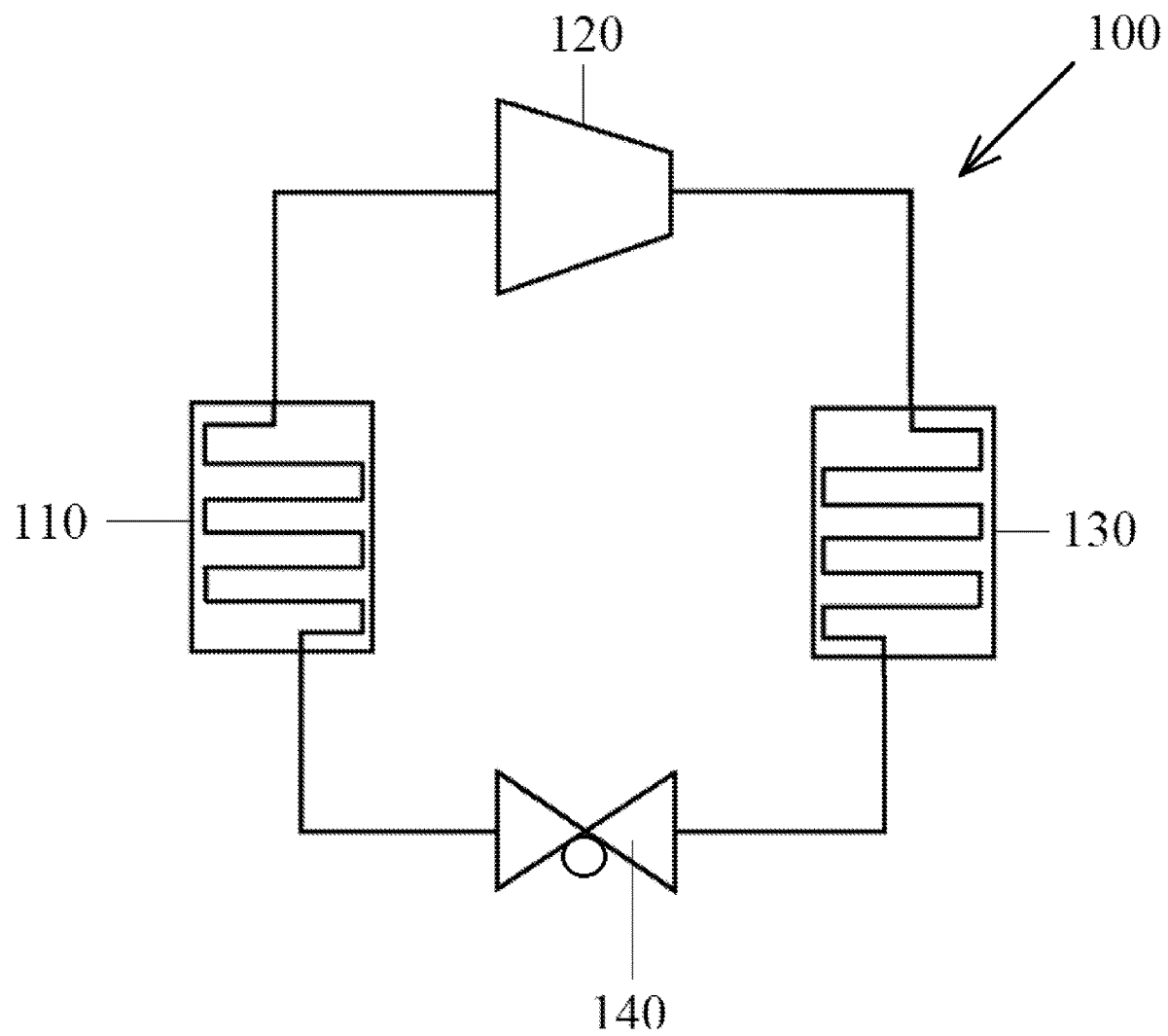
FIG. 1 is a schematic representation of a thermal management system for at least one module of an electrically powered vehicle in one embodiment of the invention.

FIG. 1 is a schematic representation of a thermal management system 100 for at least one module 110 of an electrically powered vehicle in one embodiment of the invention. The thermal management system 100 for at least one module 110 of the electrically powered vehicle comprises a temperature regulating chamber that is defined in the at least one module 110 that receives a liquid refrigerant from an expansion valve 140 via an inlet port of the temperature regulating chamber, wherein the refrigerant that is received in the temperature regulating chamber flows through the temperature regulating chamber that is defined in the at least one module 110 and past the at least one module 110 of the electrically powered vehicle for regulating a temperature of the at least one module 110 of the electrically powered vehicle. The refrigerant from the temperature regulating chamber that is defined in the at least one module 110 of the electrically powered vehicle flows to a compressor 120 via an outlet port of the temperature regulating chamber that is defined in the at least one module 110.

More specifically, the temperature regulating chamber that is defined in the at least one module 110 of the electrically powered vehicle receives refrigerant that is in a liquid state via the inlet port of the temperature regulating chamber. When the refrigerant flows past the at least one module 110 of the electrically powered vehicle for regulating the temperature of the at least one module 110 of the electrically powered vehicle, heat is absorbed by at least one mechanical component from the refrigerant thereby heating the at least one mechanical component or dissipated by the at least one mechanical component to the refrigerant thereby cooling the at least one mechanical component. The refrigerant is channeled from the temperature regulating chamber to the compressor 120 via the outlet port that is defined in the temperature regulating chamber. In an exemplary embodiment, the at least one module 110 of the electrically powered vehicle may be any module of the electrically powered vehicle known in the art whose temperature is required to be regulated by the refrigerant. More specifically, the at least one module 110 of the electrically powered vehicle may be any module known in the art that requires to be thermally regulated as a consequence of heating up or cooling down due to the heating up or cooling down of the at least one mechanical component that is positioned within and in mechanical contact with at least one inner wall of the temperature regulating chamber defined in the at least one module 110 of the electrically powered vehicle beyond its normal operating temperature limits respectively. In an exemplary embodiment, the at least one module 110 of the electrically powered vehicle may be at least one module 110 that is deployed in two wheeler automobiles and higher load carrying capacity automobiles such as but not limited to electrically powered cars, electrically powered trucks, electrically powered buses, electrically powered trains, electrically powered ships, and electrically powered aircrafts. In an exemplary embodiment, the acceptable operating temperature range of the at least one module 110 of the electrically powered vehicle may be between 20° centigrade and 40° centigrade.

Once the refrigerant regulates the temperature of the at least one module 110 of the electrically powered vehicle, the refrigerant from the temperature regulating chamber defined in the at least one module 110 is channeled to the compressor 120 for compressing the refrigerant that flows from the outlet port of the temperature regulating chamber that is defined in the at least one module 110 of the electrically powered vehicle. In an exemplary embodiment, the compressor 120 for compressing the refrigerant that flows from the outlet port of the temperature regulating chamber that is defined in the at least one module 110 of the electrically powered vehicle may be a single stage compressor for compressing the refrigerant that is received in the compressor 120 from the temperature regulating chamber that is defined in the at least one module 110 of the electrically powered vehicle. In an alternate exemplary embodiment, the compressor 120 for compressing the refrigerant that flows from the outlet port of the temperature regulating chamber that is defined in the at least one module 110 of the electrically powered vehicle may be a multi-stage compressor comprising two or more compressor stages for compressing the refrigerant that is received in the compressor 120 from the temperature regulating chamber that is defined in the at least one module 110 of the electrically powered vehicle to the required delivery pressure. Once refrigerant is compressed in the compressor 120 to the required delivery pressure, the compressed refrigerant is channeled to a condenser 130 for discharging heat from the compressed refrigerant. Therein, the refrigerant at a lower temperature than refrigerant at an inlet port of the condenser 130 is channeled to the expansion valve 140 for throttling the refrigerant, and thereby regulating a flow of refrigerant to the at least one module 110 of the electrically powered vehicle. The refrigerant from the expansion valve 140 is channeled back to the at least one module 110 of the electrically powered vehicle and recirculated through the thermal management system 100 for regulating the temperature of at least one module 110 of the electrically powered vehicle.

Figure 2:
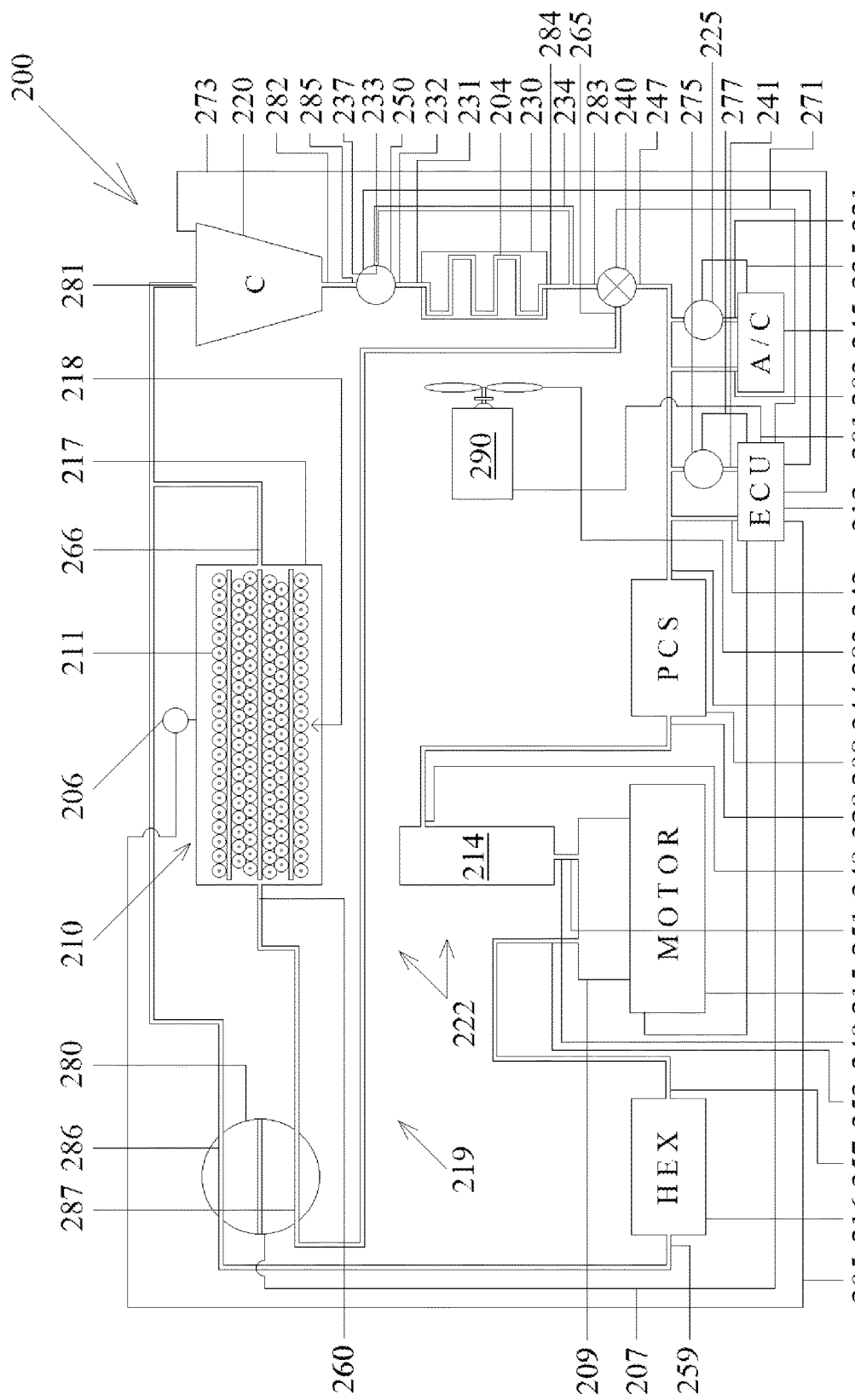
FIG. 2 is a schematic representation of the thermal management system for cooling at least one module of the electrically powered vehicle that is in flow communication with a compressor, a condenser, and an expansion valve in one embodiment of the invention.

FIG. 2 is a schematic representation of a thermal management system 200 for decreasing a temperature of at least one module 222 of the electrically powered vehicle comprising a cooling chamber 210 defined in at least one module 222 of the electrically powered vehicle that is in flow communication with the compressor 220, the condenser 230, and the expansion valve 240 in one embodiment of the invention. In an exemplary embodiment, the thermal management system 200 comprises the cooling chamber 210 that is defined in the at least one module 222 of the electrically powered vehicle and receives a refrigerant therein. In an exemplary embodiment, the refrigerant that is deployed in the thermal management system 200 for the at least one module 222 of the electrically powered vehicle may be one of Formaldehyde, R-11, R-12, R-13, R-22, R-32, R-113, R-114, R-115, R-123, R-134A, R-152A, R-290, R-407C, R-410A, R-438A, R-454B, R-502, R-600A, R-717, R-744, and R-1234yf. In an alternate exemplary embodiment, the refrigerant that is deployed in the thermal management system 200 for the at least one module 222 of the electrically powered vehicle therein may be any refrigerant known in the art that cools the at least one module 222 of the electrically powered vehicle which gets heated due to a flow of electric current through at least one mechanical component 218 that is positioned within the at least one module 222 of the electrically powered vehicle. The at least one mechanical component 218 that is positioned within the at least one module 222 of the electrically powered vehicle may be temporarily or permanently positioned and secured within the at least one module 222 of the electrically powered vehicle.

More specifically, the cooling chamber 210 that is defined in the at least one module 222 of the electrically powered vehicle comprises the cooling chamber 210 that encompasses a maximum possible surface area of the at least one module 222 to facilitate absorbing a maximum amount of heat from the at least one module 222 of the electrically powered vehicle that houses the at least one mechanical component 218 therein. Therefore, the cooling chamber 210 covers the maximum possible surface area of the at least one module 222 to facilitate absorbing the maximum amount of heat from the at least one module 222 of the electrically powered vehicle by means of the refrigerant, thereby cooling the entire surface area of the at least one module 222 of the electrically powered vehicle effectively. In an alternate exemplary embodiment, the cooling chamber 210 covers only a user defined surface area of the at least one module 222 to facilitate absorbing the maximum amount of heat from the user defined surface area of the at least one module 222 of the electrically powered vehicle. In an exemplary embodiment, the cooling chamber 210 may extend either along a longitudinal axis of the at least one module 222 of the electrically powered vehicle or perpendicular to the longitudinal axis of the at least one module 222 of the electrically powered vehicle, or both along the longitudinal axis of the at least one module 222 of the electrically powered vehicle and perpendicular to the longitudinal axis of the at least one module 222 of the electrically powered vehicle such as in a transverse direction so as to encompass the maximum possible surface area of the at least one module 222 of the electrically powered vehicle. Therefore, the refrigerant may absorb the maximum amount of heat from the entire surface area of the at least one module 222 of the electrically powered vehicle. In a further exemplary embodiment, a cooling chamber (not shown) branches out from the cooling chamber 210 that is defined in the at least one module 222 and is directed to a specific portion of the at least one module 222 of the electrically powered vehicle where there exists concentrated high temperature zones in the at least one module 222 and that requires to be locally cooled. In an exemplary embodiment, the cooling chamber that branches out from the cooling chamber 210 that is defined in the at least one module 222 may be integrally formed in the at least one module 222 of the electrically powered vehicle such that the cooling chamber that branches out from the cooling chamber 210 that is defined in the at least one module 222 constitutes a unitary assembly with the at least one module 222 of the electrically powered vehicle. In addition, the cooling chamber 210 may be integrally formed in the at least one module 222 of the electrically powered vehicle. In an alternate exemplary embodiment, the cooling chamber 210 may be an independent cooling chamber 210 that may be modularly secured within a cavity defined in the at least one module 222 of the electrically powered vehicle.

In the exemplary embodiment, the refrigerant that is received within the cooling chamber 210 is received in a substantially liquid state. Once the refrigerant is received within the cooling chamber 210 in the substantially liquid state, the refrigerant is allowed to flow through the cooling chamber 210 that is defined in the at least one module 222 of the electrically powered vehicle to facilitate cooling the at least one module 222 of the electrically powered vehicle. More specifically, the refrigerant is allowed to flow through the cooling chamber 210 that is defined in the at least one module 222 to facilitate cooling the at least one module 222 of the electrically powered vehicle. Therefore, the refrigerant that flows through the cooling chamber 210 absorbs heat from the at least one module 222 of the electrically powered vehicle. The absorption of heat by the refrigerant from the at least one module 222 of the electrically powered vehicle cools the at least one module 222 of the electrically powered vehicle from a higher operating temperature to a lower operating temperature respectively that is within the acceptable operating temperature limits of the at least one module 222. The decrease in the temperature of the at least one module 222 of the electrically powered vehicle to a temperature that is within its acceptable operating temperature limits increases an operating efficiency and useful life of the at least one module 222 of the electrically powered vehicle.

In an exemplary embodiment, the compressor 220 is in flow communication with an outlet port of the cooling chamber 210 defined in the at least one module 222 of the electrically powered vehicle and receives gaseous refrigerant that flows from the outlet port of the cooling chamber 210. More specifically, the refrigerant that is received in the compressor 220 from the cooling chamber 210 that is defined in the at least one module 222 is in the gaseous state and is received via an inlet port 281 of the compressor 220. Once the refrigerant is received in the compressor 220 in the substantially gaseous state, the gaseous refrigerant is compressed in the compressor 220 from a pressure that is equal to the pressure of the refrigerant at the outlet port of the cooling chamber 210 that is defined in the at least one module 222 to a higher pressure that is required for the refrigerant to be circulated through the thermal management system 200. More specifically, the compressor 220 may be an electric compressor driven by electric power that is supplied from an electric battery 217 to increase the pressure of refrigerant from the low pressure at the outlet port of the cooling chamber 210 that is defined in the at least one module 222 to the higher pressure. In an exemplary embodiment, the compressor 220 may be any compressor 220 known in the art that increases the pressure of refrigerant from the low pressure at the outlet port of the cooling chamber 210 that is defined in the at least one module 222 to the higher pressure. Therefore, as the refrigerant is received in the compressor 220, the pressure of the refrigerant is increased in the compressor 220 from the low pressure to the higher pressure with a corresponding large increase in temperature of the refrigerant. More specifically, owing to the large increase in the pressure of the gaseous refrigerant in the compressor 220, the temperature of the gaseous refrigerant is substantially increased to a high temperature correspondingly. In an exemplary embodiment, a bypass valve 250 is in flow communication with an outlet port 282 of the compressor 220.

In an exemplary embodiment, the bypass valve 250 is in flow communication with the outlet port 282 of the compressor 220 at its inlet port 285 and receives gaseous refrigerant that flows from the outlet port 282 of the compressor 220. More specifically, the refrigerant that is received in the bypass valve 250 via its inlet port 285 is received from the compressor 220 in a substantially gaseous state. Once the refrigerant is received in the bypass valve 250 in the substantially gaseous state, the bypass valve 250 channels the gaseous refrigerant to one of an inlet port 231 of the condenser 230 via a first outlet port 232 of the bypass valve 250 and to an inlet port 233 of a bypass flow path 234 via a second outlet port 237 of the bypass valve 250. Therefore, at the first outlet port 232 of the bypass valve 250 and at the second outlet port 237 of the bypass valve 250, gaseous refrigerant at high pressure and at high temperature is channeled to the next stage of the thermal management system 200 for at least one module 222 of the electrically powered vehicle. In an exemplary embodiment, the condenser 230 is in flow communication with the first outlet port 232 of the bypass valve 250. In an alternate exemplary embodiment, the expansion valve 240 is in flow communication with the second outlet port 237 of the bypass valve 250.

In an exemplary embodiment, the condenser 230 is in flow communication with the first outlet port 232 of the bypass valve 250 at its inlet port 231 and receives refrigerant that flows from the first outlet port 232 of the bypass valve 250. More specifically, the refrigerant that is received in the condenser 230 via its inlet port 231 is received from the first outlet port 232 of the bypass valve 250 in a substantially gaseous state at high temperature and at high pressure. Once the refrigerant is received in the condenser 230 in the substantially gaseous state, heat that is present within the gaseous refrigerant that was absorbed from the at least one module 222 of the electrically powered vehicle while the refrigerant was flowing through the cooling chamber 210 that is defined within the at least one module 222 of the electrically powered vehicle as well as while the refrigerant was compressed in the compressor 220 is substantially discharged in the condenser 230. The heat from the gaseous refrigerant is substantially discharged in the condenser 230, thereby decreasing the temperature of the gaseous refrigerant that is channeled from the outlet port 282 of the compressor 220 substantially to a lower temperature that is required for the refrigerant to be circulated through the thermal management system 200 for at least one module 222 of the electrically powered vehicle. More specifically, the condenser 230 may be a mechanical heat exchanger for discharging heat from the gaseous refrigerant that is channeled through the condenser 230. More specifically, the condenser 230 may be one of a liquid cooled and an air cooled condenser 230 that decreases the temperature of the gaseous refrigerant that flows from the outlet port 282 of the compressor 220 to a substantially lower temperature that is required for the refrigerant to be circulated through the thermal management system 200 for the at least one module 222 of the electrically powered vehicle. In an alternate exemplary embodiment, the condenser 230 may be any condenser 230 known in the art that facilitates decreasing the higher temperature of the gaseous refrigerant that is received in the condenser 230 via its inlet port 231 to the substantially lower temperature that is required for the gaseous refrigerant to be circulated through the thermal management system 200 for the at least one module 222 of the electrically powered vehicle. As the temperature of the gaseous refrigerant decreases from the higher temperature at the outlet port 282 of the compressor 220 to the lower temperature that is required for the refrigerant to be circulated through the thermal management system 200 for the at least one module 222 of the electrically powered vehicle, the pressure of the gaseous refrigerant that flows through the condenser 230 remains largely unaffected. More specifically, while the temperature of the gaseous refrigerant decreases as the gaseous refrigerant flows through the condenser 230 due to heat dissipation in the condenser 230, the pressure of the gaseous refrigerant remains steady or decreases to a slightly lower pressure from the higher pressure gaseous refrigerant that is channeled from the outlet port 282 of the compressor 220 to the condenser 230 via the inlet port 231 of the condenser 230. Therefore, at an outlet port 284 of the condenser 230, gaseous refrigerant at high pressure and at low temperature is channeled to the next stage of the thermal management system 200 for the at least one module 222 of the electrically powered vehicle. In an exemplary embodiment, the expansion valve 240 is in flow communication with the outlet port 284 of the condenser 230.

In an exemplary embodiment, the expansion valve 240 is in flow communication with the outlet port 284 of the condenser 230 at its inlet port 283 and receives cooled refrigerant that flows through the outlet port 284 of the condenser 230. More specifically, the refrigerant that is received at the inlet port 283 of the expansion valve 240 is received from the outlet port 284 of the condenser 230 in a substantially gaseous state. Once the refrigerant is received at the inlet port 283 of the expansion valve 240 in the substantially gaseous state, the expansion valve 240 throttles the gaseous refrigerant, thereby decreasing the pressure of the gaseous refrigerant from the high pressure at the outlet port 284 of the condenser 230 to a lower pressure, and correspondingly decreasing the temperature of the gaseous refrigerant from the higher temperature at the outlet port 284 of the condenser 230 to a lower temperature. More specifically, the decrease in the pressure of gaseous refrigerant from the higher pressure at the outlet port 284 of the condenser 230 to the lower pressure due to the throttling action of the expansion valve 240 causes a substantial reduction in the temperature of refrigerant from the higher temperature at the outlet port 284 of the condenser 230 to the lower temperature as refrigerant flows through the expansion valve 240. A first outlet port 247 of the expansion valve 240 is in flow communication with an inlet port of the cooling chamber 210 defined in the at least one module 222 of the electrically powered vehicle. The expansion valve 240 throttles the flow of refrigerant that flows through the outlet port 284 of the condenser 230 to the inlet port of the cooling chamber 210 that is defined in the at least one module 222 of the electrically powered vehicle. More specifically, an electronic control unit 212 is in electronic communication with the expansion valve 240 via a control flow path 271. The electronic control unit 212 controls an opening percentage/opening of the expansion valve 240 via the control flow path 271 to regulate a required mass flow rate of the gaseous refrigerant from the outlet port 284 of the condenser 230 to the inlet port of the cooling chamber 210 that is defined in the at least one module 222 of the electrically powered vehicle for the refrigerant to be circulated through the thermal management system 200 for the at least one module 222 of the electrically powered vehicle. In addition, the electronic control unit 212 is in electronic communication with a pressure regulator of the compressor 220 via a control flow path 273. More specifically, the electronic control unit 212 controls an outlet valve (not shown) provided in the pressure regulator of the compressor 220 to facilitate regulating a required mass flow rate of the refrigerant at a required pressure that is to flow from the outlet port 282 of the compressor 220 to the inlet port 231 of the condenser 230 for the refrigerant to be circulated through the thermal management system 200 for at least one module 222 of the electrically powered vehicle. More specifically, the expansion valve 240 may be a mechanical control valve for throttling a flow of refrigerant from the outlet port 284 of the condenser 230 to the inlet port of the cooling chamber 210 that is defined in the at least one module 222 of the electrically powered vehicle. In an alternate exemplary embodiment, the expansion valve 240 may be an electronically actuated control valve for throttling the flow of refrigerant from the outlet port 284 of the condenser 230 to the inlet port of the cooling chamber 210 that is defined in the at least one module 222 of the electrically powered vehicle. In an alternate exemplary embodiment, the expansion valve 240 may be any kind of expansion valve known in the art that controls the flow of refrigerant that flows from the outlet port 284 of the condenser 230 to the inlet port of the cooling chamber 210 that is defined in the at least one module 222 of the electrically powered vehicle.

As the pressure and the temperature of the refrigerant decreases from the high pressure and the low temperature at the outlet port 284 of the condenser 230 to the low pressure and the much lower temperature at the first outlet port 247 of the expansion valve 240, the gaseous refrigerant changes its phase to a substantially liquid phase due to a large reduction in the temperature of the refrigerant to a temperature that is below its phase transition temperature. The refrigerant that is in the substantially liquid phase is allowed to flow through the inlet port of the cooling chamber 210 that is defined in the at least one module 222 of the electrically powered vehicle via the first outlet port 247 of the expansion valve 240. The expansion valve 240 throttles the refrigerant that flows from the outlet port 284 of the condenser 230. The throttling of the gaseous refrigerant that flows through the outlet port 284 of the condenser 230 to the inlet port of the cooling chamber 210 via the first outlet port 247 of the expansion valve 240 is controlled by the electronic control unit 212 via the control flow path 271 and permits only a required mass flow rate of substantially liquid refrigerant to be channeled at low pressure through the inlet port of the cooling chamber 210 that is defined in the at least one module 222 of the electrically powered vehicle. Therefore, at the first outlet port 247 of the expansion valve 240, substantially liquid refrigerant at a lower pressure and at a lower temperature than the higher pressure and the higher temperature refrigerant at the outlet port 284 of the condenser 230 is channeled to the next stage of the thermal management system 200 for the at least one module 222 of the electrically powered vehicle. In an exemplary embodiment, the cooling chamber 210 defined in the at least one module 222 of the electrically powered vehicle is in flow communication with the first outlet port 247 of the expansion valve 240 and receives substantially liquid refrigerant at low pressure and at low temperature therein. The expansion valve 240 described above may be a unidirectional flow control expansion valve that permits only the required mass flow rate of substantially liquid refrigerant to be channeled at high-speed, low pressure, and at low temperature through the inlet port of the cooling chamber 210 that is defined in the at least one module 222 of the electrically powered vehicle.

In an exemplary embodiment, the at least one module 222 of the electrically powered vehicle may be for but is not limited to an electrically powered automobile, an electrically powered motorbike, an electrically powered locomotive, and the like. At least one mechanical component 218 is positioned within and in thermal communication with the cooling chamber 210 defined in the at least one module 222 of the electrically powered vehicle. Therefore, once the refrigerant flows through the cooling chamber 210 defined in the at least one module 222 of the electrically powered vehicle, the refrigerant cools the at least one mechanical component 218 that is positioned within the cooling chamber 210 that is defined in the at least one module 222 of the electrically powered vehicle. More specifically, as the substantially liquid refrigerant that is at a high-speed, low pressure, and at low temperature that is received at the inlet port of the cooling chamber 210 flows through the cooling chamber 210 that is defined in the at least one module 222 of the electrically powered vehicle, heat from the at least one mechanical component 218 that is positioned within the cooling chamber 210 that is defined in the at least one module 222 of the electrically powered vehicle is transferred to the liquid refrigerant. More specifically, the at least one mechanical component 218 is submerged and in direct physical contact with the refrigerant that is present in the cooling chamber 210 and that flows from the inlet port of the cooling chamber 210 to the outlet port of the cooling chamber 210, and that transfers the heat away from the at least one mechanical component 218. The transfer of heat from the at least one mechanical component 218 that is positioned within the cooling chamber 210 defined in the at least one module 222 of the electrically powered vehicle to the refrigerant converts the refrigerant that is in the substantially liquid state to the refrigerant that is in the substantially gaseous state. The refrigerant that is in the substantially gaseous state is channeled to the outlet port of the cooling chamber 210 at a higher temperature than that of the liquid refrigerant at the low pressure and at the lower temperature that is received at the inlet port of the cooling chamber 210 that is defined in the at least one module 222 of the electrically powered vehicle.

In an exemplary embodiment, the cooling chamber 210 defined in the at least one module 222 of the electrically powered vehicle may be a mini-chamber that receives the refrigerant therein. Therein, a diameter of the mini-chamber that receives the refrigerant therein may be in the range of 10 millimeters to 500 millimeters to channel the flow of refrigerant through the mini-chamber. Alternatively, the diameter of the mini-chamber that receives the refrigerant therein may be in the order of any diametrical range known in the art that channels the flow of refrigerant from the inlet port of the mini-chamber to the outlet port of the mini-chamber.

In an exemplary embodiment, the at least one mechanical component 218 that is positioned within the cooling chamber 210 defined in the at least one module 222 of the electrically powered vehicle generates heat due to electric current that flows through the at least one mechanical component 218 that is positioned within the at least one module 222 of the electrically powered vehicle. The heat that is generated by the at least one mechanical component 218 that is positioned within the at least one module 222 of the electrically powered vehicle is discharged to the at least one module 222 of the electrically powered vehicle itself by conduction and consequently heats up the at least one module 222 of the electrically powered vehicle that includes at least one inner wall and/or the thermal insulation material secured to the at least one inner wall of the at least one module 222 of the electrically powered vehicle. In addition, the heat that is generated by the at least one mechanical component 218 that is positioned within the at least one module 222 of the electrically powered vehicle is discharged to the liquid refrigerant that submerges and is in direct contact with the at least one mechanical component 218 by convection and consequently heats up the liquid refrigerant that flows through the cooling chamber 210. In an exemplary embodiment, the refrigerant that is present in the cooling chamber 210 and that submerges and is in direct contact with the at least one mechanical component 218 is completely filled within the cooling chamber 210. In an alternate exemplary embodiment, the refrigerant that is present in the cooling chamber 210 and that submerges and is in direct contact with the at least one mechanical component 218 is partially filled within the cooling chamber 210. Therefore, the refrigerant that flows through the cooling chamber 210 that is defined in the at least one module 222 of the electrically powered vehicle cools the at least one mechanical component 218 that is positioned within the cooling chamber 210 defined in the at least one module 222 of the electrically powered vehicle. More specifically, as the refrigerant flows through the cooling chamber 210 that is defined in the at least one module 222 of the electrically powered vehicle, the heat that is discharged from the at least one mechanical component 218 that is positioned within the cooling chamber 210 defined in the at least one module 222 of the electrically powered vehicle is absorbed by the refrigerant by convection as refrigerant flows from the inlet port of the cooling chamber 210 to the outlet port of the cooling chamber 210. The absorption of heat by the refrigerant from the at least one module 222 of the electrically powered vehicle cools the heated at least one module 222 of the electrically powered vehicle and consequently the heated at least one mechanical component 218 that is positioned within the heated at least one module 222 of the electrically powered vehicle. Therefore, once the refrigerant flows through the cooling chamber 210 that is defined in the at least one module 222 of the electrically powered vehicle, the refrigerant cools the at least one module 222 of the electrically powered vehicle. More specifically, as the substantially liquid refrigerant that is at high-speed, low pressure, and at low temperature is received at the inlet port of the cooling chamber 210 that is defined in the at least one module 222 of the electrically powered vehicle, heat from the at least one mechanical component 218 that is positioned within the at least one module 222 of the electrically powered vehicle is transferred to the liquid refrigerant that submerges and is in direct contact with the at least one mechanical component 218. The transfer of heat from the at least one mechanical component 218 that is positioned within the cooling chamber 210 that is defined in the at least one module 222 of the electrically powered vehicle to the liquid refrigerant converts the refrigerant that is in the substantially liquid state to the refrigerant that is in the substantially gaseous state. The refrigerant that is in the substantially gaseous state is therein circulated to the outlet port of the cooling chamber 210 at a higher temperature than that of the liquid refrigerant at the low pressure and at the lower temperature that is received at the inlet port of the cooling chamber 210 that is defined in the at least one module 222 of the electrically powered vehicle.

More specifically, as the substantially liquid refrigerant that is at high-speed and at low temperature is received at the inlet port of the cooling chamber 210 flows through the cooling chamber 210 that is defined in the at least one module 222 of the electrically powered vehicle, heat from the at least one mechanical component 218 that is positioned within the cooling chamber 210 defined in at least one module 222 of the electrically powered vehicle and is submerged and in direct contact with the refrigerant is transferred to the refrigerant by convection. The transfer of heat from the at least one mechanical component 218 that is positioned within the cooling chamber 210 defined in the at least one module 222 of the electrically powered vehicle to the refrigerant that submerges and is in direct contact with the at least one mechanical component 218 converts the liquid refrigerant that is at a lower temperature to the refrigerant that is at a relatively higher temperature and at a relatively lower speed. The speed of the refrigerant decreases due to frictional losses that occur between the liquid refrigerant and inner walls of the cooling chamber 210 as liquid refrigerant flows through the cooling chamber 210. The refrigerant is therein channeled to the outlet port of the cooling chamber 210 and is at a relatively higher temperature and at a relatively lower speed than that of the liquid refrigerant at the lower temperature and higher speed that is received at the inlet port of the cooling chamber 210 that is defined in the at least one module 222 of the electrically powered vehicle.

In an exemplary embodiment, inner walls of the cooling chamber 210 that are defined in the at least one module 222 of the electrically powered vehicle may be manufactured from a material that can withstand pressurized corrosive liquid refrigerant at low temperature and at high-speed. In an exemplary embodiment, the inner walls of the cooling chamber 210 defined in the at least one module 222 of the electrically powered vehicle may be manufactured from but is not limited to a mild steel material, an aluminum material, a pressure resistant glass material, a pressure resistant plastic material, a pressure resistant ceramic material, an acrylic material, PVC, PTFE, and a pressure resistant polymer material. In an alternate exemplary embodiment, each of the inner walls of the cooling chamber 210 defined in the at least one module 222 of the electrically powered vehicle may be manufactured from a high thermal conductivity material that facilitates efficient heat transfer from each of the inner walls of the cooling chamber 210 to the refrigerant that flows through the cooling chamber 210 that is defined in the at least one module 222 of the electrically powered vehicle and that submerges and is in direct contact with the at least one mechanical component 218. Moreover, the inner walls of the cooling chamber 210 defined in the at least one module 222 of the electrically powered vehicle may be coated with a leak resistant material to ensure containment of refrigerant within the cooling chamber 210 that is defined in the at least one module 222 of the electrically powered vehicle itself without being discharged to an external environment.

In an exemplary embodiment, a cooling fan 290 is positioned proximate to the condenser 230. More specifically, the cooling fan 290 that is positioned proximate to the condenser 230 receives rotational power from the at least one module 222 of the electrically powered vehicle such as but not limited to the electric battery 217. The functioning of the cooling fan 290 delivers a stream of high-speed cooling air to the condenser 230 to cool the refrigerant that is received in the condenser 230 from the outlet port 282 of the compressor 220. More specifically, the condenser 230 is positioned within an air flow path of the cooling fan 290 and receives the stream of high-speed cooling air that is discharged from the cooling fan 290 and impinges on an outer surface of the condenser 230. The stream of high-speed cooling air that is discharged from the cooling fan 290 and that impinges on the outer surface of the condenser 230 cools the refrigerant that flows through the condenser 230 from the outlet port 282 of the compressor 220. Therefore, the cooling fan 290 facilitates discharging heat from the refrigerant that flows through the condenser 230. More specifically, the heat that was absorbed by the refrigerant that was channeled through the cooling chamber 210 that is defined in the at least one module 222 of the electrically powered vehicle and the heat that was absorbed by the refrigerant that was channeled through the compressor 220 due to compression of the gaseous refrigerant in the compressor 220 is therein substantially discharged in the condenser 230 due to the stream of high-speed-cooling air that is discharged from the cooling fan 290 and that impinges on the outer surface of the condenser 230 and absorbs heat from the refrigerant that flows through the condenser 230. Therefore, at the outlet port 284 of the condenser 230, substantially gaseous refrigerant at high pressure and at a lower temperature than the higher temperature of the gaseous refrigerant at the inlet port 231 of the condenser 230 is channeled to the next stage of the thermal management system 200 for the at least one module 222 of the electrically powered vehicle. In an exemplary embodiment, the condenser 230 is in flow communication with the outlet port 282 of the compressor 220 and receives gaseous refrigerant at high pressure and at high temperature therein from the compressor 220.

The refrigerant that flows through the cooling chamber 210 that is defined in the at least one module 222 of the electrically powered vehicle to cool the at least one module 222 of the electrically powered vehicle is of a specific heat absorption capacity/unit mass of the refrigerant that is lesser in contrast to a liquid coolant that is of a specific heat absorption capacity/unit mass of the liquid coolant that is greater. Therefore, since the specific heat absorption capacity/unit mass of the refrigerant that flows through the cooling chamber 210 that is defined in the at least one module 222 of the electrically powered vehicle is lesser in contrast to the specific heat absorption capacity/unit mass of high-speed liquid coolant that is greater, a lower mass flow rate of refrigerant is required to be channeled through the cooling chamber 210 that is defined in the at least one module 222 of the electrically powered vehicle. More specifically, the lower mass flow rate of refrigerant is required to be channeled through the cooling chamber 210 that is defined in the at least one module 222 of the electrically powered vehicle to decrease a first temperature of the at least one module 222 of the electrically powered vehicle to a second temperature in contrast to the higher mass flow rate of high-speed liquid coolant that is required to be channeled through the cooling chamber 210 that is defined in the at least one module 222 of the electrically powered vehicle to decrease the first temperature of the at least one module 222 of the electrically powered vehicle to the second temperature. In addition, due to the lower specific heat absorption capacity of the refrigerant, the heat absorption rate of the refrigerant is much higher in contrast to the heat absorption rate of the high-speed liquid coolant. Therefore, in order to decrease the temperature of the at least one module 222 of the electrically powered vehicle from the first temperature to the second temperature, the lower mass flow rate of refrigerant that is capable of absorbing heat at the higher rate is required to be channeled through the cooling chamber 210 that is defined in the at least one module 222 of the electrically powered vehicle in contrast to the higher mass flow rate of high-speed liquid coolant that is capable of absorbing heat at the lower rate. The low specific heat absorption capacity/unit mass of the refrigerant implies that the refrigerant that is channeled through the cooling chamber 210 absorbs heat from the at least one module 222 of the electrically powered vehicle at a higher rate in contrast to that of the liquid coolant that has a comparatively high specific heat absorption capacity/unit mass of the liquid coolant to decrease the first temperature of the at least one module 222 of the electrically powered vehicle to the second temperature that is within its acceptable operating temperature limits.

In an exemplary embodiment, a total amount of energy that is required for operating the compressor 220 to compress refrigerant flowing from the outlet port of the cooling chamber 210 that is defined in the at least one module 222 of the electrically powered vehicle and delivering the compressed refrigerant to the inlet port 231 of the condenser 230, for channeling the refrigerant through the condenser 230, for channeling the refrigerant through the expansion valve 240, and finally for channeling the refrigerant through the cooling chamber 210 that is defined in the at least one module 222 of the electrically powered vehicle via its inlet port is lesser than a total amount of energy that is required for operating the electric coolant pump for circulating liquid coolant, for channeling liquid coolant from the electric coolant pump through the radiator via its inlet port, for channeling liquid coolant from an outlet port of the radiator through the cooling chamber 210 that is defined in the at least one module 222 of the electrically powered vehicle, for channeling liquid coolant from the outlet port of the cooling chamber 210 that is defined in the at least one module 222 of the electrically powered vehicle through a coolant tank, and channeling liquid coolant from an outlet port of the coolant tank back to the electric coolant pump. The total amount of energy that is required for channeling the refrigerant through the cooling chamber 210 that is defined in the at least one module 222 of the electrically powered vehicle is lesser because the low mass flow rate of refrigerant is required to be channeled through the cooling chamber 210 that is defined in the at least one module 222 of the electrically powered vehicle to decrease the first temperature of the at least one module 222 of the electrically powered vehicle to the second temperature in contrast to the high mass flow rate of high-speed liquid coolant that is required to be channeled through the cooling chamber 210 that is defined in the at least one module 222 of the electrically powered vehicle to decrease the first temperature of the at least one module 222 of the electrically powered vehicle to the second temperature. The lower mass flow rate of the refrigerant that is required to be channeled through the cooling chamber 210 that is defined in the at least one module 222 of the electrically powered vehicle to cool the at least one module 222 of the electrically powered vehicle from the first temperature to the second temperature requires a comparatively lower total amount of energy to be supplied to the compressor 220 for compressing and circulating the refrigerant through the thermal management system 200 for the at least one module 222 of the electrically powered vehicle.

Moreover, the total amount of energy that is required for channeling the refrigerant through the thermal management system 200 for the at least one module 222 of the electrically powered vehicle is lesser than the total amount of energy that is required for channeling the liquid coolant through the thermal management system 200 for the at least one module 222 of the electrically powered vehicle because a low viscosity and consequently low inertia gaseous refrigerant is channeled through the cooling chamber 210 that is defined in the at least one module 222 of the electrically powered vehicle to decrease the first temperature of the at least one module 222 of the electrically powered vehicle to the second temperature in contrast to a high viscosity and consequently high inertia liquid coolant that is channeled through the cooling chamber 210 that is defined in the at least one module 222 of the electrically powered vehicle to decrease the first temperature of the at least one module 222 of the electrically powered vehicle to the second temperature. The lower viscosity of the refrigerant channeled through the cooling chamber 210 that is defined in the at least one module 222 of the electrically powered vehicle to cool the at least one module 222 of the electrically powered vehicle from the first temperature to the second temperature requires a lower total amount of energy to be supplied to the compressor 220 for compressing and circulating the refrigerant through the thermal management system 200 for the at least one module 222 of the electrically powered vehicle. The lower viscosity of the refrigerant implies that a lower inertia and consequently a lesser amount of energy is required to circulate the less viscous refrigerant through the thermal management system 200 of the at least one module 222 of the electrically powered vehicle in contrast to a greater inertia and consequently a greater amount of energy that is required to circulate the comparatively more viscous liquid coolant through the thermal management system 200 for the at least one module 222 of the electrically powered vehicle.

In an exemplary embodiment, the at least one module 222 of the electrically powered vehicle comprises at least one of an air conditioning unit 245, the electronic control unit 212, a power conversion system (PCS) 208 that includes an onboard charger and a DC converter, an inverter 214 for converting DC current to AC current, an electrically powered motor 215, a heat exchanger 216 containing oil at high temperature that is supplied from at least one of the gearbox (transmission) and the differential of the electrically powered vehicle, and the electric battery 217 containing a plurality of cells at high temperature. In addition, the at least one mechanical component 218 that is positioned within the cooling chamber 210 that is defined in the at least one module 222 of the electrically powered vehicle comprises at least one of a high temperature cabin entity of the air conditioning unit, a high temperature circuit board of the electronic control unit 212, a high temperature onboard charger of the power conversion system 208, a high temperature DC converter of the power conversion system 208, a plurality of high temperature winding coils of the electrically powered motor 215, a plurality of high temperature winding coils of the inverter 214, and at least one high temperature cell 211 that is contained within the electric battery 217.

In an exemplary embodiment, the at least one module 222 of the electrically powered vehicle comprises a housing, and at least one mechanical component 218 that is positioned within the housing of the at least one module 222 of the electrically powered vehicle. More specifically, the at least one mechanical component 218 that is positioned within the at least one module 222 of the electrically powered vehicle converts one form of energy to another or converts one of energy to useful work and useful work to energy, and gets heated up due to the process of conversion of one form of energy to another or conversion of energy to useful work and useful work to energy respectively. Therefore, the at least one mechanical component 218 that is positioned within the at least one module 222 of the electrically powered vehicle is required to be cooled by means of the thermal management system 200 for the at least one module 222 of the electrically powered vehicle to ensure that the temperature of the at least one mechanical component 218 is maintained within its acceptable operating temperature limits, and consequently the temperature of the at least one module 222 of the electrically powered vehicle is maintained within its acceptable operating temperature limits. In an exemplary embodiment, the at least one inner wall (not shown) of the cooling chamber 210 that is defined in the housing of the at least one module 222 of the electrically powered vehicle is in mechanical contact with the at least one mechanical component 218. Thereby, the at least one inner wall of the cooling chamber 210 and the at least one mechanical component 218 each directly transfers heat to the refrigerant that flows through the cooling chamber 210, wherein the refrigerant submerges the at least one mechanical component 218 that is positioned within the cooling chamber 210 and is in direct contact with at least one inner wall of the cooling chamber 210.

The expansion valve 240 controls the flow of refrigerant that flows through the outlet port 284 of the condenser 230 to at least one of the power train cooling circuit 213 and an electric battery cooling circuit 219. The flow of refrigerant from the expansion valve 240 through the power train cooling circuit 213 in one embodiment of the invention is described below.

In an exemplary embodiment, a first cooling channel (not shown) of the at least one cooling channel 210 defined within the air conditioning unit (A/C) comprises an inlet port 221. More specifically, the inlet port 221 of the first cooling channel of the at least one cooling channel 210 defined within the air conditioning unit 245 is in flow communication with the first outlet port 247 of the expansion valve 240 and receives refrigerant that is in the substantially liquid state. The refrigerant that is received in the substantially liquid state via the inlet port 221 of the first cooling channel of the at least one cooling channel 210 flows past at least one mechanical component 218 that is positioned within the first cooling channel of the air conditioning unit 245 and that requires to be cooled. On flowing past the at least one mechanical component 218 that is positioned within the air conditioning unit 245 and cooling the at least one mechanical component 218, the refrigerant is channeled through a second cooling channel (not shown) that is in flow communication with the first cooling channel to cool the at least one mechanical component 218 that is positioned within the second cooling channel. In a similar manner, a third cooling channel (not shown) and a fourth cooling channel (not shown) are in flow communication with one another in series to ensure a smooth flow of the liquid refrigerant that is channeled through the inlet port 221 of the first cooling channel to the fourth cooling channel via the second cooling channel and via the third cooling channel that are each in flow communication with one another, and that are in flow communication with the first cooling channel and the fourth cooling channel respectively. From the fourth cooling channel, the refrigerant is channeled through each of the subsequent plurality of cooling channels until the refrigerant at a relatively greater temperature is channeled out of the last cooling channel of the at least one cooling channel 210 that is defined within the air conditioning unit 245.

The first cooling channel (not shown), the second cooling channel (not shown), the third cooling channel (not shown), the fourth cooling channel (not shown), and so on each contain at least one mechanical component 218 that is positioned within the first cooling channel, within the second cooling channel, within the third cooling channel, within the fourth cooling channel, and so on, and that is required to be cooled by liquid refrigerant that is channeled through the inlet port 221 of the first cooling channel that is defined within the air conditioning unit 245. In an exemplary embodiment, the at least one cooling channel 210 is in flow communication with an outlet port that receives the refrigerant that flows through the first cooling channel, through the second cooling channel, through the third cooling channel, through the fourth cooling channel, and so on respectively. In an alternate exemplary embodiment, the first cooling channel is in flow communication with the outlet port that receives the refrigerant that flows through the first cooling channel, through the second cooling channel, through the third cooling channel, through the fourth cooling channel, and so on until the last cooling channel, and is circulated back to the first cooling channel via a return flow path. As the liquid refrigerant that is in a substantially liquid state flows from the inlet port of the first cooling channel and is channeled through the second cooling channel, through the third cooling channel, through the fourth cooling channel, and so on until the last cooling channel that is in flow communication with the first cooling channel, the liquid refrigerant changes in its state to a substantially gaseous state as a consequence of absorbing heat from each at least one mechanical component 218 that is positioned within the first cooling channel, within the second cooling channel, within the third cooling channel, within the fourth cooling channel, and so on until the last cooling channel respectively. Thereafter, the refrigerant in the substantially gaseous state at the greater temperature is channeled through the outlet port that is in flow communication with the at least one cooling channel 210 that is defined within the air conditioning unit 245 to the next stage of the thermal management system 200 for the at least one module 222 of the electrically powered vehicle. During the process of refrigerant flow through the first cooling channel, through the second cooling channel, through the third cooling channel, through the fourth cooling channel, and so on until the last cooling channel of the air conditioning unit 245, each of the at least one mechanical component 218 that is positioned within the first cooling channel, within the second cooling channel, within the third cooling channel, within the fourth cooling channel, and so on until the last cooling channel defined within the air conditioning unit 245 is cooled to a temperature that is within its acceptable operating temperature limits. Therefore, the flow of refrigerant that is channeled through the inlet port of the at least one cooling channel 210 and is channeled through the outlet port of the at least one cooling channel 210 decreases the temperature of the at least one mechanical component 218 that is positioned within the at least one cooling channel 210 that is defined within the air conditioning unit 245 to the temperature that is within its acceptable operating temperature limits.

In an exemplary embodiment, more than four cooling channels or less than four cooling channels may be deployed to cool the at least one mechanical component 218 that is positioned within the air conditioning unit 245 depending on a size of the air conditioning unit 245 and an amount of heat that is dissipated by the at least one mechanical component 218 that is positioned within the at least one cooling channel 210 that is defined within the air conditioning unit 245. The at least one mechanical component 218 that is positioned within each of the at least one cooling channel 210 that is defined within the air conditioning unit 245 and that requires to be cooled may be but is not limited to a passenger cabin open space, at least one passenger, passenger seats, and the like. In an alternate exemplary embodiment, the at least one mechanical component 218 that is positioned within each of the at least one cooling channel 210 that is defined within the air conditioning unit 245 may be any kind of mechanical component that requires to be cooled from the higher temperature to the lower temperature by means of the liquid refrigerant that is channeled from the inlet port 221 of the first cooling channel of the at least one cooling channel 210 to an outlet port 203 of the last cooling channel of the at least one cooling channel 210 via the first cooling channel, via the second cooling channel, via the third cooling channel, via the fourth cooling channel, and so on respectively.

The refrigerant that flows past the at least one mechanical component 218 that is positioned within the air conditioning unit 245 cools the at least one mechanical component 218 that is positioned within the at least one cooling channel 210 defined within the air conditioning unit 245. The cooling of the at least one mechanical component 218 that is positioned within the at least one cooling channel 210 decreases the temperature of the at least one mechanical component 218 that is positioned within the air conditioning unit 212 from the higher temperature to the lower temperature respectively and be within its acceptable operating temperature limits. Thereby, a longevity of the at least one mechanical component 218 that is positioned within the at least one cooling channel 210 that is defined within the air conditioning unit 245 may be substantially enhanced.

In an exemplary embodiment, the at least one mechanical component 218 that is positioned within the air conditioning unit 245 is at high temperature. The high temperature at least one mechanical component 218 that is positioned within the air conditioning unit 245 is discharged to the refrigerant that flows through the at least one cooling channel 210 that is defined within the air conditioning unit 245. Therefore, the refrigerant that flows through the at least one cooling channel 210 that is defined within the air conditioning unit 245 cools the at least one mechanical component 218 that is positioned within the at least one cooling channel 210 that is defined within the air conditioning unit 245. More specifically, as the refrigerant flows through the at least one cooling channel 210 that is defined within the air conditioning unit 245, the heat that is discharged from the at least one mechanical component 218 that is positioned within the at least one cooling channel 210 that is defined within the air conditioning unit 245 is absorbed by the refrigerant that flows through the at least one cooling channel 210 that is defined within the air conditioning unit 245 by convection as refrigerant flows from the inlet port 221 of the at least one cooling channel 210 to the outlet port 203 of the at least one cooling channel 210 that is defined within the air conditioning unit 245. The absorption of heat by the liquid refrigerant from the at least one mechanical component 218 that is positioned within the at least one cooling channel 210 that is defined within the air conditioning unit 245 cools the heated at least one mechanical component 218 that is positioned within the at least one cooling channel 210 that is defined within the air conditioning unit 245. Therefore, once the refrigerant flows through the at least one cooling channel 210 that is defined within the air conditioning unit 245, the refrigerant cools the at least one mechanical component 218 that is positioned within the at least one cooling channel 210 that is defined within the air conditioning unit 245. More specifically, as the substantially liquid refrigerant that is at high-speed, low pressure, and at low temperature that is received at the inlet port 221 of the first cooling channel of the at least one cooling channel 210 flows through the at least one cooling channel 210 that is defined within the air conditioning unit 245, heat from the at least one mechanical component 218 that is positioned within the at least one cooling channel 210 that is defined within the air conditioning unit 245 is transferred to the liquid refrigerant via the at least one cooling channel 210. The transfer of heat from the at least one mechanical component 218 that is positioned within the at least one cooling channel 210 that is defined within the air conditioning unit 245 to the liquid refrigerant that flows through the at least one cooling channel 210 increases a temperature of the refrigerant from a lower temperature to a higher temperature. The refrigerant is therein channeled to the outlet port 203 of the at least one cooling channel 210 at the higher temperature than that of the liquid refrigerant at the low pressure and at the lower temperature that is received at the inlet port 221 of the at least one cooling channel 210 that is defined within the air conditioning unit 245.

In an exemplary embodiment, at least one inner wall of the at least one cooling channel 210 that is defined within the air conditioning unit 245 may be manufactured from a material that can withstand pressurized corrosive liquid refrigerant at low temperature. More specifically, as the liquid refrigerant flows along the at least one inner wall of the at least one cooling channel 210 that is defined within the air conditioning unit 245, the at least one inner wall of the at least one cooling channel 210 is susceptible to contraction due to the pressurized liquid refrigerant at low temperature, thereby causing deformations to occur on the at least one inner wall of the at least one cooling channel 210. Therefore, the at least one inner wall of the at least one cooling channel 210 defined within the air conditioning unit 245 is required to be manufactured from the material that can withstand pressurized corrosive liquid refrigerant at low temperature to ensure that the at least one cooling channel 210 does not contract and break down, thereby causing leakage of the pressurized refrigerant from the at least one cooling channel 210 that is defined within the air conditioning unit 245 to the passenger cabin. In an exemplary embodiment, the at least one inner wall of the at least one cooling channel 210 that is defined within the air conditioning unit 245 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. In an alternate exemplary embodiment, the at least one inner wall and at least one outer wall of the at least one cooling channel 210 that is defined within the air conditioning unit 245 may be manufactured from a high thermal conductivity material that facilitates efficient heat transfer from the at least one mechanical component 218 that is positioned within the at least one cooling channel 210 that is defined within the air conditioning unit 245 to the refrigerant that flows through the at least one cooling channel 210 that is defined within the air conditioning unit 245. Moreover, the at least one inner wall of the at least one cooling channel 210 defined within the air conditioning unit 245 may be coated with a leak resistant material to ensure containment of liquid/gaseous refrigerant within the at least one cooling channel 210 that is defined within the air conditioning unit 245 itself without being discharged to the external environment.

The outlet port 203 of the at least one cooling channel 210 defined within the air conditioning unit 245 as well as the first outlet port 247 of the expansion valve 240 are in flow communication with an inlet port 241 of a cooling chamber 210 defined within the electronic control unit 212. The flow of refrigerant from the outlet port 203 of the at least one cooling channel 210 that is defined within the air conditioning unit 245 as well as the first outlet port 247 of the expansion valve 240 through the electronic control unit 212 is described below.

In an exemplary embodiment, the cooling chamber 210 defined within the electronic control unit (ECU) 212 comprises the inlet port 241. More specifically, the inlet port 241 of the cooling chamber 210 defined in the electronic control unit 212 is in flow communication with the outlet port 203 of the at least one cooling channel 210 that is defined within the air conditioning unit 245 as well as the first outlet port 247 of the expansion valve 240 and receives refrigerant that is in the substantially liquid state. The refrigerant that is received in the substantially liquid state via the inlet port 241 of the cooling chamber 210 flows past at least one mechanical component 218 that is positioned within the cooling chamber 210 of the electronic control unit 212 and that requires to be cooled, wherein the at least one mechanical component 218 is in mechanical contact with at least one inner wall of the cooling chamber 210. On flowing past the at least one mechanical component 218 that is positioned within the electronic control unit 212 and cooling the at least one mechanical component 218 by submerging and being in direct contact with the at least one mechanical component 218, the refrigerant at a relatively higher temperature is channeled out of the cooling chamber 210 that is defined in the electronic control unit 212.

The cooling chamber 210 contains at least one mechanical component 218 that is positioned within the cooling chamber 210, and that is required to be cooled by liquid refrigerant that is channeled through the inlet port 241 of the cooling chamber 210 that is defined in the electronic control unit 212. In an exemplary embodiment, the cooling chamber 210 is in flow communication with an outlet port 243 that receives the refrigerant that flows through the cooling chamber 210 that is defined in the electronic control unit 212. As the refrigerant that is in the substantially liquid state flows from the inlet port 241 of the cooling chamber 210, the substantially liquid refrigerant changes in its state to a substantially gaseous state as a consequence of absorbing heat from the at least one mechanical component 218 that is positioned within the cooling chamber 210 of the electronic control unit 212. Thereafter, the refrigerant in the substantially gaseous state at the greater temperature is channeled through the outlet port 243 that is in flow communication with the cooling chamber 210 that is defined in the electronic control unit 212 to the next stage of the thermal management system 200 for the at least one module 222 of the electrically powered vehicle. During the process of refrigerant flow through the cooling chamber 210 defined in the electronic control unit 212, each of the at least one mechanical component 218 that is positioned within the cooling chamber 210 defined in the electronic control unit 212 is cooled to a temperature that is within its acceptable operating temperature limits. Therefore, the flow of refrigerant that is channeled through the inlet port 241 of the cooling chamber 210 and subsequently channeled through the outlet port 243 of the cooling chamber 210 decreases the temperature of the at least one mechanical component 218 that is positioned within the cooling chamber 210 that is defined in the electronic control unit 212 to the temperature that is within its acceptable operating temperature limits.

The at least one mechanical component 218 that is positioned within the cooling chamber 210 that is defined in the electronic control unit 212 and that requires to be cooled may be but is not limited to a silicon wafer, a resistor, a switch, an LED, a capacitor, a diode, a photocell, a transistor, an integrated circuit (IC), a chip, a microprocessor, a microcontroller, an electronic bus, a transistor, and the like. In an alternate exemplary embodiment, the at least one mechanical component 218 that is positioned within the cooling chamber 210 that is defined in the electronic control unit 212 may be any kind of mechanical component that requires to be cooled from the higher temperature to the lower temperature by means of the substantially liquid refrigerant that is channeled from the inlet port 241 of the cooling chamber 210 to the outlet port 243 of the cooling chamber 210 via the cooling chamber 210.

The refrigerant that flows past the at least one mechanical component 218 that is positioned within the electronic control unit 212 cools the at least one mechanical component 218 that is positioned within the cooling chamber 210 defined in the electronic control unit 212. The cooling of the at least one mechanical component 218 that is positioned within the cooling chamber 210 decreases the temperature of the at least one mechanical component 218 that is positioned within the electronic control unit 212 from the higher temperature to the lower temperature respectively and be within its acceptable operating temperature limits. Thereby, a longevity of the at least one mechanical component 218 that is positioned within the cooling chamber 210 defined in the electronic control unit 212 may be substantially increased.

In an exemplary embodiment, the at least one mechanical component 218 that is positioned within the electronic control unit 212 generates heat due to electric current that flows through the at least one mechanical component 218 positioned within the electronic control unit 212. The heat that is generated by the at least one mechanical component 218 that is positioned within the electronic control unit 212 is discharged to the refrigerant that flows through the cooling chamber 210 that is defined in the electronic control unit 212. Therefore, the refrigerant that flows through the cooling chamber 210 that is defined in the electronic control unit 212 cools the at least one mechanical component 218 that is positioned within the cooling chamber 210 that is defined in the electronic control unit 212. More specifically, as the refrigerant flows through the cooling chamber 210 that is defined in the electronic control unit 212, the heat that is discharged from the at least one mechanical component 218 that is positioned within the cooling chamber 210 that is defined in the electronic control unit 212 is absorbed by the refrigerant that flows through the cooling chamber 210 that is defined in the electronic control unit 212 by convection as refrigerant flows from the inlet port 241 of the cooling chamber 210 to the outlet port 243 of the cooling chamber 210 that is defined in the electronic control unit 212. The absorption of heat by the liquid refrigerant from the at least one mechanical component 218 that is positioned within the cooling chamber 210 that is defined in the electronic control unit 212 cools the heated electronic control unit 212, and consequently the heated at least one mechanical component 218 that is positioned within the cooling chamber 210 that is defined in the heated electronic control unit 212. Therefore, once the refrigerant flows through the cooling chamber 210 that is defined in the electronic control unit 212, the refrigerant cools the at least one mechanical component 218 that is positioned within the cooling chamber 210 that is defined in the electronic control unit 212. More specifically, as the substantially liquid refrigerant that is at high-speed, low pressure, and at low temperature that is received at the inlet port 241 of the cooling chamber 210 flows through the cooling chamber 210 that is defined in the electronic control unit 212, heat from the at least one mechanical component 218 that is positioned within the cooling chamber 210 that is defined in the electronic control unit 212 is transferred to the substantially liquid refrigerant that submerges and is in direct contact with the at least one mechanical component 218. The transfer of heat from the at least one mechanical component 218 that is positioned within the cooling chamber 210 that is defined in the electronic control unit 212 and is submerged and in direct contact with the substantially liquid refrigerant to the substantially liquid refrigerant that flows through the cooling chamber 210 increases a temperature of the refrigerant from a lower temperature to a higher temperature. The refrigerant is therein channeled to the outlet port 243 of the cooling chamber 210 at the higher temperature than that of the substantially liquid refrigerant at the low pressure and at the lower temperature that is received at the inlet port 241 of the cooling chamber 210 that is defined in the electronic control unit 212.

In an exemplary embodiment, at least one inner wall of the cooling chamber 210 that is defined in the electronic control unit 212 may be manufactured from a material that can withstand pressurized corrosive liquid refrigerant at low temperature. More specifically, as the liquid refrigerant flows along at least one inner wall of the cooling chamber 210 that is defined in the electronic control unit 212, the at least one inner wall of the cooling chamber 210 is susceptible to contraction due to the pressurized liquid refrigerant at low temperature, thereby causing deformations to occur on the at least one inner wall of the cooling chamber 210. Therefore, the at least one inner wall of the cooling chamber 210 defined in the electronic control unit 212 is required to be manufactured from the material that can withstand pressurized corrosive liquid refrigerant at low temperature to ensure that the cooling chamber 210 does not contract and break down, thereby causing leakage of the pressurized refrigerant from the cooling chamber 210 that is defined in the electronic control unit 212 to an external environment. In an exemplary embodiment, the at least one inner wall of the cooling chamber 210 that is defined in the electronic control unit 212 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. In an alternate exemplary embodiment, the at least one inner wall and the at least one outer wall of the cooling chamber 210 that is defined in the electronic control unit 212 may be manufactured from a high thermal conductivity material that facilitates efficient heat transfer from the at least one mechanical component 218 that is positioned within the cooling chamber 210 that is defined in the electronic control unit 212 and in mechanical contact with the at least one inner wall of the cooling chamber 210 as well as from the at least one inner wall of the cooling chamber 210 that is defined in the electronic control unit 212 to the refrigerant that flows through the cooling chamber 210 that is defined in the electronic control unit 212. Moreover, the at least one inner wall of the cooling chamber 210 defined in the electronic control unit 212 may be coated with a leak resistant material to ensure containment of liquid/gaseous refrigerant within the cooling chamber 210 that is defined in the electronic control unit 212 itself without being discharged to the external environment.

The outlet port 243 of the cooling chamber 210 defined in the electronic control unit 212 is in flow communication with an inlet port 244 of the cooling chamber 210 defined in the power conversion system 208 that includes at least one of the onboard charger and the DC converter. The flow of refrigerant from the outlet port 243 of the cooling chamber 210 that is defined in the electronic control unit 212 through the power conversion system (PCS) 208 that includes at least one of the onboard charger and the DC converter is described below.

In an exemplary embodiment, a cooling chamber 210 (not shown) that is defined in the power conversion system 208 comprises the inlet port 244. More specifically, the inlet port 244 of the cooling chamber 210 that is defined in the power conversion system 208 that includes at least one of the onboard charger and the DC converter is in flow communication with the outlet port 243 of the cooling chamber 210 defined in the electronic control unit 212 and receives refrigerant at low temperature therein. The refrigerant that is received at low temperature via the inlet port 244 of the cooling chamber 210 that is defined in the power conversion system 208 flows past at least one mechanical component 218 that is positioned within the cooling chamber 210 of the power conversion system 208 that includes at least one of the onboard charger and the DC converter and that requires to be cooled, wherein the at least one mechanical component 218 is in mechanical contact with at least one inner wall of the cooling chamber 210. On flowing past the at least one mechanical component 218 that is positioned within the cooling chamber 210 that is defined in the power conversion system 208 that includes at least one of the onboard charger and the DC converter and cooling the at least one mechanical component 218 that is submerged and is in direct contact with the refrigerant, the refrigerant is channeled out of the cooling chamber 210 that is defined in the power conversion system 208 that includes at least one of the onboard charger and the DC converter.

The cooling chamber 210 contains at least one mechanical component 218 that is positioned within the cooling chamber 210, and wherein the at least one mechanical component 218 is required to be cooled by the refrigerant that is channeled through the inlet port 244 of the cooling chamber 210 defined in the power conversion system 208 and that submerges and is in direct contact with the at least one mechanical component 218. In an exemplary embodiment, the cooling chamber 210 is in flow communication with an outlet port 229 that receives the refrigerant that flows through the cooling chamber 210. As the refrigerant that is at low temperature flows from the inlet port 244 of the cooling chamber 210 and is channeled through the cooling chamber 210 thereby cooling the at least one mechanical component 218 that is submerged and in direct contact with the refrigerant, the refrigerant at low temperature increases in its temperature to a higher temperature as a consequence of absorbing heat directly from the at least one mechanical component 218 that is positioned within the cooling chamber 210 defined in the power conversion system 208.

Thereafter, the refrigerant at the higher temperature from the cooling chamber 210 is channeled through the outlet port 229 that is in flow communication with the cooling chamber 210 that is defined in the power conversion system 208 that includes at least one of the onboard charger and the DC converter to the next stage of the thermal management system 200 for the at least one module 222 of the electrically powered vehicle. During the process of refrigerant flow through the cooling chamber 210 that is defined in the power conversion system 208 that includes at least one of the onboard charger and the DC converter, the at least one mechanical component 218 that is positioned within the cooling chamber 210 that is defined in the power conversion system 208 that includes at least one of the onboard charger and the DC converter and is submerged and in direct contact with the refrigerant is cooled to a temperature that is within its respective acceptable operating temperature. Therefore, the flow of refrigerant that is channeled through the inlet port 244 of the cooling chamber 210, and channeled through the outlet port 229 of the cooling chamber 210 facilitates decreasing the temperature of the at least one mechanical component 218 that is positioned within the cooling chamber 210 defined in the power conversion system 208 that includes at least one of the onboard charger and the DC converter and is submerged and in direct contact with the refrigerant to the temperature that is within its respective acceptable operating temperature limits. In an exemplary embodiment, the power conversion system 208 includes at least one of the onboard charger (not shown) and the DC converter (not shown) that each require to be cooled by the low temperature refrigerant that is channeled through the power conversion system 208, and that submerges and is in direct contact with the at least one mechanical component 218 that is positioned within the onboard charger and the at least one mechanical component 218 that is positioned within the DC converter respectively.

The at least one mechanical component 218 that is positioned within the cooling chamber 210 defined in the power conversion system 208 and is submerged and in direct contact with the refrigerant may be but is not limited to the electrical and mechanical components of the onboard charger as well as/or the electrical and mechanical components of the DC converter, and the like. In an alternate exemplary embodiment, the at least one mechanical component 218 that is positioned within the cooling chamber 210 defined in the power conversion system 208 and is submerged and in direct contact with the refrigerant may be any kind of mechanical component that requires to be cooled from a higher temperature to a lower temperature by means of the refrigerant that is channeled from the inlet port 244 of the cooling chamber 210 that is defined in the power conversion system 208 to the outlet port 229 of the cooling chamber 210 that is defined in the power conversion system 208.

The refrigerant that flows past the at least one mechanical component 218 that is positioned within the power conversion system 208 that includes at least one of the onboard charger and the DC converter cools the at least one mechanical component 218 that is positioned within the cooling chamber 210 defined in the power conversion system 208. The cooling of the at least one mechanical component 218 that is positioned within the cooling chamber 210 defined in the power conversion system 208 and is submerged and in direct contact with the refrigerant facilitates decreasing the temperature of the at least one mechanical component 218 that is positioned within the power conversion system 208 that includes at least one of the onboard charger and the DC converter from the higher temperature to the lower temperature respectively and be within its acceptable operating temperature limits. Thereby a longevity and useful life of the at least one mechanical component 218 that is positioned within the cooling chamber 210 defined in the power conversion system 208 that includes at least one of the onboard charger and the DC converter and is submerged and in direct contact with the refrigerant may be substantially increased.

In an exemplary embodiment, the at least one mechanical component 218 that is positioned within the power conversion system 208 that includes at least one of the onboard charger and the DC converter generates heat due to electric current that flows through an electronic component such as but not limited to an electric charging assembly that includes an electric socket that is in direct contact with the at least one mechanical component 218 that is positioned within the power conversion system 208 and is submerged and in direct contact with the refrigerant. The heat that is generated by the at least one mechanical component 218 that is positioned within the power conversion system 208 that includes at least one of the onboard charger and the DC converter is discharged to the refrigerant that flows through the cooling chamber 210 that is defined in the power conversion system 208 that includes at least one of the onboard charger and the DC converter. Therefore, the refrigerant that flows through the cooling chamber 210 that is defined in the power conversion system 208 that includes at least one of the onboard charger and the DC converter cools the at least one mechanical component 218 that is positioned within the cooling chamber 210 that is defined in the power conversion system 208 and is submerged and in direct contact with the refrigerant. More specifically, as the refrigerant flows through the cooling chamber 210 that is defined in the power conversion system 208 that includes at least one of the onboard charger and the DC converter, the heat that is discharged from the at least one mechanical component 218 that is positioned within the cooling chamber 210 that is defined in the power conversion system 208 and is submerged and in direct contact with the refrigerant is absorbed by the refrigerant that flows through the cooling chamber 210 that is defined in the power conversion system 208 by convection as refrigerant flows from the inlet port 244 of the cooling chamber 210 to the outlet port 229 of the cooling chamber 210 that is defined in the power conversion system 208 that includes at least one of the onboard charger and the DC converter. The absorption of heat by the refrigerant at low temperature from the at least one mechanical component 218 that is positioned within the cooling chamber 210 that is defined in the power conversion system 208 that includes at least one of the onboard charger and the DC converter cools the heated power conversion system 208, and consequently the heated at least one mechanical component 218 that is positioned within the heated power conversion system 208 and is submerged and in direct contact with the refrigerant. Therefore, once the refrigerant flows through the cooling chamber 210 that is defined in the power conversion system 208 that includes at least one of the onboard charger and the DC converter, the refrigerant cools the heated at least one mechanical component 218 that is positioned within the onboard charger and is submerged and in direct contact with the refrigerant as well as the heated at least one mechanical component 218 that is positioned within the DC converter and is submerged and in direct contact with the refrigerant of the power conversion system 208. More specifically, as the refrigerant that is at high-speed, low pressure, and at low temperature is received at the inlet port 244 of the cooling chamber 210 flows through the cooling chamber 210 that is defined in the power conversion system 208 that includes at least one of the onboard charger and the DC converter, heat from the at least one mechanical component 218 that is positioned within the cooling chamber 210 that is defined in the onboard charger and is submerged and in direct contact with the refrigerant as well as the at least one mechanical component 218 that is positioned within the cooling chamber 210 that is defined in the DC converter and is submerged and in direct contact with the refrigerant of the power conversion system 208 is transferred to the refrigerant at low temperature by convection. The transfer of heat from the at least one mechanical component 218 that is positioned within the cooling chamber 210 that is defined in the onboard charger and is submerged and in direct contact with the refrigerant as well as the at least one mechanical component 218 that is positioned within the cooling chamber 210 that is defined in the DC converter and is submerged and in direct contact with the refrigerant of the power conversion system 208 to the refrigerant at low temperature that flows through the cooling chamber 210 increases a temperature of the refrigerant from the lower temperature to the higher temperature as refrigerant flows through the cooling chamber 210 and absorbs heat from the at least one mechanical component 218 that is submerged and in direct contact with the refrigerant. The refrigerant is therein channeled to the outlet port 229 of the cooling chamber 210 at the higher temperature than that of the refrigerant at the low pressure and at the lower temperature that is received at the inlet port 244 of the cooling chamber 210 that is defined in the power conversion system 208 that includes at least one of the onboard charger and the DC converter.

In an exemplary embodiment, at least one inner wall of the cooling chamber 210 defined in the power conversion system 208 may be manufactured from a material that can withstand pressurized corrosive refrigerant at low temperature. More specifically, as the refrigerant flows along the at least one inner wall of the cooling chamber 210 that is defined in the power conversion system 208 from its inlet port 244 to its outlet port 229, the at least one inner wall of the cooling chamber 210 is susceptible to contraction due to the pressurized refrigerant at low temperature, thereby causing deformations to occur on the at least one inner wall of the cooling chamber 210 that is defined in the power conversion system 208 that includes at least one of the onboard charger and the DC converter. Therefore, the at least one inner wall of the cooling chamber 210 defined in the power conversion system 208 is required to be manufactured from the material that can withstand pressurized refrigerant at low temperature to ensure that the cooling chamber 210 does not contract and break down, thereby causing leakage of the pressurized refrigerant from the cooling chamber 210 that is defined in the onboard charger of the power conversion system 208 as well as the DC converter of the power conversion system 208 to the external environment. In an exemplary embodiment, the at least one inner wall of the cooling chamber 210 defined in the onboard charger of the power conversion system 208 and the DC converter of the power conversion system 208 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. In an alternate exemplary embodiment, the at least one inner wall and at least one outer wall of the cooling chamber 210 defined in the power conversion system 208 may be manufactured from a high thermal conductivity material that facilitates efficient heat transfer from the at least one inner wall and the at least one mechanical component 218 that is positioned within the cooling chamber 210 that is defined in the power conversion system 208 that includes at least one of the onboard charger and the DC converter and is submerged and in direct contact with the refrigerant to the refrigerant that flows through the cooling chamber 210 that is defined in the power conversion system 208. Moreover, the at least one inner wall of the cooling chamber 210 defined in the onboard charger of the power conversion system 208 and the DC converter of the power conversion system 208 may be coated with a leak resistant material to ensure containment of substantially liquid/gaseous refrigerant within the cooling chamber 210 that is defined in the power conversion system 208 itself without being discharged to the external environment.

The outlet port 229 of the cooling chamber 210 defined in the power conversion system 208 that includes at least one of the onboard charger and the DC converter is in flow communication with an inlet port 248 of a cooling chamber 210 (not shown) defined in the inverter 214. The flow of refrigerant from the outlet port 229 of the cooling chamber 210 that is defined in at least one of the onboard charger of the power conversion system 208 and the DC converter of the power conversion system 208 through the inverter 214 is described below.

In an exemplary embodiment, a cooling chamber 210 that is defined in the inverter 214 comprises the inlet port 248. More specifically, the inlet port 248 of the cooling chamber 210 that is defined in the inverter 214 is in flow communication with the outlet port 229 of the cooling chamber 210 that is defined in the power conversion system 208 that includes at least one of the onboard charger and the DC converter, and receives refrigerant at low temperature therein. The refrigerant that is received at low temperature via the inlet port 248 of the cooling chamber 210 defined in the inverter 214 flows past at least one mechanical component 218 that is positioned within the inverter 214 and that requires to be cooled, wherein the at least one mechanical component 218 is in mechanical contact with the at least one inner wall of the cooling chamber 210 defined in the inverter 214 and is submerged and in direct contact with the refrigerant that flows through the cooling chamber 210 of the inverter 214. On flowing past the at least one mechanical component 218 that is positioned within the inverter 214 and cooling the at least one mechanical component 218 that is submerged and in direct contact with the refrigerant, the refrigerant is channeled out of the cooling chamber 210 that is defined in the inverter 214 and carrying the heat that is channeled away from the at least one mechanical component 218 that is submerged and in direct contact with the refrigerant that flows through the inverter 214.

The cooling chamber 210 contains at least one mechanical component 218 that is positioned within the cooling chamber 210, and that is required to be cooled by the refrigerant that is channeled through the inlet port 248 of the cooling chamber 210 defined in the inverter 214 and that submerges the at least one mechanical component 218. In an exemplary embodiment, the cooling chamber 210 is in flow communication with an outlet port 249 that receives the refrigerant that flows through the cooling chamber 210. As the refrigerant that is at low temperature flows from the inlet port 248 of the cooling chamber 210 to the outlet port 249 of the cooling chamber 210, the refrigerant at lower temperature increases in its temperature to a higher temperature as a consequence of absorbing heat directly from the at least one mechanical component 218 that is positioned within the cooling chamber 210 and is submerged and in direct contact with the refrigerant.

Thereafter, the refrigerant at the higher temperature is channeled through the outlet port 249 that is in flow communication with the cooling chamber 210 defined in the inverter 214 to the next stage of the thermal management system 200 for the at least one module 222 of the electrically powered vehicle. During the process of refrigerant flow through the cooling chamber 210 that is defined in the inverter 214, the at least one mechanical component 218 that is positioned within the cooling chamber 210 defined in the inverter 214 is cooled to a temperature that is within its acceptable operating temperature limits. Therefore, the flow of refrigerant that is channeled through the inlet port 248 of the cooling chamber 210, and channeled through the outlet port 249 of the cooling chamber 210 facilitates decreasing the temperature of the at least one mechanical component 218 that is positioned within the cooling chamber 210 of the inverter 214 to the temperature that is within its respective acceptable operating temperature limits. In an exemplary embodiment, the inverter 214 includes at least one mechanical component 218 for converting DC current from the electric battery 217 to AC current, and that requires to be cooled by the refrigerant that is channeled through the cooling chamber 210 of the inverter 214 and that submerges and is in direct contact with the at least one mechanical component 218 therein. The at least one mechanical component 218 that is positioned within the inverter 214 may be but is not limited to electrical and mechanical components of the power converter unit that converts DC current that is received from the electric battery 217 to AC current. In an alternate exemplary embodiment, the at least one mechanical component 218 that is positioned within the inverter 214 may be any kind of mechanical component 218 that converts DC current to AC current, and that requires to be cooled from the higher temperature to the lower temperature by means of the refrigerant that is channeled from the inlet port 248 of the cooling chamber 210 that is defined in the inverter 214 to the outlet port 249 of the cooling chamber 210 that is defined in the inverter 214 and that submerges and is in direct contact with the at least one mechanical component 218 that is present within the cooling chamber 210 of the inverter 214.

The refrigerant that flows past the at least one mechanical component 218 that is positioned within the inverter 214 cools the at least one mechanical component 218 that is positioned within the cooling chamber 210 defined in the inverter 214 and is submerged and in direct contact with the refrigerant that flows through the inverter 214. The cooling of the at least one mechanical component 218 that is positioned within the cooling chamber 210 defined in the inverter 214 decreases the temperature of the at least one mechanical component 218 positioned within the cooling chamber 210 of the inverter 214 from the higher temperature to the lower temperature respectively, and be within its acceptable operating temperature limits. Thereby, a longevity and useful life of the at least one mechanical component 218 that is positioned within the cooling chamber 210 defined in the inverter 214 and is submerged and in direct contact with the refrigerant may be substantially increased.

In an exemplary embodiment, the at least one mechanical component 218 that is positioned within the cooling chamber 210 defined in the inverter 214 generates heat due to electric current that flows through the at least one mechanical component 218 such as the DC current to AC current power converter unit that is positioned within the inverter 214 and is submerged and in direct contact with the refrigerant that flows through the inverter 214. The heat that is generated by the at least one mechanical component 218 that is positioned within the inverter 214 is discharged to the refrigerant that flows through the cooling chamber 210 that is defined in the inverter 214 and that submerges and is in direct contact with the at least one mechanical component 218 therein. Therefore, the refrigerant that flows through the cooling chamber 210 that is defined in the inverter 214 cools the at least one mechanical component 218 that is positioned within the cooling chamber 210 that is defined in the inverter 214 and is submerged and in direct contact with the refrigerant. More specifically, as the refrigerant flows through the cooling chamber 210 that is defined in the inverter 214, the heat that is discharged from the at least one mechanical component 218 that is positioned within the inverter 214 is absorbed by the refrigerant that flows through the cooling chamber 210 that is defined in the inverter 214 by convection as refrigerant flows from the inlet port 248 of the cooling chamber 210 to the outlet port 249 of the cooling chamber 210 that is defined in the inverter 214 and that submerges and is in direct contact with the at least one mechanical component 218. The absorption of heat by the refrigerant at low temperature from the inverter 214 cools the heated inverter 214 and consequently the heated at least one mechanical component 218 that is positioned within the cooling chamber 210 defined in the heated inverter 214 and that is submerged and in direct contact with the refrigerant. Therefore, once the refrigerant flows through the cooling chamber 210 that is defined in the inverter 214, the refrigerant at low temperature cools the at least one mechanical component 218 that is positioned within the cooling chamber 210 defined in the inverter 214 and is submerged and in direct contact with the refrigerant. More specifically, as the refrigerant that is at a high-speed, low pressure, and at low temperature is received at the inlet port 248 of the cooling chamber 210 and flows through the cooling chamber 210 that is defined in the inverter 214, heat from the at least one mechanical component 218 that is positioned within the cooling chamber 210 defined in the inverter 214 and is submerged and in direct contact with the refrigerant is transferred to the refrigerant at low temperature. The transfer of heat from the at least one mechanical component 218 that is positioned within the cooling chamber 210 defined in the inverter 214 to the refrigerant at low temperature that flows through the cooling chamber 210 increases a temperature of the refrigerant to a higher temperature. The refrigerant is therein channeled to the outlet port 249 of the cooling chamber 210 that is defined in the inverter 214 at the higher temperature than that of the refrigerant at the low pressure and at the lower temperature that is received at the inlet port 248 of the cooling chamber 210 that is defined in the inverter 214.

In an exemplary embodiment, at least one inner wall of the cooling chamber 210 defined in the inverter 214 may be manufactured from a material that can withstand pressurized corrosive refrigerant at low temperature. More specifically, as the refrigerant flows along the at least one inner wall of the cooling chamber 210 that is defined in the inverter 214, the at least one inner wall of the cooling chamber 210 is susceptible to contraction due to the pressurized refrigerant at low temperature, thereby causing deformations to occur on the at least one inner wall of the cooling chamber 210 that is defined in the inverter 214. Therefore, the at least one inner wall of the cooling chamber 210 defined in the inverter 214 is required to be manufactured from the material that can withstand pressurized refrigerant at low temperature to ensure that the cooling chamber 210 does not contract and break down, thereby causing leakage of the pressurized refrigerant from the cooling chamber 210 that is defined in the inverter 214 to the external environment. In an exemplary embodiment, the at least one inner wall of the cooling chamber 210 defined in the inverter 214 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. In an alternate exemplary embodiment, the at least one inner wall and the at least one outer wall of the cooling chamber 210 defined in the inverter 214 may be manufactured from a high thermal conductivity material that facilitates efficient heat transfer from the at least one mechanical component 218 that is positioned within the cooling chamber 210 that is defined in the inverter 214 to the refrigerant that flows through the cooling chamber 210 that is defined in the inverter 214. Moreover, the at least one inner wall of the cooling chamber 210 defined in the inverter 214 may be coated with a leak resistant material to ensure containment of liquid/gaseous refrigerant within the cooling chamber 210 that is defined in the inverter 214 itself without being discharged to the external environment.

The outlet port 249 of the cooling chamber 210 that is defined in the inverter 214 is in flow communication with an inlet port 251 of a cooling chamber (not shown) 210 that is defined in the electrically powered motor 215. In an alternate exemplary embodiment, the outlet port 249 of the cooling chamber 210 that is defined in the inverter 214 is in flow communication with the inlet port 251 of the cooling chamber 210 that is defined in a heat exchanger 209 that is secured to the electrically powered motor 215. The flow of refrigerant from the outlet port 249 of the cooling chamber 210 that is defined in the inverter 214 through the electrically powered motor 215 or through the heat exchanger 209 that is secured to the electrically powered motor 215 is described below.

In an exemplary embodiment, the cooling chamber 210 that is defined in the electrically powered motor 215 comprises the inlet port 251. More specifically, the inlet port 251 of the cooling chamber 210 defined in the electrically powered motor 215 is in flow communication with the outlet port 249 of the cooling chamber 210 defined in the inverter 214 and receives refrigerant at low temperature therein. The refrigerant that is received at low temperature via the inlet port 251 of the cooling chamber 210 flows past at least one mechanical component 218 that is positioned within the electrically powered motor 215 and that requires to be cooled, wherein the at least one mechanical component 218 is in mechanical contact with at least one inner wall of the cooling chamber 210 defined in the electrically powered motor 215 and is submerged and in direct contact with the refrigerant that flows through the cooling chamber 210 of the electrically powered motor 215. On flowing past the at least one mechanical component 218 that is positioned within the electrically powered motor 215 and cooling the at least one mechanical component 218 that is submerged and in direct contact with the refrigerant, the refrigerant is channeled out of an outlet port 253 of the cooling chamber 210 that is defined in the electrically powered motor 215.

The cooling chamber 210 contains at least one mechanical component 218 that is positioned within the cooling chamber 210 and that is required to be cooled by the refrigerant that is channeled through the inlet port 251 of the cooling chamber 210 defined in the electrically powered motor 215. In an exemplary embodiment, the cooling chamber 210 is in flow communication with the outlet port 253 that receives the refrigerant that flows through the cooling chamber 210 defined in the electrically powered motor 215. As the refrigerant that is at low temperature flows from the inlet port 251 of the cooling chamber 210 to the outlet port 253 of the cooling chamber 210 via the cooling chamber 210, the refrigerant at a lower temperature increases in its temperature to a higher temperature as a consequence of absorbing heat from the at least one mechanical component 218 that is positioned within the cooling chamber 210 and is submerged and in direct contact with the refrigerant. Thereafter, the refrigerant at the higher temperature is channeled through the outlet port 253 that is in flow communication with the cooling chamber 210 that is defined in the electrically powered motor 215 to the next stage of the thermal management system 200 for the at least one module 222 of the electrically powered vehicle.

During the process of refrigerant flow through the cooling chamber 210 that is defined in the electrically powered motor 215, the at least one mechanical component 218 that is positioned within the cooling chamber 210 defined in the electrically powered motor 215 and is submerged and in direct contact with the refrigerant is cooled to a temperature that is within its acceptable operating temperature limits. Therefore, the flow of refrigerant that is channeled through the inlet port 251 of the cooling chamber 210 of the electrically powered motor 215 facilitates decreasing the temperature of the at least one mechanical component 218 that is positioned within the electrically powered motor 215 and is submerged and in direct contact with the refrigerant to the temperature that is within its acceptable operating temperature limits. In an exemplary embodiment, the electrically powered motor 215 includes at least one mechanical component 218 for converting AC current that is received from the inverter 214 to useful mechanical work, and that requires to be cooled by the refrigerant that is channeled through the cooling chamber 210 defined in the electrically powered motor 215. The at least one mechanical component 218 that is positioned within the cooling chamber 210 defined in the electrically powered motor 215 and is submerged and in direct contact with the refrigerant may be but is not limited to the electrical and mechanical components such as but not limited to electrical winding coils of the electrically powered motor 215 that are positioned within the cooling chamber 210 that is defined in the electrically powered motor 215 for converting AC current that is received from the inverter 214 to useful mechanical work. In an alternate exemplary embodiment, the at least one mechanical component 218 that is positioned within the electrically powered motor 215 may be any kind of mechanical component that converts AC current that is received from the inverter 214 to useful mechanical work, and that requires to be cooled from a higher temperature to a lower temperature by means of the refrigerant that is channeled from the inlet port 251 of the cooling chamber 210 that is defined in the electrically powered motor 215 to the outlet port 253 of the cooling chamber 210 that is defined in the electrically powered motor 215.

The refrigerant that flows past the at least one mechanical component 218 that is positioned within the electrically powered motor 215 cools the at least one mechanical component 218 that is positioned within the cooling chamber 210 that is defined in the electrically powered motor 215. The cooling of the at least one mechanical component 218 positioned within the cooling chamber 210 that is defined in the electrically powered motor 215 decreases the temperature of the at least one mechanical component 218 positioned within the electrically powered motor 215 and is submerged and in direct contact with the refrigerant from the higher temperature to the lower temperature respectively, and be within its acceptable operating temperature limits. Thereby, a longevity and useful life of the at least one mechanical component 218 that is positioned within the cooling chamber 210 that is defined in the electrically powered motor 215 and is submerged and in direct contact with the refrigerant may be substantially increased.

In an exemplary embodiment, the at least one mechanical component 218 that is positioned within the electrically powered motor 215 generates heat due to conversion of AC current to useful mechanical work. The heat that is generated by the at least one mechanical component 218 that is positioned within the cooling chamber 210 of the electrically powered motor 215 and is submerged and in direct contact with the refrigerant is discharged to the refrigerant that flows through the cooling chamber 210 that is defined in the electrically powered motor 215. Therefore, the refrigerant that flows through the cooling chamber 210 that is defined in the electrically powered motor 215 cools the at least one mechanical component 218 that is positioned within the electrically powered motor 215 and is submerged and in direct contact with the refrigerant. More specifically, as the refrigerant flows through the cooling chamber 210 that is defined in the electrically powered motor 215, the heat that is discharged from the at least one mechanical component 218 that is positioned within the electrically powered motor 215 is absorbed by the refrigerant that flows through the cooling chamber 210 by convection as refrigerant flows from the inlet port 251 of the cooling chamber 210 to the outlet port 253 of the cooling chamber 210 that is defined in the electrically powered motor 215 and that submerges and is in direct contact with the at least one mechanical component 218. In an alternate exemplary embodiment, a cooling medium such as cooling oil that may be present between the at least one mechanical component 218 that is positioned within the cooling chamber 210 defined in the electrically powered motor 215 may transfer the heat away from the at least one mechanical component 218 that is positioned within the cooling chamber 210 that is defined in the electrically powered motor 215 to the refrigerant that flows through the cooling chamber 210 that is defined in the electrically powered motor 215. The absorption of heat by the refrigerant at low temperature from the at least one mechanical component 218 that is positioned within the electrically powered motor 215 cools the heated electrically powered motor 215, and consequently the heated at least one mechanical component 218 that is positioned within the cooling chamber 210 defined in the heated electrically powered motor 215 and is submerged and in direct contact with the refrigerant. Therefore, once the refrigerant flows through the cooling chamber 210 that is defined in the electrically powered motor 215, the refrigerant at low temperature cools the at least one mechanical component 218 that is positioned within the cooling chamber 210 defined in the electrically powered motor 215 and is submerged and in direct contact with the refrigerant. More specifically, as the refrigerant that is at a high-speed, low pressure, and at low temperature that is received at the inlet port 251 of the cooling chamber 210 flows through the cooling chamber 210 defined in the electrically powered motor 215, heat from the at least one mechanical component 218 that is positioned within the cooling chamber 210 defined in the electrically powered motor 215 and is submerged and in direct contact with the refrigerant is transferred to the refrigerant at low temperature by convection. The transfer of heat from the at least one mechanical component 218 that is positioned within the cooling chamber 210 that is defined in the electrically powered motor 215 to the refrigerant at low temperature that flows through the cooling chamber 210 increases a temperature of the refrigerant to a higher temperature. The refrigerant is therein channeled to the outlet port 253 of the cooling chamber 210 defined in the electrically powered motor 215 at the higher temperature than that of the refrigerant at the low pressure and at the lower temperature that is received at the inlet port 251 of the cooling chamber 210 defined in the electrically powered motor 215.

In an exemplary embodiment, at least one inner wall of the cooling chamber 210 that is defined in the electrically powered motor 215 may be manufactured from a material that can withstand pressurized corrosive refrigerant at low temperature. More specifically, as the refrigerant flows along the at least one inner wall of the cooling chamber 210 that is defined in the electrically powered motor 215, the at least one inner wall of the cooling chamber 210 is susceptible to contraction due to the low temperature pressurized refrigerant, thereby causing deformations to occur on the at least one inner wall of the cooling chamber 210 that is defined in the electrically powered motor 215. Therefore, the at least one inner wall of the cooling chamber 210 defined in the electrically powered motor 215 is required to be manufactured from the material that can withstand pressurized corrosive refrigerant at low temperature to ensure that the cooling chamber 210 does not contract and break down, thereby causing leakage of the pressurized refrigerant from the cooling chamber 210 that is defined in the electrically powered motor 215 to the external environment.

In an exemplary embodiment, the at least one inner wall of the cooling chamber 210 defined in the electrically powered motor 215 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. In an alternate exemplary embodiment, the at least one inner wall and at least one outer wall of the cooling chamber 210 defined in the electrically powered motor 215 may be manufactured from a high thermal conductivity material that facilitates efficient heat transfer from the at least one inner wall of the cooling chamber and at least one in the electrically powered motor 215 and is submerged and in direct contact with the refrigerant to the refrigerant that flows through the cooling chamber 210. Moreover, the at least one inner wall of the cooling chamber 210 defined in the electrically powered motor 215 may be coated with a leak resistant material to ensure containment of substantially liquid/gaseous refrigerant within the cooling chamber 210 that is defined in the electrically powered motor 215 itself without being discharged to the external environment.

The outlet port 253 of the cooling chamber 210 that is defined in the electrically powered motor 215 is in flow communication with an inlet port 257 of at least one cooling channel 210 (not shown) that is defined within a heat exchanger 216 that contains oil at high temperature that is supplied from at least one of the gearbox (transmission) and the differential of the electrically powered vehicle. The flow of refrigerant from the outlet port 253 of the cooling chamber 210 that is defined in the electrically powered motor 215 through the heat exchanger 216 that contains oil at high temperature that is supplied from at least one of the gearbox (transmission) and the differential of the electrically powered vehicle is described below.

In an exemplary embodiment, the cooling chamber 210 that is defined within the heat exchanger 216 contains oil at high temperature that is supplied from at least one of the gearbox (transmission) and the differential of the electrically powered vehicle and comprises the inlet port 257. More specifically, the inlet port 257 of the at least one cooling channel 210 that is defined within the heat exchanger 216 that contains oil at high temperature that is supplied from at least one of the gearbox (transmission) and the differential of the electrically powered vehicle is in flow communication with the outlet port 253 of the cooling chamber 210 defined in the electrically powered motor 215 and receives refrigerant at low temperature therein. The refrigerant that is received at low temperature via the inlet port 257 of the at least one cooling channel 210 flows past oil at high temperature that is supplied from at least one of the gearbox (transmission) and the differential of the electrically powered vehicle into the heat exchanger 216 and that requires to be cooled, wherein the oil at high temperature that is supplied from at least one of the gearbox (transmission) and the differential of the electrically powered vehicle is in direct physical contact with the at least one cooling channel 210 defined within the heat exchanger 216. On flowing past the oil at high temperature that is supplied from at least one of the gearbox (transmission) and the differential of the electrically powered vehicle and cooling the oil at high temperature, the refrigerant is channeled through a second cooling channel (not shown) that is in flow communication with the first cooling channel to cool the oil at high temperature that flows through the cooling chamber 210 and is in mechanical contact with the second cooling channel. In a similar manner, a third cooling channel (not shown) and a fourth cooling channel (not shown) are in flow communication with one another in series to ensure a smooth flow of the refrigerant at low temperature that is channeled through the inlet port 257 of the first cooling channel of the at least one cooling channel 210 to the fourth cooling channel via the second cooling channel and via the third cooling channel that are each in flow communication with one another, and that are positioned between the first cooling channel and the fourth cooling channel respectively. From the fourth cooling channel, the refrigerant is channeled through each of the subsequent plurality of cooling channels until the refrigerant is channeled out of an outlet port 259 of the last cooling channel of the at least one cooling channel 210 that is defined within the heat exchanger 216.

In an exemplary embodiment, the cooling chamber contains oil at high temperature that flows through the cooling chamber 210 and that is supplied from at least one of the gearbox (transmission) and the differential of the electrically powered vehicle. The oil at high temperature is required to be cooled by the refrigerant that is channeled through the inlet port 257 of the at least one cooling channel 210. In an exemplary embodiment, the at least one cooling channel 210 is in flow communication with the outlet port 259 that receives the refrigerant that flows through the first cooling channel, through the second cooling channel, through the third cooling channel, and through the fourth cooling channel respectively. As the refrigerant that is at low temperature flows from the inlet port 257 of the at least one cooling channel 210 and is channeled through the second cooling channel, through the third cooling channel, through the fourth cooling channel, and so on until the last cooling channel that is in flow communication with the first cooling channel, the refrigerant at lower temperature increases in its temperature to a higher temperature as a consequence of absorbing heat from oil at high temperature present in the cooling chamber of the heat exchanger 216 that is supplied from at least one of the gearbox (transmission) and the differential of the electrically powered vehicle. The oil at high temperature surrounds the first cooling channel, surrounds the second cooling channel, surrounds the third cooling channel, surrounds the fourth cooling channel, and so on until the last cooling channel respectively that contains the refrigerant and dissipates heat to the refrigerant. Thereafter, the refrigerant at the higher temperature is channeled through the outlet port 259 that is in flow communication with the at least one cooling channel 210 defined within the heat exchanger 216 to the next stage of the thermal management system 200 for the at least one module 222 of the electrically powered vehicle.

During the process of refrigerant flow through the first cooling channel, through the second cooling channel, through the third cooling channel, through the fourth cooling channel, and so on until the last cooling channel that is defined within the heat exchanger 216, oil at high temperature that is supplied from at least one of the gearbox (transmission) and the differential of the electrically powered vehicle that surrounds the first cooling channel, that surrounds the second cooling channel, that surrounds the third cooling channel, that surrounds the fourth cooling channel, and so on until the last cooling channel is cooled to a temperature that is within its acceptable operating temperature limits. Therefore, the flow of refrigerant that is channeled through the inlet port 257 of the at least one cooling channel 210, and channeled through the outlet port 259 of the at least one cooling channel 210 via the at least one cooling channel 210 decreases the temperature of the oil at high temperature that is present within the cooling chamber of the heat exchanger 216, and that is supplied from at least one of the gearbox (transmission) and the differential of the electrically powered vehicle to the final temperature that is within its acceptable operating temperature limits. In an exemplary embodiment, the heat exchanger 216 contains oil at high temperature that is supplied from at least one of the gearbox (transmission) and the differential of the electrically powered vehicle that requires to be cooled by the low temperature refrigerant that is channeled through the heat exchanger 216 and submerges and in direct contact with the low temperature refrigerant that is channeled through the heat exchanger 216 and is immiscible in the refrigerant. In an exemplary embodiment, more than four cooling channels or less than four cooling channels may be deployed to cool the oil at high temperature that is present within the heat exchanger 216 depending on a size of the heat exchanger 216 and an amount of heat that exists in the oil at high temperature that is present within the heat exchanger 216. The oil at high temperature that is supplied from at least one of the gearbox (transmission) and the differential of the electrically powered vehicle may be any kind of oil at high temperature, and that requires to be cooled from the higher temperature to the lower temperature by means of the refrigerant that is channeled from the inlet port 257 of the at least one cooling channel 210 that is defined within the heat exchanger 216 to the outlet port 259 of the at least one cooling channel 210 that is defined within the heat exchanger 216 via the first cooling channel, via the second cooling channel, via the third cooling channel, and via the fourth cooling channel that are each in flow communication with one another within the heat exchanger 216.

The refrigerant that flows past the oil at high temperature that is supplied from at least one of the gearbox (transmission) and the differential of the electrically powered vehicle and that is present within the cooling chamber of the heat exchanger 216 cools the oil at high temperature that is present within the cooling chamber of the heat exchanger 216. The cooling of the oil at high temperature that is present within the heat exchanger 216 decreases the temperature of the oil at high temperature that is present within the heat exchanger 216 from the higher temperature to the lower temperature respectively and be within its acceptable operating temperature limits. Thereby, a longevity and useful life of the oil at high temperature that is supplied from at least one of the gearbox (transmission) and the differential of the electrically powered vehicle and that is present within the heat exchanger 216 may be substantially enhanced.

In an exemplary embodiment, the oil at high temperature that is supplied from at least one of the gearbox (transmission) and the differential of the electrically powered vehicle and that is present within the cooling chamber of the heat exchanger 216 dissipates heat. The heat that is dissipated by the oil at high temperature that is supplied from at least one of the gearbox (transmission) and the differential of the electrically powered vehicle that is present within the cooling chamber of the heat exchanger 216 is discharged to the refrigerant that flows through the at least one cooling channel 210 that is defined within the heat exchanger 216. Therefore, the refrigerant that flows through the at least one cooling channel 210 that is defined within the heat exchanger 216 cools the oil at high temperature that is supplied from at least one of the gearbox (transmission) and the differential of the electrically powered vehicle and that is present within the cooling chamber of the heat exchanger 216. More specifically, as the refrigerant flows through the at least one cooling channel 210 that is defined within the heat exchanger 216, the heat that is discharged from the oil at high temperature that is supplied from at least one of the gearbox (transmission) and the differential of the electrically powered vehicle and that is present within the cooling chamber of the heat exchanger 216 is absorbed by the refrigerant that flows through the at least one cooling channel 210 by convection as refrigerant flows from the inlet port 257 of the at least one cooling channel 210 to the outlet port 259 of the at least one cooling channel 210 that is defined within the heat exchanger 216. The absorption of heat by the refrigerant at low temperature from the cooling chamber of the heat exchanger 216 cools the heated heat exchanger 216 and consequently the heated oil at high temperature that is supplied from at least one of the gearbox (transmission) and the differential of the electrically powered vehicle and that is present within the cooling chamber of the heat exchanger 216. Therefore, once the refrigerant flows through the at least one cooling channel 210 that is defined within the heat exchanger 216, the refrigerant cools the oil at high temperature that is supplied from at least one of the gearbox (transmission) and the differential of the electrically powered vehicle and that is present within the cooling chamber of the heat exchanger 216. More specifically, as the refrigerant that is at a high-speed, low pressure, and at low temperature is received at the inlet port 257 of the at least one cooling channel 210 flows through the at least one cooling channel 210 that is defined within the heat exchanger 216, heat from the oil at high temperature that is supplied from at least one of the gearbox (transmission) and the differential of the electrically powered vehicle that is present in the heat exchanger 216 is transferred to the refrigerant at low temperature. The transfer of heat from the oil at high temperature that is supplied from at least one of the gearbox (transmission) and the differential of the electrically powered vehicle and that is present in the cooling chamber of the heat exchanger 216 to the refrigerant at low temperature that flows through the at least one cooling channel 210 increases the temperature of the refrigerant from lower temperature to higher temperature. The refrigerant is therein channeled to the outlet port 259 of the at least one cooling channel 210 at the higher temperature than that of the refrigerant at the low pressure and at the lower temperature that is received at the inlet port 257 of the at least one cooling channel 210 that is defined within the heat exchanger 216.

In an exemplary embodiment, at least one inner wall of the at least one cooling channel 210 that is defined within the heat exchanger 216 may be manufactured from a material that can withstand pressurized corrosive refrigerant at low temperature. More specifically, as the refrigerant flows along the at least one inner wall of the at least one cooling channel 210 that is defined within the heat exchanger 216, the at least one inner wall of the at least one cooling channel 210 is susceptible to contraction due to the pressurized refrigerant at low temperature, thereby causing deformations to occur on the at least one inner wall of the at least one cooling channel 210 that is defined within the heat exchanger 216. Therefore, the at least one inner wall of the at least one cooling channel 210 defined within the heat exchanger 216 is required to be manufactured from the material that can withstand pressurized refrigerant at low temperature to ensure that the at least one cooling channel 210 does not contract and break down, thereby causing leakage of the pressurized refrigerant from the at least one cooling channel 210 that is defined within the heat exchanger 216 to the external environment. In an exemplary embodiment, the at least one inner wall of the at least one cooling channel 210 defined within the heat exchanger 216 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. In an alternate exemplary embodiment, the at least one inner wall and the at least one outer wall of the at least one cooling channel 210 defined within the heat exchanger 216 may be manufactured from a high thermal conductivity material that facilitates efficient heat transfer from the oil at high temperature that is present within the cooling chamber of the heat exchanger 216 to the refrigerant that flows through the at least one cooling channel 210 defined within the heat exchanger 216. Moreover, the at least one inner wall of the at least one cooling channel 210 defined within the heat exchanger 216 may be coated with a leak resistant material to ensure containment of substantially liquid/gaseous refrigerant within the at least one cooling channel 210 that is defined within the heat exchanger 216 itself without being discharged to the external environment. In an exemplary embodiment, the outlet port 259 of the at least one cooling channel 210 that is defined within the heat exchanger 216 is in flow communication with the inlet port 281 of the compressor 220 such that the refrigerant at high temperature that flows from the outlet port 259 of the at least one cooling channel 210 that is defined within the heat exchanger 216 is supplied to the inlet port 281 of the compressor 220.

The expansion valve 240 throttles the flow of refrigerant that flows through the outlet port 284 of the condenser 230 to at least one of the power train cooling circuit 213 and the electric battery cooling circuit 219. The flow of refrigerant from the expansion valve 240 through the electric battery cooling circuit 219 in one embodiment of the invention is described below.

In an exemplary embodiment, the cooling chamber 210 that is defined in the electric battery 217 comprises an inlet port 260. More specifically, the inlet port 260 of the cooling chamber 210 that is defined in the electric battery 217 is in flow communication with a second outlet port 265 of the expansion valve 240 and receives refrigerant in the substantially liquid state. The refrigerant that is received in the substantially liquid state via the inlet port 260 of the cooling chamber 210 that is defined in the electric battery 217 flows past the at least one mechanical component 218 that is positioned within the electric battery 217 and that requires to be cooled, wherein the at least one mechanical component 218 is in mechanical contact with the cooling chamber 210 and is submerged and is in direct contact with the refrigerant that flows through the cooling chamber 210. In an exemplary embodiment, the at least one mechanical component 218 that is positioned within the electric battery 217 and that requires to be cooled comprises at least one cell 211 of the electric battery 217 at high temperature. On flowing past the at least one mechanical component 218 that is positioned within the cooling chamber 210 of the electric battery 217 and cooling the at least one mechanical component 218, the refrigerant is channeled out of the cooling chamber 210 that is defined in the electric battery 217 via an outlet port 266 of the cooling chamber 210 that is defined in the electric battery 217.

The cooling chamber 210 contains at least one cell 211 (electrically powered cell) at high temperature, and that is required to be cooled by the liquid refrigerant at low temperature that is channeled via the inlet port 260 of the cooling chamber 210 that is defined in the electric battery 217. In an exemplary embodiment, the cooling chamber 210 is in flow communication with the outlet port 266 that receives the refrigerant that flows through the cooling chamber 210. As the refrigerant that is at low temperature flows from the inlet port 260 of the cooling chamber 210 to the outlet port 266 of the cooling chamber 210 via the cooling chamber 210, the refrigerant at lower temperature increases in its temperature to a higher temperature as a consequence of absorbing heat from the at least one cell 211 that is positioned within the cooling chamber 210 that is defined within the electric battery 217 and that is submerged and is in direct contact with the refrigerant that flows through the cooling chamber 210 defined within the electric battery 217. Thereafter, the refrigerant at the higher temperature is channeled through the outlet port 266 that is in flow communication with the cooling chamber 210 that is defined in the electric battery 217 to the next stage of the thermal management system 200 for the at least one module 222 of the electrically powered vehicle.

During the process of refrigerant flow through the cooling chamber 210 that is defined in the electric battery 217, the at least one cell 211 at high temperature that is positioned within the electric battery 217 and is submerged and in direct contact with the refrigerant that is present in the cooling chamber 210 of the electric battery 217 is cooled from a higher temperature to a lower temperature that is within its acceptable operating temperature limits. Therefore, the refrigerant that is channeled through the inlet port 260 of the cooling chamber 210 to the cooling chamber 210, and therein channeled through the outlet port 266 of the cooling chamber 210 facilitates decreasing the temperature of the at least one cell 211 at higher temperature that is positioned within the cooling chamber 210 of the electric battery 217 to the lower temperature that is within its acceptable operating temperature limits. In an exemplary embodiment, the electric battery 217 contains at least one cell 211 at high temperature that requires to be cooled by the refrigerant that is channeled through the cooling chamber 210 of the electric battery 217 and that submerges and is in direct contact with the at least one cell 211 that is positioned within the electric battery 217. The electric battery 217 that contains at least one cell 211 at high temperature may be any kind of rechargeable electric battery such as but not limited to a lithium-iron-phosphate battery, a nickel-cobalt-aluminum battery, a lithium-ion battery, a nickel-metal hydride battery, a nickel-cadmium battery, a nickel-cobalt battery, and a lead acid battery. The electric battery 217 and more specifically the at least one cell 211 at high temperature requires to be cooled from the higher temperature to the lower temperature by means of the low temperature refrigerant that is channeled from the inlet port 260 of the cooling chamber 210 that is defined in the electric battery 217 to the outlet port 266 of the cooling chamber 210 that is defined in the electric battery 217, and that submerges and is in direct contact with the at least one cell 211 that is positioned within the cooling chamber 210 defined within the electric battery 217.

The refrigerant that flows past the at least one cell 211 at high temperature that is positioned within the electric battery 217 and that submerges and is in direct contact with the at least one cell 211 cools the at least one cell 211 at high temperature that is positioned within the cooling chamber 210 defined in the electric battery 217. The cooling of the at least one cell 211 at high temperature that is positioned within the cooling chamber 210 defined in the electric battery 217 and is submerged and in direct contact with the refrigerant decreases the temperature of the at least one cell 211 of the electric battery 217 from the higher temperature to the lower temperature respectively and be within its acceptable operating temperature limits. Thereby, a longevity (lifespan) and useful life of the at least one cell 211 at high temperature that is positioned within the cooling chamber 210 defined in the electric battery 217 and is submerged and in direct contact with the refrigerant may be substantially increased.

In an exemplary embodiment, the at least one cell 211 at high temperature that is positioned within the cooling chamber 210 defined in the electric battery 217 generates heat during charging of the electric battery 217 as well as during the discharge of electric power from the electric battery 217 respectively. The heat that is generated by the at least one cell 211 at high temperature that is positioned within the cooling chamber 210 defined in the electric battery 217 is discharged to the refrigerant that flows through the cooling chamber 210 that is defined in the electric battery 217 and that submerges and is in direct contact with the at least one cell 211. Therefore, the refrigerant that flows through the cooling chamber 210 that is defined in the electric battery 217 cools the at least one cell 211 at high temperature that is positioned within the electric battery 217 and is submerged and in direct contact with the refrigerant. More specifically, as the refrigerant flows through the cooling chamber 210 that is defined in the electric battery 217, the heat that is discharged from the at least one cell 211 at high temperature that is positioned within the electric battery 217 and is submerged and in direct contact with the refrigerant is absorbed by the refrigerant at low temperature that flows through the cooling chamber 210 by convection as refrigerant flows from the inlet port 260 of the cooling chamber 210 to the outlet port 266 of the cooling chamber 210 that is defined in the electric battery 217. The absorption of heat by the refrigerant at low temperature from the at least one cell 211 that is positioned within the electric battery 217 cools the heated electric battery 217, and consequently the heated at least one cell 211 at high temperature that is positioned within the cooling chamber 210 defined in the electric battery 217 and that is submerged and in direct contact with the refrigerant. Therefore, once the refrigerant flows through the cooling chamber 210 that is defined in the electric battery 217, the refrigerant at low temperature cools the at least one cell 211 at high temperature that is positioned within the cooling chamber 210 defined in the electric battery 217 and is submerged and in direct contact with the refrigerant. More specifically, as the refrigerant that is at high-speed, low pressure, and at low temperature that is received at the inlet port 260 of the cooling chamber 210 flows through the cooling chamber 210 that is defined in the electric battery 217, heat from the at least one cell 211 at high temperature that is positioned within the cooling chamber 210 defined in the electric battery 217 is transferred to the refrigerant at low temperature that submerges and is in direct contact with the at least one cell 211. The transfer of heat from the at least one cell 211 at high temperature that is positioned within the cooling chamber 210 defined in the electric battery 217 and is submerged and in direct contact with the refrigerant to the refrigerant at low temperature that flows through the cooling chamber 210 increases a temperature of the refrigerant from a lower temperature to a higher temperature. The refrigerant is therein channeled to the outlet port 266 of the cooling chamber 210 defined in the electric battery 217 at the higher temperature than that of the refrigerant at the low pressure and at the lower temperature that is received at the inlet port 260 of the cooling chamber 210 defined in the electric battery 217, wherein the refrigerant submerges and is in direct contact with the at least one cell 211 that is positioned within the cooling chamber 210 of the electric battery 217.

In an exemplary embodiment, at least one inner wall of the cooling chamber 210 that is defined in the electric battery 217 may be manufactured from a material that can withstand pressurized corrosive refrigerant at low temperature. More specifically, as the refrigerant flows along the at least one inner wall of the cooling chamber 210 that is defined in the electric battery 217, the at least one inner wall of the cooling chamber 210 is susceptible to contraction due to the pressurized refrigerant at low temperature, thereby causing deformations to occur on the at least one inner wall of the cooling chamber 210 that is defined in the electric battery 217. Therefore, the at least one inner wall of the cooling chamber 210 that is defined in the electric battery 217 is required to be manufactured from the material that can withstand pressurized refrigerant at low temperature to ensure that the cooling chamber 210 does not contract and break down, thereby causing leakage of the pressurized refrigerant from the cooling chamber 210 that is defined in the electric battery 217 to the external environment. In an exemplary embodiment, the at least one inner wall of the cooling chamber 210 defined in the electric battery 217 may be manufactured from but is not limited to a steel material, an aluminum material, a pressure resistant glass material, a pressure resistant plastic material, a pressure resistant polymer material, an acrylic material, PVC, PTFE, and a pressure resistant ceramic material. Moreover, the at least one inner wall of the cooling chamber 210 defined in the electric battery 217 may be coated with a leak resistant material to ensure containment of substantially liquid/gaseous refrigerant within the cooling chamber 210 defined in the electric battery 217 itself without being discharged to the external environment. In an exemplary embodiment, the outlet port 266 of the cooling chamber 210 defined in the electric battery 217 is in flow communication with the inlet port 281 of the compressor 220 such that the refrigerant at high temperature that flows out from the outlet port 266 of the cooling chamber 210 defined in the electric battery 217 is supplied to the inlet port 281 of the compressor 220.

Therefore, in this embodiment of the invention, the refrigerant is channeled through the inlet port 281 of the compressor 220 where refrigerant is compressed from a low pressure to a high pressure with a corresponding large increase in temperature of the refrigerant. Refrigerant is channeled from the outlet port 282 of the compressor 220 to the inlet port 285 of the bypass valve 250. Refrigerant is channeled from the outlet port 232 of the bypass valve 250 to the inlet port 231 of the condenser 230 where heat is dissipated from the refrigerant in the condenser 230, thereby decreasing the temperature of the refrigerant from higher temperature to lower temperature and bypassing the bypass flow path 234. Refrigerant is channeled from the outlet port 284 of the condenser 230 to the inlet port 283 of the expansion valve 240 where the pressure of the refrigerant is substantially decreased from high pressure to low pressure and a speed of the refrigerant is substantially increased from low speed to high speed. Refrigerant in the liquid state at low temperature is channeled from the first outlet port 247 of the expansion valve 240 through the power train cooling circuit 213 comprising a first plurality of modules of the electrically powered vehicle that includes the air conditioning unit 245, the electronic control unit 212, the power conversion system 208 that includes at least one of the onboard charger and the DC converter, the inverter 214, the electrically powered motor 215, and the heat exchanger 216 that each require to be cooled from higher temperature to lower temperature that is within their acceptable operating temperature limits respectively. Refrigerant in the liquid state at low temperature is channeled from the second outlet port 265 of the expansion valve 240 through the electric battery cooling circuit 219 comprising a second module of the electrically powered vehicle that includes the electric battery 217 that requires to be cooled from higher temperature to lower temperature that is within its acceptable operating temperature limits. From the last module of the power train cooling circuit 213 of the electrically powered vehicle (i.e. from the heat exchanger 216), and from the second module of the electric battery cooling circuit 219 (i.e. from the electric battery 217), refrigerant at respective high temperatures are channeled back to the inlet port 281 of the compressor 220 and the cycle is repeated. It may be noted that in this embodiment of the invention, refrigerant may not be channeled through the bypass flow path 234 from the bypass valve 250. Rather, the refrigerant is channeled directly from the compressor 220 to the condenser 230 via the bypass valve 250 for cooling the refrigerant in the condenser 230, and therein delivers pressurized refrigerant to the expansion valve 240.

In an exemplary embodiment, a first inlet valve 225 is in flow communication between the first outlet port 247 of the expansion valve 240 and the inlet port 221 of the at least one cooling channel 210 defined within the air conditioning unit 245. More specifically, the first inlet valve 225 is in flow communication between the first outlet port 247 of the expansion valve 240 and the inlet port 221 of the at least one cooling channel 210 defined within the air conditioning unit 245 and is electronically connected to a controller (not shown) of the air conditioning unit 245 via a control flow path 235. In an alternate exemplary embodiment, the first inlet valve 225 is electronically connected to the electronic control unit 212 via a control flow path (not shown). Therefore, the controller of the air conditioning unit 245/ electronic control unit 212 controls the flow of liquid refrigerant from the first outlet port 247 of the expansion valve 240 to the inlet port 221 of the at least one cooling channel 210 that is defined within the air conditioning unit 245 for cooling the air conditioning unit 245 by controlling an opening and closing timing/opening and closing percentage of the first inlet valve 225 respectively. More specifically, a temperature sensor (not shown) that is in thermal communication with the at least one mechanical component 218 that is positioned within the air conditioning unit 245 transmits an electronic signal to the controller of the air conditioning unit 245/electronic control unit 212 when it is required to cool the at least one mechanical component 218 that is positioned within the air conditioning unit 245. Therein, the controller of the air conditioning unit 245/ electronic control unit 212 opens the first inlet valve 225, thereby permitting the liquid refrigerant at low temperature from the first outlet port 247 of the expansion valve 240 to be channeled to the inlet port 221 of the at least one cooling channel 210 that is defined within the air conditioning unit 245 for cooling the at least one mechanical component 218 that is positioned within the air conditioning unit 245. Similarly, the temperature sensor that is in thermal communication with the at least one mechanical component 218 that is positioned within the air conditioning unit 245 transmits an electronic signal to the controller of the air conditioning unit 245/electronic control unit 212 when it is not required to cool the at least one mechanical component 218 that is positioned within the air conditioning unit 245. Therein, the electronic control unit 212/controller of the air conditioning unit 245 closes the first inlet valve 225, thereby not permitting the liquid refrigerant at low temperature from the first outlet port 247 of the expansion valve 240 to be channeled to the inlet port 221 of the at least one cooling channel 210 that is defined within the air conditioning unit 245.

In an exemplary embodiment, a second inlet valve 275 is in flow communication between the outlet port 203 of the at least one cooling channel 210 defined within the air conditioning unit 245 as well as the first outlet port 247 of the expansion valve 240 and the inlet port 241 of the cooling chamber 210 defined in the electronic control unit 212. More specifically, the second inlet valve 275 is in flow communication between the outlet port 203 of the at least one cooling channel 210 defined within the air conditioning unit 245 as well as the first outlet port 247 of the expansion valve 240 and the inlet port 241 of the cooling chamber 210 defined in the electronic control unit 212, and is electronically connected to the electronic control unit 212 via a control flow path 277. Therefore, the electronic control unit 212 controls the flow of substantially liquid refrigerant from the outlet port 203 of at least one cooling channel 210 defined within the air conditioning unit 245 as well as liquid refrigerant from the first outlet port 247 of the expansion valve 240 to the inlet port 241 of the cooling chamber 210 that is defined in the electronic control unit 212 for cooling the electronic control unit 212 by controlling an opening and closing timing/opening and closing percentage of the second inlet valve 275 of the electronic control unit 212 respectively. More specifically, a temperature sensor (not shown) that is in thermal communication with the at least one mechanical component 218 that is positioned within the electronic control unit 212 transmits an electronic signal to the electronic control unit 212 when it is required to cool the at least one mechanical component 218 that is positioned within the electronic control unit 212. Therein, the electronic control unit 212 opens the second inlet valve 275, thereby permitting the substantially liquid refrigerant at low temperature from the outlet port 203 of the at least one cooling channel 210 defined within the air conditioning unit 245 as well as from the first outlet port 247 of the expansion valve 240 to be channeled to the inlet port 241 of the cooling chamber 210 that is defined in the electronic control unit 212 for cooling the at least one mechanical component 218 that is positioned within the cooling chamber 210 defined within the electronic control unit 212. Similarly, the temperature sensor that is in thermal communication with the at least one mechanical component 218 that is positioned within the electronic control unit 212 transmits an electronic signal to the electronic control unit 212 when it is not required to cool the at least one mechanical component 218 that is positioned within the electronic control unit 212. Therein, the electronic control unit 212 closes the second inlet valve 275, thereby not permitting the liquid refrigerant at low temperature from the first outlet port 247 of the expansion valve 240 as well as from the outlet port 203 of the at least one cooling channel 210 defined within the air conditioning unit 245 to be channeled to the inlet port 241 of the cooling chamber 210 that is defined in the electronic control unit 212.

In an exemplary embodiment, a directional valve 280 is in flow communication with the power train cooling circuit 213 and the electric battery cooling circuit 219. The directional valve 280 comprises a first refrigerant flow path 286 that is in flow communication between the outlet port 259 of the at least one cooling channel 210 that is defined within the heat exchanger 216 and the inlet port 281 of the compressor 220. When the directional valve 280 is oriented in the configuration as is depicted in FIG. 2, the first refrigerant flow path 286 channels the refrigerant at high temperature that flows from the outlet port 259 of the at least one cooling channel 210 that is defined within the heat exchanger 216 to the inlet port 281 of the compressor 220. Similarly, the directional valve 280 comprises a second refrigerant flow path 287 that is in flow communication between the second outlet port 265 of the expansion valve 240 and the inlet port 260 of the cooling chamber 210 that is defined in the electric battery 217. When the directional valve 280 is oriented in the configuration as is depicted in FIG. 2, the second refrigerant flow path 287 channels the liquid refrigerant at low temperature that flows from the second outlet port 265 of the expansion valve 240 to the inlet port 260 of the cooling chamber 210 that is defined in the electric battery 217, wherein the refrigerant submerges and is in direct contact with the at least one cell 211 that is positioned within the cooling chamber 210 of the electric battery 217.

In an exemplary embodiment, the cooling fan 290 is positioned proximate to the condenser 230. More specifically, the cooling fan 290 that is positioned proximate to the condenser 230 receives power from the at least one module 222 of the electrically powered vehicle such as but not limited to the electric battery 217. In an alternate exemplary embodiment, the cooling fan 290 that is positioned proximate to the condenser 230 receives power from an external power source such as but not limited to a wall mounted electric socket. The functioning of the cooling fan 290 causes a rotation of a plurality of fan blades 293 that are coupled to the cooling fan 290 that is positioned proximate to the condenser 230 and delivers a stream of high-speed cooling air to the condenser 230 to cool the gaseous refrigerant that is received in the condenser 230 from the bypass valve 250 via the first outlet port 232 of the bypass valve 250. More specifically, the condenser 230 is positioned in an air flow path of the cooling fan 290 that is positioned proximate to the condenser 230 and receives the stream of high-speed cooling air that is discharged from the cooling fan 290 and impinges on the outer surface of the condenser 230. The stream of high-speed cooling air that is discharged from the cooling fan 290 that is positioned proximate to the condenser 230 and that impinges on the outer surface of the condenser 230 facilitates withdrawal of heat away from the condenser 230 to the external environment by convection, thereby cooling the gaseous refrigerant that is channeled to the inlet port 231 of the condenser 230 from the bypass valve 250 via the first outlet port 232 of the bypass valve 250 and that flows through the condenser 230. Therefore, the cooling fan 290 facilitates discharging heat from the gaseous refrigerant that flows through the condenser 230. More specifically, the heat that was absorbed by the refrigerant from the power train cooling circuit 213, the heat that was absorbed by the refrigerant from the electric battery cooling circuit 219, and the heat that was absorbed by the refrigerant in the compressor 220 due to compression of the gaseous refrigerant in the compressor 220 is substantially discharged in the condenser 230 due to the stream of high-speed cooling air that is discharged from the cooling fan 290 and that impinges on the outer surface of the condenser 230, thereby withdrawing the heat away from the refrigerant and decreasing the temperature of the gaseous refrigerant that flows through the condenser 230 via the inlet port 231 of the condenser 230 substantially. Therefore, at the outlet port 284 of the condenser 230, substantially gaseous refrigerant at high pressure and at a lower temperature than the higher temperature gaseous refrigerant that was channeled to the inlet port 231 of the condenser 230 is channeled to the next stage (i.e. to the inlet port 283 of the expansion valve 240) of the thermal management system 200 for at least one module 222 of the electrically powered vehicle.

The cooling fan 290 may be mechanically secured to any substrate and positioned in a manner such that the cooling fan 290 is positioned proximate to the condenser 230 and delivers the stream of cooling air to the outer surface of the condenser 230. In an alternate exemplary embodiment, a plurality of fins may be secured to the outer surface of the condenser 230 and receives heat from the outer surface of the condenser 230. The heat that is received by the plurality of fins from the outer surface of the condenser 230 decreases a temperature of the refrigerant that flows through the condenser 230, thereby causing heat from the gaseous refrigerant that flows through the condenser 230 to be discharged to the external environment and substantially cooling the gaseous refrigerant that flows through the condenser 230. In an exemplary embodiment, the condenser 230 is in flow communication with the first outlet port 232 of the bypass valve 250 and receives gaseous refrigerant at high pressure and at high temperature within the condenser 230 via the inlet port 231 of the condenser 230.

The refrigerant that flows through the thermal management system 200 for at least one module 222 of the electrically powered vehicle to cool the at least one module 222 of the electrically powered vehicle that houses the at least one mechanical component 218 therein is of a specific heat absorption capacity/unit mass of the refrigerant that is lesser in contrast to a specific heat absorption capacity/unit mass of high-speed liquid coolant that is of a specific heat absorption capacity/unit mass of high-speed liquid coolant that is greater. In addition, due to the lower specific heat absorption capacity/unit mass of the refrigerant in contrast to the higher specific heat absorption capacity/unit mass of the high-speed liquid coolant, the heat absorption rate/unit mass of the refrigerant is greater than the heat absorption rate/unit mass of the high-speed liquid coolant. Therefore, since the specific heat absorption capacity/unit mass of the refrigerant that flows through at least one module 222 of the electrically powered vehicle is lesser in contrast to the specific heat absorption capacity/unit mass of high-speed liquid coolant that is greater and that the heat absorption rate/unit mass of the refrigerant is greater than the heat absorption rate/unit mass of the high-speed liquid coolant, a lower mass flow rate of liquid refrigerant is required to be channeled through the cooling chamber 210 that is defined in the at least one module 222 of the electrically powered vehicle than that of high-speed liquid coolant. More specifically, the lower mass flow rate of liquid refrigerant is required to be channeled through the cooling chamber 210 that is defined in the at least one module 222 of the electrically powered vehicle to decrease the first temperature of the at least one module 222 of the electrically powered vehicle to the second temperature in contrast to the higher mass flow rate of high-speed liquid coolant that is required to be channeled through the cooling chamber 210 that is defined in the at least one module 222 of the electrically powered vehicle to decrease the first temperature of the at least one module 222 of the electrically powered vehicle that houses the at least one mechanical component 218 therein to the second temperature. Therefore, in order to decrease the temperature of the at least one module 222 of the electrically powered vehicle that houses the at least one mechanical component 218 therein and that is submerged and in direct contact with the refrigerant from the first temperature to the second temperature, a lower mass flow rate of liquid refrigerant is required to be channeled through the cooling chamber 210 that is defined in the at least one module 222 of the electrically powered vehicle to decrease the first temperature of the at least one module 222 of the electrically powered vehicle to the second temperature in contrast to the higher mass flow rate of high-speed liquid coolant that is required to be channeled through the cooling chamber 210 that is defined in the at least one module 222 of the electrically powered vehicle to decrease the first temperature of the at least one module 222 of the electrically powered vehicle to the second temperature. The low specific heat absorption capacity/unit mass of the liquid refrigerant and its high heat absorption rate implies that a low mass flow rate of liquid refrigerant that is channeled through the cooling chamber 210 is sufficient to absorb a substantially same amount of heat from the at least one module 222 of the electrically powered vehicle that houses the at least one mechanical component 218 therein as that of a high mass flow rate of high-speed liquid coolant that has a comparatively high specific heat absorption capacity/unit mass as well as a low heat absorption rate of the liquid coolant to decrease the first temperature of the at least one module 222 of the electrically powered vehicle to the second temperature. In addition, owing to the lower specific heat absorption capacity/unit mass of the refrigerant in contrast to the higher specific heat absorption capacity/unit mass of the high-speed liquid coolant, the heat absorption rate/unit mass of the refrigerant is greater than the heat absorption rate/unit mass of the high-speed liquid coolant. Therefore, direct refrigerant-based cooling for electrically powered vehicles is a much better alternative than liquid coolant based cooling.

In an exemplary embodiment, the electronic control unit 212/controller of the air conditioning unit 245 is adapted to control the flow of refrigerant from the first outlet port 247 of the expansion valve 240 to the inlet port 221 of the at least one cooling channel 210 that is defined within the air conditioning unit 245 via the control flow path 235 that is in electronic communication between the first inlet valve 225 and the electronic control unit 212/controller of the air conditioning unit 245. More specifically, the electronic control unit 212/controller of the air conditioning unit 245 is adapted to control an opening percentage/opening of the first inlet valve 225 based on the temperature of the at least one mechanical component 218 that is positioned within the at least one cooling channel 210 of the air conditioning unit 245 that is received in the electronic control unit 212/controller of the air conditioning unit 245 from the temperature sensor that is in thermal communication with the at least one mechanical component 218 of the air conditioning unit 245. The electronic control unit 212/controller of the air conditioning unit 245 controls the flow of liquid refrigerant at low temperature from the first outlet port 247 of the expansion valve 240 through the at least one cooling channel 210 of the air conditioning unit 245 for cooling the at least one mechanical component 218 that is positioned within the at least one cooling channel 210 of the air conditioning unit 245. After cooling the at least one mechanical component 218 that is positioned within the at least one cooling channel 210 of the air conditioning unit 245, the refrigerant that is at higher temperature than the refrigerant at the first outlet port 247 of the expansion valve 240 as well as a portion of the refrigerant that flows from the first outlet port 247 of the expansion valve 240 is channeled through the cooling chamber 210 of the electronic control unit 212. In an exemplary embodiment, the electronic control unit 212 is adapted to control the flow of refrigerant from the outlet port 203 of the at least one cooling channel 210 that is defined within the air conditioning unit 245 and a portion of refrigerant from the first outlet port 247 of the expansion valve 240 to the inlet port 241 of the cooling chamber 210 that is defined in the electronic control unit 212 via the control flow path 277 that is in electronic communication between the second inlet valve 275 and the electronic control unit 212. More specifically, the electronic control unit 212 is adapted to control an opening percentage/opening of the second inlet valve 275 based on the temperature of the at least one mechanical component 218 that is positioned within the cooling chamber 210 of the electronic control unit 212 that is received in the electronic control unit 212 from the temperature sensor that is in thermal communication with the at least one mechanical component 218 of the electronic control unit 212. The electronic control unit 212 controls the flow of liquid refrigerant at low temperature from the first outlet port 247 of the expansion valve 240 and from the outlet port 203 of the at least one cooling channel 210 that is defined within the air conditioning unit 245 through the cooling chamber 210 defined within the electronic control unit 212 for cooling the at least one mechanical component 218 that is positioned within the cooling chamber 210 defined within the electronic control unit 212. After cooling the at least one mechanical component 218 that is positioned within the cooling chamber 210 defined within the electronic control unit 212, the refrigerant that is at higher temperature than the refrigerant at the inlet port 241 of the electronic control unit 212 is channeled through the power conversion system 208. In another exemplary embodiment, the electronic control unit 212 is adapted to control the cooling fan 290 that delivers the stream of high-speed cooling air to the outer surface of the condenser 230 to cool the refrigerant that is received in the condenser 230 from the first outlet port 232 of the bypass valve 250 via a control flow path 201 that is in electronic communication between the cooling fan 290 and the electronic control unit 212. More specifically, the electronic control unit 212 is adapted to control an operating speed of the cooling fan 290 to control a mass flow rate of high-speed cooling air that is delivered from the cooling fan 290 to the condenser 230 to cool the refrigerant that is received in the condenser 230 to its acceptable operating temperature limits. In a further exemplary embodiment, the electronic control unit 212 is adapted to control the flow of refrigerant from the expansion valve 240 to at least one of the inlet port 221 of the at least one cooling channel 210 that is defined within the air conditioning unit 245 and the inlet port 260 of the cooling chamber 210 that is defined in the electric battery 217 via the control flow path 271 that is in electronic communication between the expansion valve 240 and the electronic control unit 212. More specifically, the electronic control unit 212 controls a mass flow rate of refrigerant that is channeled through the first outlet port 247 of the expansion valve 240 to the inlet port 221 of the at least one cooling channel 210 that is defined within the air conditioning unit 245 via the first inlet valve 225, and a mass flow rate of refrigerant that is channeled through the second outlet port 265 of the expansion valve 240 to the inlet port 260 of the cooling chamber 210 that is defined in the electric battery 217. In yet another exemplary embodiment, the electronic control unit 212 is adapted to control a delivery pressure of the compressor 220 for delivering pressurized refrigerant at high temperature to the bypass valve 250 via the control flow path 273 that is in electronic communication between a pressure regulator (not shown) of the compressor 220 and the electronic control unit 212. More specifically, the electronic control unit 212 controls a delivery pressure of the refrigerant that is channeled from the outlet port 282 of the compressor 220 to the bypass valve 250 based on a pressure requirement of refrigerant in the at least one module 222 of the electrically powered vehicle during each cycle of operation by controlling an opening percentage of the pressure regulator of the compressor 220. The pressure requirement of refrigerant during each cycle of operation of the thermal management system 200 is determined by the electronic control unit 212 from at least one pressure sensor (not shown) that is in electronic communication between the electronic control unit 212 and at least one mechanical component 218 of the at least one module 222 of the electrically powered vehicle via a control flow path.

In another exemplary embodiment, the electronic control unit 212 is adapted to receive a temperature signal that comprises an operating temperature of the at least one cell 211 of the electric battery 217 from a temperature sensor 206 that is in thermal communication with the at least one cell 211 that is positioned within the electric battery 217 via a control flow path 205 that is in electronic communication between the temperature sensor 206 and the electronic control unit 212. More specifically, the electronic control unit 212 controls the quantity of refrigerant that is channeled through the second outlet port 265 of the expansion valve 240 to the inlet port 260 of the cooling chamber 210 that is defined in the electric battery 217 by controlling an opening percentage/opening of the second outlet port 265 of the expansion valve 240 based on the temperature signal that is received by the electronic control unit 212 from the temperature sensor 206 via the control flow path 205. If the temperature of the at least one cell 211 that is positioned within the electric battery 217 is greater than a pre-determined threshold temperature that is defined by a user, the electronic control unit 212 controls the opening percentage/opening of the second outlet port 265 of the expansion valve 240 to channel low temperature refrigerant from the second outlet port 265 of the expansion valve 240 through the inlet port 260 of the cooling chamber 210 that is defined in the electric battery 217. In another exemplary embodiment, the electronic control unit 212 is adapted to control a direction of orientation of the directional valve 280 to channel the refrigerant from the outlet port 259 of the at least one cooling channel 210 that is defined within the heat exchanger 216 to the inlet port 281 of the compressor 220 via the first refrigerant flow path 286 that is defined in the directional valve 280. In addition, the electronic control unit 212 is adapted to control the direction of orientation of the directional valve 280 to channel the refrigerant from the second outlet port 265 of the expansion valve 240 to the inlet port 260 of the cooling chamber 210 that is defined in the electric battery 217 via the second refrigerant flow path 287 that is defined in the directional valve 280.

The direction of orientation of the directional valve 280 is controlled by means of the electronic control unit 212 via a control flow path 207 that is in electronic communication between the directional valve 280 and the electronic control unit 212. More specifically, the electronic control unit 212 controls the direction of orientation of the directional valve 280 via the control flow path 207 to channel the flow of refrigerant from the outlet port 259 of the at least one cooling channel 210 that is defined within the heat exchanger 216 to the inlet port 281 of the compressor 220 via the first refrigerant flow path 286 that is defined in the directional valve 280, and to channel the flow of refrigerant from the second outlet port 265 of the expansion valve 240 to the inlet port 260 of the cooling chamber 210 that is defined in the electric battery 217 via the second refrigerant flow path 287 that is defined in the directional valve 280. In yet another exemplary embodiment, the electronic control unit 212 is adapted to control an autopilot mode of the electronic control unit 212 to operate the electrically powered vehicle in an autopilot mode.

The refrigerant that flows past the at least one mechanical component 218 that is positioned within the cooling chamber 210 defined in the at least one module 222 of the electrically powered vehicle cools the at least one module 222 of the electrically powered vehicle as well as the at least one mechanical component 218 that is positioned within the cooling chamber 210 defined in the at least one module 222 of the electrically powered vehicle. The cooling of the at least one module 222 of the electrically powered vehicle and the at least one mechanical component 218 that is positioned within the cooling chamber 210 defined in the at least one module 222 of the electrically powered vehicle decreases the temperature of the at least one module 222 of the electrically powered vehicle and the at least one mechanical component 218 that is positioned within the cooling chamber 210 defined in the at least one module 222 of the electrically powered vehicle respectively. Therefore, the at least one module 222 of the electrically powered vehicle and the at least one mechanical component 218 that is positioned within the cooling chamber 210 defined in the at least one module 222 of the electrically powered vehicle are maintained within their respective acceptable operating temperature limits, thereby enhancing a longevity and useful life of the at least one mechanical component 218 that is positioned within the cooling chamber 210 defined in the at least one module 222 of the electrically powered vehicle. After liquid refrigerant is channeled through the cooling chamber 210, the at least one module 222 of the electrically powered vehicle and the at least one mechanical component 218 that is positioned within the cooling chamber 210 defined in the at least one module 222 of the electrically powered vehicle may be cooled to different operating temperatures, but still be within the acceptable operating temperature limits of the at least one module 222 of the electrically powered vehicle, as well as the at least one mechanical component 218 that is positioned within the cooling chamber 210 defined within the at least one module 222 of the electrically powered vehicle respectively.

A working of the thermal management system 200 for the at least one module 222 of the electrically powered vehicle is described as an example. In an exemplary embodiment, the refrigerant in the substantially liquid state is received within the at least one cooling channel 210 that is defined within the air conditioning unit 245 via the inlet port 221 that is in flow communication with the at least one cooling channel 210 that is defined within the air conditioning unit 245 from the first outlet port 247 of the expansion valve 240. More specifically, the refrigerant in the substantially liquid state is received within the at least one cooling channel 210 that is defined within the air conditioning unit 245 via the first inlet valve 225. When the electronic control unit 212 determines that the temperature of the at least one mechanical component 218 that is positioned within the at least one cooling channel 210 defined within the air conditioning unit 245 is required to be decreased by means of the temperature sensor that is in thermal communication with the air conditioning unit 245, the electronic control unit 212/controller of the air conditioning unit 245 disengages the first inlet valve 225 to an open position. Liquid refrigerant at low temperature is channeled to the air conditioning unit 245 via the first outlet port 247 of the expansion valve 240 to cool the at least one mechanical component 218 that is positioned within the air conditioning unit 245. Once the liquid refrigerant is channeled within the at least one cooling channel 210 that is defined within the air conditioning unit 245 via the first inlet valve 225 of the air conditioning unit 245, the liquid refrigerant is allowed to flow through the at least one cooling channel 210 that is defined within the air conditioning unit 245 to cool the at least one mechanical component 218 that is positioned within the at least one cooling channel 210 defined within the air conditioning unit 245. More specifically, once the liquid refrigerant flows through the inlet port 221 of the at least one cooling channel 210 that is defined within the air conditioning unit 245, the liquid refrigerant is channeled through the first cooling channel, through the second cooling channel that is in flow communication with the first cooling channel, through the third cooling channel that is in flow communication with the second cooling channel, through the fourth cooling channel that is in flow communication with the third cooling channel, and so on until the refrigerant is channeled through the outlet port 203 of the at least one cooling channel 210 that is in flow communication with the fourth cooling channel or the last cooling channel. The flow of liquid refrigerant through the first cooling channel, through the second cooling channel, through the third cooling channel, through the fourth cooling channel, and so on, and finally through the last cooling channel of the at least one cooling channel 210 that is defined within the air conditioning unit 245 cools the at least one mechanical component 218 that is positioned within the at least one cooling channel 210 defined within the air conditioning unit 245 of the thermal management system 200 for the electrically powered vehicle respectively.

More specifically, as the liquid refrigerant flows through the first cooling channel, through the second cooling channel, through the third cooling channel, through the fourth cooling channel, and so on, and finally through the outlet port 203 of the last cooling channel of the at least one cooling channel 210 respectively, the liquid refrigerant absorbs heat from the at least one mechanical component 218 that is positioned within the at least one cooling channel 210 of the air conditioning unit 245 of the electrically powered vehicle and gets heated due to transfer of heat from the at least one mechanical component 218 that is positioned within the at least one cooling channel 210 defined within the air conditioning unit 245 of the electrically powered vehicle to the liquid refrigerant. More specifically, the liquid refrigerant gets heated due to the transfer of heat from the at least one mechanical component 218 that is positioned within the at least one cooling channel 210 of the air conditioning unit 245 to the liquid refrigerant by convection. The absorption of heat by the liquid refrigerant from the at least one mechanical component 218 that is positioned within the at least one cooling channel 210 defined within the air conditioning unit 245 of the electrically powered vehicle changes the phase of the refrigerant from the liquid phase to the substantially gaseous phase as refrigerant flows through the first cooling channel, through the second cooling channel, through the third cooling channel, through the fourth cooling channel, and so on until the outlet port 203 of the last cooling channel of the at least one cooling channel 210 respectively. Therefore, when the liquid refrigerant enters the inlet port 221 of the first cooling channel of the at least one cooling channel 210, the liquid refrigerant is at low temperature and at low pressure. However, as the liquid refrigerant changes its phase to the substantially gaseous phase during the process of heat absorption from the at least one mechanical component 218 that is positioned within the at least one cooling channel 210 that is defined within the air conditioning unit 245 of the electrically powered vehicle as refrigerant flows through the first cooling channel, through the second cooling channel, through the third cooling channel, through the fourth cooling channel, and so on until the last cooling channel of the at least one cooling channel 210 respectively, the refrigerant that exits from the outlet port 203 of the last cooling channel of the at least one cooling channel 210 is at higher temperature and at low pressure.

As heat flows from the at least one mechanical component 218 that is positioned within the at least one cooling channel 210 defined within the air conditioning unit 245 of the electrically powered vehicle to the refrigerant that flows through the inlet port 221 of the at least one cooling channel 210, through the first cooling channel, through the second cooling channel, through the third cooling channel, through the fourth cooling channel, and so on until the last cooling channel, and through the outlet port 203 of the at least one cooling channel 210, the at least one mechanical component 218 that is positioned within the at least one cooling channel 210 defined within the air conditioning unit 245 of the electrically powered vehicle is substantially cooled from the higher temperature to the lower temperature respectively. The refrigerant that flows from the outlet port 203 of the at least one cooling channel 210 that is defined within the air conditioning unit 245/first outlet port 247 of the expansion valve 240 is channeled to the inlet port 241 of the cooling chamber 210 that is defined in the electronic control unit 212.

When the electronic control unit 212/controller of the air conditioning unit 245 determines that the temperature of the at least one mechanical component 218 that is positioned within the at least one cooling channel 210 that is defined within the air conditioning unit 245 is not required to be decreased by means of the temperature sensor that is positioned within the air conditioning unit 245, the electronic control unit 212/controller of the air conditioning unit 245 engages the first inlet valve 225 to a closed position. Therefore, in the closed position of the first inlet valve 225, liquid refrigerant from the first outlet port 247 of the expansion valve 240 bypasses the air conditioning unit 245 and does not flow through the at least one cooling channel 210 that is defined within the air conditioning unit 245 to cool the at least one mechanical component 218 that is positioned within the at least one cooling channel 210 that is defined within the air conditioning unit 245.

In an exemplary embodiment, the refrigerant in the substantially liquid state is received within the cooling chamber 210 that is defined in the electronic control unit 212 via the inlet port 241 that is in flow communication with the cooling chamber 210 that is defined in the electronic control unit 212 partially from the first outlet port 247 of the expansion valve 240 as well as from the outlet port 203 of the cooling chamber 210 defined within the air conditioning unit 245. More specifically, the refrigerant in the substantially liquid state is received within the cooling chamber 210 that is defined in the electronic control unit 212 via the second inlet valve 275. When the electronic control unit 212 determines that the temperature of the at least one mechanical component 218 that is positioned within the cooling chamber 210 of the electronic control unit 212 is required to be decreased by means of the temperature sensor that is in thermal communication with the at least one mechanical component 218 that is positioned within the electronic control unit 212, the electronic control unit 212 disengages the second inlet valve 275 to an open position. Substantially liquid refrigerant at low temperature is channeled to the electronic control unit 212 via the second inlet valve 275 to cool the at least one mechanical component 218 that is positioned within the cooling chamber 210 of the electronic control unit 212. Once the substantially liquid refrigerant is channeled within the cooling chamber 210 that is defined in the electronic control unit 210 via the second inlet valve 275 of the electronic control unit 212, the substantially liquid refrigerant is allowed to flow through the cooling chamber 210 that is defined in the electronic control unit 212 to cool the electronic control unit 212 and consequently the at least one mechanical component 218 that is positioned within the cooling chamber 210 of the electronic control unit 212.

More specifically, once the substantially liquid refrigerant flows through the inlet port 241 of the cooling chamber 210 that is defined in the electronic control unit 212, the substantially liquid refrigerant is channeled through the cooling chamber 210 until the refrigerant is channeled through the outlet port 243 of the cooling chamber 210. The flow of liquid refrigerant through the cooling chamber 210 that is defined in the electronic control unit 212 cools the electronic control unit 212 of the electrically powered vehicle and the at least one mechanical component 218 that is positioned within the cooling chamber 210 defined in the electronic control unit 212 of the electrically powered vehicle.

More specifically, as the liquid refrigerant flows through the cooling chamber 210, and finally through the outlet port 243 of the cooling chamber 210 respectively, the substantially liquid refrigerant absorbs heat from the at least one mechanical component 218 that is submerged and in direct contact with the refrigerant that flows through the cooling chamber 210 of the electronic control unit 212 of the electrically powered vehicle and gets heated due to transfer of heat from the at least one in the electronic control unit 212 of the electrically powered vehicle to the liquid refrigerant. More specifically, the substantially liquid refrigerant gets heated due to the transfer of heat from the at least one mechanical component 218 that is positioned within the cooling chamber 210 defined in the electronic control unit 212 to the substantially liquid refrigerant by convection. The absorption of heat by the substantially liquid refrigerant from the at least one mechanical component 218 that is submerged and in direct contact with the refrigerant that flows through the cooling chamber 210 defined in the electronic control unit 212 of the electrically powered vehicle changes the phase of the refrigerant from the substantially liquid phase to the substantially gaseous phase as refrigerant flows through the cooling chamber 210 until the outlet port 243 of the cooling chamber 210 respectively. Therefore, when the substantially liquid refrigerant enters the inlet port 241 of the cooling chamber 210, the substantially liquid refrigerant is at low temperature and at low pressure. However, as the substantially liquid refrigerant changes its phase to the substantially gaseous phase during the process of heat absorption from the at least one mechanical component 218 that is submerged and in direct contact with the refrigerant that flows through the electronic control unit 212 of the electrically powered vehicle, the refrigerant that exits from the outlet port 243 of the cooling chamber 210 of the electronic control unit 212 is at higher temperature and at low pressure than at its inlet port 241.

As heat flows from the at least one mechanical component 218 that is positioned within the cooling chamber 210 defined in the electronic control unit 212 of the electrically powered vehicle to the refrigerant that flows through the inlet port 241 of the cooling chamber 210, and through the outlet port 243 of the cooling chamber 210, the at least one mechanical component 218 that is submerged and in direct contact with the refrigerant that flows through the cooling chamber 210 defined in the electronic control unit 212 of the electrically powered vehicle is substantially cooled from the higher temperature to the lower temperature respectively. The refrigerant that flows from the outlet port 243 of the cooling chamber 210 that is defined in the electronic control unit 212 is channeled to the inlet port 244 of the cooling chamber 210 that is defined in the power conversion system 208 that includes at least one of the onboard charger and the DC converter.

When the electronic control unit 212 determines that the temperature of the at least one mechanical component 218 that is positioned within the cooling chamber 210 defined in the electronic control unit 212 is not required to be decreased by means of the temperature sensor that is in thermal communication with the at least one mechanical component 218 that is positioned within the cooling chamber 210 defined in the electronic control unit 212, the electronic control unit 212 engages the second inlet valve 275 to a closed position. Therefore, in the closed position of the second inlet valve 275, substantially liquid refrigerant bypasses the electronic control unit 212 and does not flow into the cooling chamber 210 of the electronic control unit 212 to cool the at least one mechanical component 218 that is positioned within the cooling chamber 210 that is defined in the electronic control unit 212.

In an exemplary embodiment, the refrigerant in the substantially gaseous state is received within the cooling chamber 210 that is defined in the power conversion system 208 that includes at least one of the onboard charger and the DC converter via the inlet port 244 of the cooling chamber 210 that is defined in the power conversion system 208. Substantially gaseous refrigerant at low temperature is channeled to the power conversion system 208 that includes at least one of the onboard charger and the DC converter to cool the at least one mechanical component 218 that is positioned within the cooling chamber 210 that is defined in the onboard charger and the at least one mechanical component 218 that is positioned within the cooling chamber 210 that is defined in the DC converter. Once the substantially gaseous refrigerant is channeled within the cooling chamber 210 via the inlet port 244 of the cooling chamber 210 that is defined in the power conversion system 208 that includes at least one of the onboard charger and the DC converter, the substantially gaseous refrigerant is allowed to flow through the cooling chamber 210 that is defined in the power conversion system 208 that includes at least one of the onboard charger and the DC converter. The substantially gaseous refrigerant cools the power conversion system 208 that includes at least one of the onboard charger and the DC converter, and the at least one mechanical component 218 that is positioned within the cooling chamber 210 defined in the onboard charger and the at least one mechanical component 218 that is positioned within the cooling chamber 210 defined in the DC converter. More specifically, once the substantially gaseous refrigerant flows through the inlet port 244 of the cooling chamber 210 defined in the power conversion system 208 that includes at least one of the onboard charger and the DC converter, the refrigerant is channeled through the cooling chamber 210 until the refrigerant is channeled through the outlet port 229 of the cooling chamber 210. The flow of refrigerant through the cooling chamber 210, and through the outlet port 229 of the cooling chamber 210 defined in the power conversion system 208 that includes at least one of the onboard charger and the DC converter facilitates cooling the power conversion system 208 that includes at least one of the onboard charger and the DC converter of the electrically powered vehicle and the at least one mechanical component 218 that is positioned within the cooling chamber 210 defined in the onboard charger and the at least one mechanical component 218 that is positioned within the cooling chamber 210 defined in the DC converter of the electrically powered vehicle respectively.

More specifically, as the substantially gaseous refrigerant flows through the cooling chamber 210, and finally through the outlet port 229 of the cooling chamber 210 respectively, the substantially gaseous refrigerant absorbs heat from the at least one mechanical component 218 that is positioned within the cooling chamber 210 defined in the onboard charger and the at least one mechanical component 218 that is positioned within the cooling chamber 210 defined in the DC converter of the power conversion system 208 of the electrically powered vehicle. The refrigerant gets heated due to transfer of heat from the at least one mechanical component 218 that is positioned within the cooling chamber 210 defined in the onboard charger and is submerged and in direct contact with the refrigerant and from the at least one mechanical component 218 that is positioned within the cooling chamber 210 defined in the DC converter and is submerged and in direct contact with the refrigerant to the substantially gaseous refrigerant that flows through the power conversion system 208. More specifically, the substantially gaseous refrigerant gets heated due to the transfer of heat from the at least one mechanical component 218 that is positioned within the cooling chamber 210 defined in the onboard charger and is submerged and in direct contact with the refrigerant and the at least one mechanical component 218 that is positioned within the cooling chamber 210 defined in the DC converter and is submerged and in direct contact with the refrigerant to the substantially gaseous refrigerant by convection. The absorption of heat by the substantially gaseous refrigerant from the power conversion system 208 that includes at least one of the onboard charger and the DC converter of the electrically powered vehicle changes the phase of the refrigerant from the substantially gaseous phase to the gaseous phase as refrigerant flows through the cooling chamber 210 and out through the outlet port 229 of the cooling chamber 210. Therefore, when the substantially gaseous refrigerant enters the inlet port 244 of the cooling chamber 210, the substantially gaseous refrigerant is at low temperature and at low pressure. However, as the substantially gaseous refrigerant absorbs heat from the at least one mechanical component 218 that is positioned within the cooling chamber 210 defined in the power conversion system 208 that includes at least one of the onboard charger and the DC converter of the electrically powered vehicle as refrigerant flows through the cooling chamber 210 until the outlet port 229 of the cooling chamber 210 respectively, the refrigerant that exits from the outlet port 229 of the cooling chamber 210 is at higher temperature and at low pressure than at its inlet port 244.

As heat flows from the at least one mechanical component 218 that is positioned within the cooling chamber 210 defined in the onboard charger and the at least one mechanical component 218 that is positioned within the cooling chamber 210 defined in the DC converter of the electrically powered vehicle to the refrigerant that flows through the inlet port 244 of the cooling chamber 210, and through the outlet port 229 of the cooling chamber 210 via the cooling chamber 210, the at least one mechanical component 218 that is positioned within the cooling chamber 210 that is defined in the onboard charger and is submerged and in direct contact with the refrigerant and the at least one mechanical component 218 that is positioned within the cooling chamber 210 that is defined in the DC converter and is submerged and in direct contact with the refrigerant is substantially cooled from the higher temperature to the lower temperature and is within its acceptable operating temperature limits. The refrigerant that flows from the outlet port 229 of the cooling chamber 210 that is defined in the power conversion system 208 that includes at least one of the onboard charger and the DC converter is channeled to the inlet port 248 of the cooling chamber 210 that is defined in the inverter 214 of the electrically powered vehicle.

In an exemplary embodiment, the refrigerant in the gaseous state is received within the cooling chamber 210 defined in the inverter 214 via the inlet port 248 of the cooling chamber 210 defined in the inverter 214. Gaseous refrigerant at low temperature is channeled to the inverter 214 to cool the at least one mechanical component 218 that is positioned within the cooling chamber 210 defined in the inverter 214 and is submerged and in direct contact with the refrigerant. Once the gaseous refrigerant at low temperature is channeled within the cooling chamber 210 defined in the inverter 214 via the inlet port 248 of the cooling chamber 210 defined in the inverter 214, the gaseous refrigerant is allowed to flow through the cooling chamber 210 that is defined in the inverter 214 to facilitate cooling the inverter 214, and consequently the at least one mechanical component 218 that is positioned within the cooling chamber 210 defined in the inverter 214 and is submerged and in direct contact with the refrigerant that flows through the cooling chamber 210 defined in the inverter 214. More specifically, once the gaseous refrigerant flows through the inlet port 248 of the cooling chamber 210 that is defined in the inverter 214, the gaseous refrigerant is channeled through the cooling chamber 210 along its length until the refrigerant is channeled through the outlet port 249 of the cooling chamber 210. The flow of gaseous refrigerant through the cooling chamber 210 and finally through the outlet port 249 of the cooling chamber 210 defined in the inverter 214 facilitates cooling the inverter 214 of the electrically powered vehicle and the at least one mechanical component 218 that is positioned within the cooling chamber 210 defined in the inverter 214 of the electrically powered vehicle and is submerged and in direct contact with the refrigerant that flows through the cooling chamber 210 defined in the inverter 214 respectively.

More specifically, as the gaseous refrigerant flows through the cooling chamber 210 and finally through the outlet port 249 of the cooling chamber 210 respectively, the gaseous refrigerant absorbs heat from the at least one mechanical component 218 that is positioned within the cooling chamber 210 defined in the inverter 214 of the electrically powered vehicle and gets heated due to transfer of heat from the at least one mechanical component 218 that is positioned within the cooling chamber 210 defined in the inverter 214 of the electrically powered vehicle to the gaseous refrigerant that flows through the cooling chamber 210 and that submerges and is in direct contact with the at least one mechanical component 218 that is positioned within the cooling chamber 210. More specifically, the gaseous refrigerant gets heated due to the transfer of heat from the at least one mechanical component 218 that is positioned within the cooling chamber 210 that is defined in the inverter 214 and is submerged and in direct contact with the refrigerant to the gaseous refrigerant by convection. The absorption of heat by the gaseous refrigerant from the at least one in the inverter 214 of the electrically powered vehicle increases the temperature of the gaseous refrigerant as refrigerant flows through the cooling chamber 210 until the outlet port 249 of the cooling chamber 210 defined in the inverter 214 respectively. Therefore, when the gaseous refrigerant enters the inlet port 248 of the cooling chamber 210 defined in the inverter 214, the gaseous refrigerant is at low temperature and at low pressure. However, as the refrigerant absorbs heat from the at least one mechanical component 218 that is positioned within the cooling chamber 210 defined in the inverter 214 of the electrically powered vehicle as refrigerant flows through the cooling chamber 210 until the outlet port 249 of the cooling chamber 210 respectively, the refrigerant that exits from the outlet port 249 of the cooling chamber 210 that is defined in the inverter 214 is at a relatively higher temperature and at low pressure. As heat flows from the at least one mechanical component 218 that is positioned within the cooling chamber 210 of the inverter 214 of the electrically powered vehicle to the gaseous refrigerant that flows through the inlet port 248 of the cooling chamber until the outlet port 249 of the cooling chamber 210, and through the outlet port 249 of the cooling chamber 210 that is defined in the inverter 214, the at least one mechanical component 218 that is positioned within the cooling chamber 210 defined in the inverter 214 and is submerged and in direct contact with the refrigerant is substantially cooled from the higher temperature to the lower temperature respectively that is within its acceptable operating temperature limits. The refrigerant that flows from the outlet port 249 of the cooling chamber 210 that is defined in the inverter 214 is channeled to the inlet port 251 of the cooling chamber 210 that is defined in the electrically powered motor 215.

In an exemplary embodiment, the refrigerant in the gaseous state is received within the cooling chamber 210 that is defined in the electrically powered motor 215 via the inlet port 251 of the cooling chamber 210 that is defined in the electrically powered motor 215. Gaseous refrigerant at low temperature is channeled to the electrically powered motor 215 to cool the at least one mechanical component 218 that is positioned within the cooling chamber 210 that is defined in the electrically powered motor 215 and is submerged and in direct contact with the refrigerant. More specifically, the gaseous refrigerant at low temperature is channeled to the heat exchanger 209 that is in flow communication with the at least one mechanical component 218 that is positioned within the cooling chamber 210 defined in the electrically powered motor 215 and is submerged and in direct contact with the refrigerant. Once the gaseous refrigerant is channeled through the cooling chamber 210 that is defined in the electrically powered motor 215 via the inlet port 251 of the cooling chamber 210 that is defined in the electrically powered motor 215, the gaseous refrigerant is allowed to flow through the cooling chamber 210 that is defined in the electrically powered motor 215 to facilitate cooling the electrically powered motor 215. More specifically, the at least one mechanical component 218 that is positioned within the cooling chamber 210 that is defined in the electrically powered motor 215 and is submerged and in direct contact with the refrigerant is cooled as a consequence of the refrigerant that flows through the cooling chamber 210 that is defined in the electrically powered motor 215. More specifically, once the gaseous refrigerant flows through the inlet port 251 of the cooling chamber 210 that is defined in the electrically powered motor 215, the gaseous refrigerant is channeled through the cooling chamber 210 until the refrigerant is channeled through the outlet port 253 of the cooling chamber 210 that is in flow communication with the cooling chamber 210. The flow of gaseous refrigerant through the cooling chamber 210, and finally through the outlet port 253 of the cooling chamber 210 that is defined in the electrically powered motor 215 facilitates cooling the electrically powered motor 215 of the electrically powered vehicle, and the at least one mechanical component 218 that is positioned within the cooling chamber 210 that is defined in the electrically powered motor 215 of the electrically powered vehicle and is submerged and in direct contact with the refrigerant.

More specifically, as the gaseous refrigerant flows through the cooling chamber 210, and finally through the outlet port 253 of the cooling chamber 210 respectively, the gaseous refrigerant absorbs heat from the at least one mechanical component 218 that is positioned within the cooling chamber 210 that is defined in the electrically powered motor 215 of the electrically powered vehicle and gets heated due to transfer of heat from the at least one mechanical component 218 to the gaseous refrigerant that submerges and is in direct contact with the at least one mechanical component 218. More specifically, the gaseous refrigerant gets heated due to the transfer of heat from the at least one mechanical component 218 that is positioned within the cooling chamber 210 that is defined in the electrically powered motor 215 and is submerged and in direct contact with the refrigerant to the gaseous refrigerant by convection. The absorption of heat by the gaseous refrigerant from the at least one mechanical component 218 of the electrically powered motor 215 of the electrically powered vehicle increases the temperature of the refrigerant as refrigerant flows through the cooling chamber 210 until the outlet port 253 of the cooling chamber 210. Therefore, when the gaseous refrigerant enters the inlet port 251 of the cooling chamber 210, the gaseous refrigerant is at low temperature and at low pressure. However, as the gaseous refrigerant absorbs heat from the at least one mechanical component 218 that is positioned within the cooling chamber 210 defined in the electrically powered motor 215 of the electrically powered vehicle and is submerged and in direct contact with the refrigerant as refrigerant flows through the cooling chamber 210 until the outlet port 253 of the cooling chamber 210 respectively, the refrigerant that exits from the outlet port 253 of the cooling chamber 210 is at higher temperature and at low pressure. As heat flows from the at least one mechanical component 218 that is positioned within the cooling chamber 210 defined in the electrically powered motor 215 of the electrically powered vehicle to the refrigerant that flows through the inlet port 251 of the cooling chamber 210, and through the outlet port 253 of the cooling chamber 210 via the cooling chamber 210, the at least one mechanical component 218 that is positioned within the cooling chamber 210 that is defined in the electrically powered motor 215 and is submerged and in direct contact with the refrigerant is substantially cooled from the higher temperature to the lower temperature respectively that is within its acceptable operating temperature limits. The refrigerant that flows from the outlet port 253 of the cooling chamber 210 that is defined in the electrically powered motor 215 is channeled to the inlet port 257 of the at least one cooling channel 210 that is defined within the heat exchanger 216 containing oil at high temperature that is supplied from at least one of the gearbox (transmission) and the differential of the electrically powered vehicle.

In an exemplary embodiment, the refrigerant in the gaseous state is received within the at least one cooling channel 210 that is defined within the heat exchanger 216 containing oil at high temperature that is supplied from at least one of the gearbox (transmission) and the differential of the electrically powered vehicle via the inlet port 257 of the at least one cooling channel 210 that is defined within the heat exchanger 216. Gaseous refrigerant at low temperature is channeled to the at least one cooling channel 210 that is defined within the heat exchanger 216 to cool the oil at high temperature that is supplied from at least one of the gearbox (transmission) and the differential of the electrically powered vehicle and is present within the cooling chamber of the heat exchanger 216. Once the gaseous refrigerant is channeled within the at least one cooling channel 210 that is defined within the heat exchanger 216 via the inlet port 257 of the at least one cooling channel 210 that is defined within the heat exchanger 216, the gaseous refrigerant is allowed to flow through the at least one cooling channel 210 that is defined within the heat exchanger 216 to cool the oil at high temperature that is supplied from at least one of the gearbox (transmission) and the differential of the electrically powered vehicle to the cooling chamber of the heat exchanger 216 and that surrounds the at least one cooling channel 210. More specifically, once the gaseous refrigerant flows through the inlet port 257 of the at least one cooling channel 210 that is defined within the heat exchanger 216, the gaseous refrigerant is channeled through the first cooling channel, through the second cooling channel that is in flow communication with the first cooling channel, through the third cooling channel that is in flow communication with the second cooling channel, through the fourth cooling channel that is in flow communication with the third cooling channel, and so on until the refrigerant is channeled through the outlet port 259 of the last cooling channel of the at least one cooling channel 210 that is in flow communication with the fourth cooling channel. The flow of gaseous refrigerant through the first cooling channel, through the second cooling channel, through the third cooling channel, through the fourth cooling channel, and so on, and finally through the outlet port 259 of the last cooling channel of the at least one cooling channel 210 that is defined within the heat exchanger 216 containing oil in the cooling chamber at high temperature that is supplied from at least one of the gearbox (transmission) and the differential of the electrically powered vehicle facilitates cooling the oil at high temperature that is supplied from at least one of the gearbox (transmission) and the differential of the electrically powered vehicle.

More specifically, as the gaseous refrigerant flows through the first cooling channel, through the second cooling channel, through the third cooling channel, through the fourth cooling channel, and so on, and finally through the outlet port 259 of the last cooling channel of the at least one cooling channel 210, the gaseous refrigerant absorbs heat from the oil at high temperature that is supplied from at least one of the gearbox (transmission) and the differential of the electrically powered vehicle and gets heated due to transfer of heat from the oil at high temperature present in the cooling chamber to the gaseous refrigerant. More specifically, the gaseous refrigerant gets heated due to the transfer of heat from the oil at high temperature present in the cooling chamber to the gaseous refrigerant that flows through the at least one cooling channel 210 defined within the heat exchanger 216 by convection. The absorption of heat by the gaseous refrigerant from the oil at high temperature increases the temperature of the gaseous refrigerant as gaseous refrigerant flows through the first cooling channel, through the second cooling channel, through the third cooling channel, through the fourth cooling channel, and so on until the outlet port 259 of the last cooling channel of the at least one cooling channel 210 respectively. Therefore, when the gaseous refrigerant enters the inlet port 257 of the at least one cooling channel 210, the gaseous refrigerant is at low temperature and at low pressure. However, as the gaseous refrigerant absorbs heat from the oil at high temperature that is supplied from at least one of the gearbox (transmission) and the differential of the electrically powered vehicle to the heat exchanger 216 as refrigerant flows through the first cooling channel, through the second cooling channel, through the third cooling channel, through the fourth cooling channel, and so on until the outlet port 259 of the last cooling channel of the at least one cooling channel 210 respectively, the refrigerant that exits from the outlet port 259 of the last cooling channel of the at least one cooling channel 210 is at a higher temperature and at low pressure than at its inlet port 257. As heat flows from the oil at high temperature that is supplied from at least one of the gearbox (transmission) and the differential of the electrically powered vehicle to the refrigerant that flows through the inlet port 257 of the at least one cooling channel 210, through the first cooling channel, through the second cooling channel, through the third cooling channel, through the fourth cooling channel, and so on until the outlet port 259 of the at least one cooling channel 210, and through the outlet port 259 of the last cooling channel of the at least one cooling channel 210, the oil at high temperature is substantially cooled from the higher temperature to the lower temperature respectively. The gaseous refrigerant at high temperature that flows from the outlet port 259 of the last cooling channel of the at least one cooling channel 210 that is defined within the heat exchanger 216 is channeled to the first refrigerant flow path 286 that is defined in the directional valve 280.

The first refrigerant flow path 286 that is defined in the directional valve 280 is in flow communication between the outlet port 259 of the at least one cooling channel 210 that is defined within the heat exchanger 216 and the inlet port 281 of the compressor 220. When the directional valve 280 is oriented in the configuration that is depicted in FIG. 2, the first refrigerant flow path 286 that is defined in the directional valve 280 channels the gaseous refrigerant at high temperature that flows from the outlet port 259 of the at least one cooling channel 210 that is defined within the heat exchanger 216 to the inlet port 281 of the compressor 220.

In addition, the second refrigerant flow path 287 that is defined in the directional valve 280 is in flow communication with the second outlet port 265 of the expansion valve 240 and receives refrigerant in the substantially liquid state. The second refrigerant flow path 287 defined in the directional valve 280 is in flow communication between the second outlet port 265 of the expansion valve 240 and the inlet port 260 of the cooling chamber 210 defined in the electric battery 217. When the directional valve 280 is oriented in the configuration that is depicted in FIG. 2, the second refrigerant flow path 287 channels the liquid refrigerant at low temperature that flows from the second outlet port 265 of the expansion valve 240 to the inlet port 260 of the cooling chamber 210 that is defined in the electric battery 217.

In an exemplary embodiment, the refrigerant in the liquid state at low temperature is received at the inlet port 260 of the cooling chamber 210 that is defined in the electric battery 217 that includes at least one cell 211 that is positioned within the electric battery 217. In an exemplary embodiment, once the refrigerant is received at the inlet port 260 of the cooling chamber 210 that is defined in the electric battery 217, the refrigerant flows through the cooling chamber 210 and submerges and is in direct contact with the at least one cell 211 that is positioned within the cooling chamber 210 of the electric battery 217. Within the cooling chamber 210, at least one cell 211 is positioned therein and discharges heat to the refrigerant that is channeled through the cooling chamber 210 of the electric battery 217. The cooling chamber 210 culminates at the outlet port 266 that channels refrigerant that flows through the cooling chamber 210 to the outlet port 266 of the cooling chamber 210. In an exemplary embodiment, liquid refrigerant at low temperature is channeled to the electric battery 217 that includes at least one cell 211 at high temperature that is positioned within the cooling chamber 210 that is defined in the electric battery 217 to cool the at least one cell 211 that is positioned within the cooling chamber 210 that is defined in the electric battery 217 by submerging and being in direct physical contact with the at least one cell 211.

Once the liquid refrigerant at low temperature is channeled within the cooling chamber 210 via the inlet port 260 of the cooling chamber 210 that is defined in the electric battery 217, the liquid refrigerant at low temperature is allowed to flow through the cooling chamber 210 that is defined in the electric battery 217 to facilitate cooling the at least one cell 211 at high temperature that is positioned within the cooling chamber 210 defined in the electric battery 217 and is submerged and in direct contact with the refrigerant. More specifically, once the liquid refrigerant at low temperature flows through the inlet port 260 of the cooling chamber 210 defined in the electric battery 217 to cool at least one cell 211 at high temperature that is positioned within the cooling chamber 210 defined in the electric battery 217 and is submerged and in direct contact with the refrigerant, the refrigerant is channeled through the cooling chamber 210 until the refrigerant is channeled through the outlet port 266 of the cooling chamber 210 that is in flow communication with the cooling chamber 210. The flow of refrigerant through the cooling chamber 210, and finally through the outlet port 266 of the cooling chamber 210 that is defined in the electric battery 217 that includes at least one cell 211 at high temperature that is positioned within the cooling chamber 210 and is submerged and in direct contact with the refrigerant facilitates cooling the electric battery 217 that includes at least one cell 211 at high temperature that is positioned within the cooling chamber 210 that is defined in the electric battery 217. In addition, the at least one cell 211 at high temperature that is positioned within the cooling chamber 210 that is defined in the electric battery 217 and is submerged and in direct contact with the refrigerant that is present in the cooling chamber 210 that is defined in the electric battery 217 is also cooled from its high temperature to the temperature that is within its acceptable operating temperature limits. Therefore, an overall longevity, useful life, as well as mileage obtained/each full charge of the electric battery 217 may be substantially increased. In addition, the operating efficiency of the electric battery 217 may be substantially enhanced due to the direct cooling of the at least one cell 211 by the refrigerant that submerges and is in direct contact with the at least one cell 211 in contrast to indirect cooling methodologies known in the art.

More specifically, as the liquid refrigerant at low temperature flows through the cooling chamber 210, and finally through the outlet port 266 of the cooling chamber 210, the liquid refrigerant at low temperature absorbs heat from the at least one cell 211 at high temperature that is positioned within the cooling chamber 210 that is defined in the electric battery 217 of the electrically powered vehicle and is submerged and in direct contact with the refrigerant, and gets heated due to transfer of heat from the at least one cell 211 at high temperature that is positioned within the cooling chamber 210 that is defined in the electric battery 217 of the electrically powered vehicle to the refrigerant. More specifically, the liquid refrigerant at low temperature gets heated due to the transfer of heat from the at least one cell 211 at high temperature that is positioned within the cooling chamber 210 that is defined in the electric battery 217 and is submerged and in direct contact with the refrigerant to the liquid refrigerant at low temperature that flows through the inlet port 260 of the cooling chamber 210 that is defined in the electric battery 217 by convection. The absorption of heat by the liquid refrigerant at low temperature from the at least one cell 211 at high temperature that is positioned within the cooling chamber 210 that is defined in the electric battery 217 of the electrically powered vehicle and is submerged and in direct contact with the refrigerant changes the phase of the refrigerant from the liquid phase to the gaseous phase as refrigerant flows through the cooling chamber 210 until the outlet port 266 of the cooling chamber 210 respectively. Therefore, when the liquid refrigerant at low temperature enters the inlet port 260 of the cooling chamber 210 that is defined in the electric battery 217, the liquid refrigerant is at low temperature and at low pressure. However, as the liquid refrigerant absorbs heat from the at least one cell 211 at high temperature that is positioned within the cooling chamber 210 defined in the electric battery 217 of the electrically powered vehicle, the gaseous refrigerant that exits from the outlet port 266 of the cooling chamber 210 that is defined in the electric battery 217 is at a higher temperature and at low pressure than at its inlet port 260. As heat flows from the at least one cell 211 at high temperature that is positioned within the cooling chamber 210 defined in the electric battery 217 of the electrically powered vehicle and is submerged and in direct contact with the refrigerant to the refrigerant that flows through the inlet port 260 of the cooling chamber 210 until the outlet port 266 of the cooling chamber 210, and through the outlet port 266 of the cooling chamber 210, the at least one cell 211 at high temperature that is positioned within the cooling chamber 210 defined in the electric battery 217 is substantially cooled from the higher temperature to the lower temperature and is within its acceptable operating temperature limits. The refrigerant that flows from the outlet port 266 of the cooling chamber 210 that is defined in the electric battery 217 is subsequently channeled to the inlet port 281 of the compressor 220 for compression.

The refrigerant that flows through the first refrigerant flow path 286 that is defined in the directional valve 280 and from the outlet port 266 of the cooling chamber 210 that is defined in the electric battery 217 of the electrically powered vehicle which is in the gaseous state at high temperature and at low pressure are channeled to the inlet port 281 of the compressor 220. Once the gaseous refrigerant is received in the compressor 220 from these two modules, the gaseous refrigerant is compressed in the compressor 220 from a pressure that is equal to the algebraic sum of the pressure of the refrigerant at the outlet port 266 of the cooling chamber 210 that is defined in the electric battery 217 and at the outlet port 259 of the at least one cooling channel 210 that is defined within the heat exchanger 216 to a higher pressure that is required for the refrigerant to be circulated through the thermal management system 200 for the at least one module 222 of the electrically powered vehicle. Therefore, as the gaseous refrigerant at high temperature and at low pressure flows through the compressor 220 via its inlet port 281, the compressor 220 increases the pressure of the refrigerant from the lower pressure to the higher pressure with a corresponding large increase in temperature of the refrigerant. Therefore, at the outlet port 282 of the compressor 220, the gaseous refrigerant is at a higher temperature than the gaseous refrigerant that is channeled to the inlet port 281 of the compressor 220 from the outlet port of the cooling chamber 210 that is defined in the at least one module 222 of the electrically powered vehicle, and at a higher pressure than the gaseous refrigerant that is channeled to the inlet port 281 of the compressor 220 from the outlet port of the cooling chamber 210 that is defined in the at least one module 222 of the electrically powered vehicle.

The refrigerant at the outlet port 282 of the compressor 220 that is in the gaseous state at high temperature and at high pressure is channeled via the pressure regulator to the inlet port 231 of the condenser 230 via the bypass valve 250. Once the gaseous refrigerant is received in the condenser 230 via its inlet port 231, heat that is present within the gaseous refrigerant that was absorbed by the refrigerant that was channeled through the cooling chamber 210 that is defined in the at least one module 222 of the electrically powered vehicle from the at least one mechanical component 218 that is positioned within the cooling chamber 210 that is defined in the at least one module 222 of the electrically powered vehicle, and the heat that was absorbed by the refrigerant in the compressor 220 while the gaseous refrigerant was compressed in the compressor 220 is substantially dissipated in the condenser 230. More specifically, the cooling fan 290 that is positioned proximate to the condenser 230 receives rotational torque from the electrically powered motor 215 that receives electric energy from the external power source such as but not limited to the electric battery 217 and the wall mounted electric socket. Alternatively, the cooling fan 290 that is positioned proximate to the condenser 230 receives electric energy from the electric power source such as but not limited to the electric battery 217 and the wall mounted electric socket. Therein, the cooling fan 290 that is positioned proximate to the condenser 230 rotates, thereby channeling cooling air to the outer surface of the condenser 230. The cooling air from the cooling fan 290 that impinges on the outer surface of the condenser 230 withdraws heat away from the gaseous refrigerant that flows through a plurality of coiled channels 204 that are each defined in the condenser 230. More specifically, the plurality of coiled channels 204 are in flow communication with the inlet port 231 of the condenser 230 at its one end and in flow communication with the outlet port 284 of the condenser 230 at its opposite second end and channels gaseous refrigerant through the condenser 230 in order to discharge heat from the gaseous refrigerant that flows through the condenser 230. The coiled nature of the plurality of coiled channels 204 increases a length of travel of the gaseous refrigerant as refrigerant flows along a longitudinal length of the condenser 230, thereby facilitating discharging heat from the gaseous refrigerant in the condenser 230 effectively. Due to heat from the gaseous refrigerant that is channeled away from the condenser 230 by the cooling air that is discharged by the cooling fan 290 and that impinges on the outer surface of the condenser 230, the temperature of the refrigerant that flows through the plurality of coiled channels 204 defined within the condenser 230 from the inlet port 231 of the condenser 230 to the outlet port 284 of the condenser 230 is decreased substantially from the higher temperature of the refrigerant at the inlet port 231 of the condenser 230 to a lower temperature of the refrigerant at the outlet port 284 of the condenser 230. While the temperature of the refrigerant decreases substantially from the higher temperature at the outlet port 282 of the compressor 220 to the lower temperature as the refrigerant flows through the plurality of coiled channels 204 that are defined in the condenser 230, the pressure of the refrigerant as refrigerant flows through the plurality of coiled channels 204 that are defined in the condenser 230 remains steady or decreases to a slightly lower pressure from the high pressure gaseous refrigerant that is channeled from the outlet port 282 of the compressor 220 to the inlet port 231 of the condenser 230 via the bypass valve 250. Therefore, at the outlet port 284 of the condenser 230, the gaseous refrigerant is at a relatively much lower temperature than that of the gaseous refrigerant that is channeled to the inlet port 231 of the condenser 230 from the outlet port 282 of the compressor 220, and at a substantially same pressure or slightly lower pressure as that of the gaseous refrigerant that is channeled to the inlet port 231 of the condenser 230 from the outlet port 282 of the compressor 220 via the bypass valve 250.

The refrigerant at the outlet port 284 of the condenser 230 which is in the gaseous state at low temperature and at high pressure is channeled to the inlet port 283 of the expansion valve 240. The expansion valve 240 is in flow communication with the outlet port 284 of the condenser 230 at its inlet port 283 and receives refrigerant that flows from the condenser 230 via the outlet port 284 of the condenser 230. Once the refrigerant is received at the inlet port 283 of the expansion valve 240 in the substantially gaseous state, the expansion valve 240 throttles the gaseous refrigerant, thereby decreasing the pressure of the refrigerant that exits from the outlet port 284 of the condenser 230 to a much lower pressure that exits from at least one of the first outlet port 247 and the second outlet port 265 of the expansion valve 240 respectively. Due to the substantial decrease in the pressure of the refrigerant due to the throttling action of the expansion valve 240, the temperature of the refrigerant is decreased from the low temperature at the inlet port 283 of the expansion valve 240 to a relatively much lower temperature that exits from at least one of the first outlet port 247 and the second outlet port 265 of the expansion valve 240 respectively. The expansion valve 240 is in flow communication with each inlet port of each cooling chamber 210 defined in each at least one module 222 of the electrically powered vehicle at its first outlet port 247 and at its second outlet port 265 respectively. The expansion valve 240 controls a flow of refrigerant that flows through the outlet port 284 of the condenser 230 to the inlet port of the cooling chamber 210 that is defined in the at least one module 222 of the electrically powered vehicle, wherein the expansion valve 240 is electronically controlled by means of the electronic control unit 212 that is in electronic communication with the expansion valve 240 via the control flow path 271. More specifically, the electronic control unit 212 controls the opening percentage/opening of the expansion valve 240 to facilitate regulating a required mass flow rate of the refrigerant that is required to flow from the outlet port 284 of the condenser 230 to the inlet port of the cooling chamber 210 that is defined in the at least one module 222 of the electrically powered vehicle for the refrigerant to be circulated through the thermal management system 200 for the at least one module 222 of the electrically powered vehicle via the first outlet port 247 and via the second outlet port 265 of the expansion valve 240 respectively.

As the pressure and the temperature of the refrigerant decreases from higher pressure and lower temperature at the outlet port 284 of the condenser 230 to lower pressure and much lower temperature that is required for the refrigerant to be circulated through the thermal management system 200 for the at least one module 222 of the electrically powered vehicle, the refrigerant changes its phase to the substantially liquid phase due to the decrease in the temperature of the refrigerant below the phase transition temperature of the refrigerant that flows through the first outlet port 247 and through the second outlet port 265 of the expansion valve 240 to each inlet port of each cooling chamber 210 that is defined in each at least one module 222 of the electrically powered vehicle. Moreover, the throttling of the refrigerant that flows through the outlet port 284 of the condenser 230 to each inlet port of each cooling chamber 210 that is defined in each at least one module 222 of the electrically powered vehicle via the expansion valve 240 that is controlled by the electronic control unit 212 via the control flow path 271 permits only the required mass flow rate of refrigerant to be channeled at high-speed through each inlet port of each cooling chamber 210 that is defined in each at least one module 222 of the electrically powered vehicle. Therefore, at the first outlet port 247 of the expansion valve 240 and at the second outlet port 265 of the expansion valve 240, substantially liquid refrigerant is at lower pressure than that of the refrigerant that is channeled to the inlet port 283 of the expansion valve 240 from the outlet port 284 of the condenser 230 and is at lower temperature than that of the refrigerant that is channeled to the inlet port 283 of the expansion valve 240 from the outlet port 284 of the condenser 230.

In an exemplary embodiment, the inlet port 221 of the at least one cooling channel 210 defined in the air conditioning unit 245 and the inlet port 260 of the cooling chamber 210 defined in the electric battery 217 of the electrically powered vehicle is in flow communication with the first outlet port 247 and with the second outlet port 265 of the expansion valve 240 respectively, and receives high-speed liquid refrigerant at low pressures and at low temperatures therein. The first outlet port 247 and the second outlet port 265 of the expansion valve 240 may be opened by different opening percentages by the electronic control unit 212 to channel liquid refrigerant at different operating temperatures and pressures through the power train cooling circuit 213 and through the electric battery cooling circuit 219 respectively. After the refrigerant in the substantially liquid state at low pressure and at low temperature is channeled to the inlet port 221 of the at least one cooling channel 210 that is defined within the air conditioning unit 245 and the inlet port 260 of the cooling chamber 210 that is defined in the electric battery 217 of the electrically powered vehicle, the cycle is repeated once more with the flow of liquid refrigerant through at least one of the power train cooling circuit 213 and through the electric battery cooling circuit 219 respectively to cool each at least one mechanical component 218 that is positioned within each cooling chamber 210 that is defined in each of the plurality of modules of the power train cooling circuit 213 and to cool the at least one cell 211 that is positioned within the cooling chamber 210 that is defined in the electric battery 217 of the electric battery cooling circuit 219 of the electrically powered vehicle respectively in the subsequent cycle.

Figure 3:
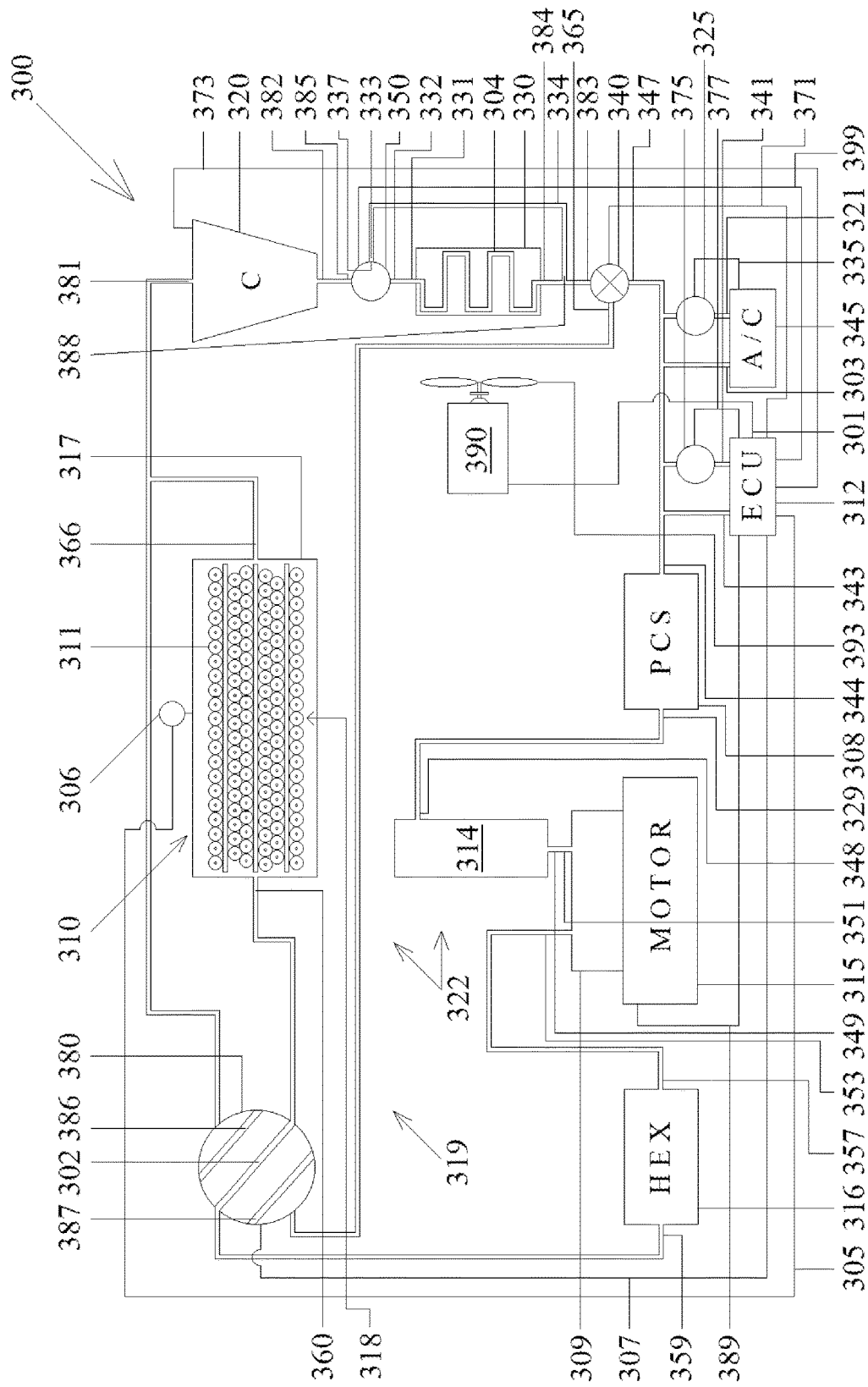
FIG. 3 is a schematic representation of the thermal management system for regulating a temperature of at least one module of the electrically powered vehicle that is in flow communication with the compressor, a bypass valve, and the expansion valve in another embodiment of the invention.

FIG. 3 is a schematic representation of a thermal management system 300 for regulating a temperature of at least one module 322 of an electrically powered vehicle that is in flow communication with the compressor 320, the condenser 330, and the expansion valve 340 in another embodiment of the invention. The thermal management system 300 for regulating the temperature of at least one module 322 of the electrically powered vehicle that is in flow communication with the compressor 320, the condenser 330, and the expansion valve 340 that is depicted in FIG. 3 is similar to the thermal management system 200 for regulating the temperature of at least one module 222 of the electrically powered vehicle that is in flow communication with the compressor 220, the condenser 230, and the expansion valve 240 that is depicted in FIG. 2. The differences between the thermal management system 300 that is depicted in FIG. 3 and the thermal management system 200 that is depicted in FIG. 2 are described below.

An outlet port 349 of the cooling chamber 310 that is defined in the inverter 314 is in flow communication with the inlet port 351 of the cooling chamber 310 defined in the electrically powered motor 315. In an alternate exemplary embodiment, the outlet port 349 of the cooling chamber 310 defined in the inverter 314 is in flow communication with the inlet port 351 of the cooling chamber 310 defined in the heat exchanger 309 that is secured to the electrically powered motor 315 and is in flow communication with the electrically powered motor 315. The flow of refrigerant from the outlet port 349 of the cooling chamber 310 defined in the inverter 314 through the electrically powered motor 315 or through the heat exchanger 309 that is secured to and in flow communication with the electrically powered motor 315 is described below.

In an exemplary embodiment, the cooling chamber 310 that is defined in the electrically powered motor 315 comprises the inlet port 351. More specifically, the inlet port 351 of the cooling chamber 310 that is defined in the electrically powered motor 315 is in flow communication with the outlet port 349 of the cooling chamber 310 that is defined in the inverter 314, and receives refrigerant at low temperature therein. The refrigerant at low temperature that is received via the inlet port 351 of the cooling chamber 310 flows past at least one mechanical component 318 that is positioned within the cooling chamber 310 that is defined in the electrically powered motor 315 and that is submerged and in direct contact with the refrigerant and requires to be cooled, wherein the at least one mechanical component 318 is in mechanical contact with at least one inner wall of the cooling chamber 310. On flowing past the at least one mechanical component 318 that is positioned within the cooling chamber 310 that is defined in the electrically powered motor 315 and absorbing heat from the at least one mechanical component 318 that is submerged and in direct contact with the refrigerant, the refrigerant is channeled through the outlet port 353 of the cooling chamber 310 defined in the electrically powered motor 315. When it is required to increase the temperature of the refrigerant that flows from the outlet port 349 of the inverter 314 further for heating at least one cell 311 that is positioned within the electric battery 317, the at least one mechanical component 318 that is positioned within the electrically powered motor 315 (i.e. the plurality of winding coils of the electrically powered motor 315) is heated by supplying electric power to the plurality of winding coils of the electrically powered motor 315 from one of the electric battery 317 and the wall mounted electric socket. Once the plurality of winding coils of the electrically powered motor 315 are heated, heat is transferred from the plurality of winding coils of the electrically powered motor 315 to the gaseous refrigerant to heat the gaseous refrigerant that flows from the outlet port 349 of the cooling chamber 310 that is defined in the inverter 314 to the inlet port 351 of the cooling chamber 310 that is defined in the electrically powered motor 315 and through the cooling chamber 310 defined in the electrically powered motor 315. More specifically, the electronic control unit 312 is in electronic communication with a controller (not shown) that is connected to the plurality of winding coils of the electrically powered motor 315 via a control flow path 389. When it is required to heat the plurality of winding coils of the electrically powered motor 315 that are submerged and in direct contact with the refrigerant in order to further increase the temperature of the gaseous refrigerant that flows through the electrically powered motor 315, the electronic control unit 312 transmits an electronic signal to the controller that is in electronic communication with the plurality of winding coils of the electrically powered motor 315 via the control flow path 389, thereby causing the plurality of winding coils of the electrically powered motor 315 to get heated due to power that flows from one of the electric battery 317 and the wall mounted electric socket to the plurality of winding coils of the electrically powered motor 315. Once the plurality of winding coils of the electrically powered motor 315 are heated, heat is transferred from the plurality of winding coils of the electrically powered motor 315 to the refrigerant that submerges and is in direct contact with the plurality of winding coils and that flows from the outlet port 349 of the cooling chamber 310 that is defined in the inverter 314 to the inlet port 351 of the cooling chamber 310 that is defined in the electrically powered motor 315 and through the cooling chamber 310 that is defined in the electrically powered motor 315. In the exemplary embodiment, the cooling chamber 310 that is defined in the electrically powered motor 315 contains the plurality of winding coils that supply heat to the gaseous refrigerant that flows through the cooling chamber 310 defined in the electrically powered motor 315.

The cooling chamber 310 that is defined in the electrically powered motor 315 contains at least one mechanical component 318 that is positioned within the cooling chamber 310 and that is required to be cooled by the refrigerant that is channeled through the inlet port 351 of the cooling chamber 310. In an exemplary embodiment, the cooling chamber 310 is in flow communication with the outlet port 353 that receives the refrigerant that flows through the cooling chamber 310 defined in the electrically powered motor 315. As the refrigerant that is at low temperature flows from the inlet port 351 of the cooling chamber 310 and circulates through the cooling chamber 310 until the outlet port 353 of the cooling chamber 310 that is in flow communication with the cooling chamber 310, the refrigerant at lower temperature increases in its temperature to a higher temperature as a consequence of absorbing heat from the at least one mechanical component 318 that is positioned within the cooling chamber 310 defined in the electrically powered motor 315. In addition, the electrically powered motor 315 may be heated by supplying electric power to the plurality of winding coils of the electrically powered motor 315 that are submerged and in direct contact with the refrigerant, further heating the refrigerant that flows through the cooling chamber 310 that is defined in the electrically powered motor 315. Thereafter, the refrigerant at the higher temperature is channeled through the outlet port 353 that is in flow communication with the cooling chamber 310 that is defined in the electrically powered motor 315 to the next stage of the thermal management system 300 for the at least one module 322 of the electrically powered vehicle. During the process of refrigerant flow through the cooling chamber 310 until the outlet port 353 of the cooling chamber 310 of the electrically powered motor 315, the at least one mechanical component 318 that is positioned within the cooling chamber 310 and is submerged and in direct contact with the refrigerant is cooled as a consequence of direct heat transfer from the at least one mechanical component 318 to the gaseous refrigerant. Thereby, the at least one mechanical component 318 that is positioned within the cooling chamber 310 of the electrically powered motor 315 and is submerged and in direct contact with the refrigerant is allowed to attain a temperature that is within its acceptable operating temperature limits. Therefore, the flow of refrigerant that is channeled through the inlet port 351 of the cooling chamber 310, and is subsequently channeled through the outlet port 353 of the cooling chamber 310 via the cooling chamber 310 decreases the temperature of the plurality of winding coils that are positioned within the electrically powered motor 315 to the temperature that is within its acceptable operating temperature limits. In an exemplary embodiment, the electrically powered motor 315 includes at least one mechanical component 318 for converting AC current received from the inverter 314 to useful mechanical work and that requires to be cooled by the refrigerant that is channeled through the cooling chamber 310 that is defined in the electrically powered motor 315 and that submerges and is in direct contact with the at least one mechanical component 318.

In an exemplary embodiment, the at least one mechanical component 318 that is positioned within the cooling chamber 310 that is defined in the electrically powered motor 315 and is submerged and in direct contact with the refrigerant may be but is not limited to the electrical and mechanical components that include the plurality of winding coils and a mechanical shaft that are each positioned within the cooling chamber 310 of the electrically powered motor 315 for converting AC current that is received from the inverter 314 to useful mechanical work. In an alternate exemplary embodiment, the at least one mechanical component 318 that is positioned within the cooling chamber 310 that is defined in the electrically powered motor 315 and is submerged and in direct contact with the refrigerant may be any kind of mechanical component that converts AC current to useful mechanical work, and that requires to be cooled from the higher temperature to the lower temperature that is within its acceptable operating temperature limits by means of the refrigerant that is channeled from the inlet port 351 of the cooling chamber 310 that is defined in the electrically powered motor 315 to the outlet port 353 of the cooling chamber 310 that is defined in the electrically powered motor 315 via the cooling chamber 310.

The refrigerant that flows past the at least one mechanical component 318 that is positioned within the cooling chamber 310 defined in the electrically powered motor 315 and is submerged and in direct contact with the refrigerant cools the at least one mechanical component 318 that is positioned within the cooling chamber 310 that is defined in the electrically powered motor 315. The cooling of the at least one mechanical component 318 that is positioned within the cooling chamber 310 that is defined in the electrically powered motor 315 and is submerged and in direct contact with the refrigerant facilitates decreasing the temperature of the electrically powered motor 315 and the at least one mechanical component 318 (i.e. the plurality of winding coils and the mechanical shaft) that is positioned within the cooling chamber 310 defined in the electrically powered motor 315 from the higher temperature to the lower temperature respectively and be within its acceptable operating temperature limits. Thereby, a longevity and useful life of the at least one mechanical component 318 that is positioned within the cooling chamber 310 defined in the electrically powered motor 315 and is submerged and in direct contact with the refrigerant may be substantially increased.

In an exemplary embodiment, the at least one mechanical component 318 that is positioned within the cooling chamber 310 that is defined in the electrically powered motor 315 and is submerged and in direct contact with the refrigerant generates heat due to conversion of AC current that is received from the inverter 314 to useful mechanical work. The heat that is generated by the at least one mechanical component 318 that is positioned within the cooling chamber 310 defined in the electrically powered motor 315 and is submerged and in direct contact with the refrigerant is discharged to the refrigerant that flows through the cooling chamber 310 that is defined in the electrically powered motor 315. Therefore, the refrigerant that flows through the cooling chamber 310 that is defined in the electrically powered motor 315 and that submerges and is in direct contact with the at least one mechanical component 318 cools the at least one mechanical component 318 that is positioned within the cooling chamber 310 defined in the electrically powered motor 315. More specifically, as the refrigerant flows through the cooling chamber 310 defined in the electrically powered motor 315, the heat that is discharged from the at least one mechanical component 318 that is positioned within the cooling chamber 310 defined in the electrically powered motor 315 and is submerged and in direct contact with the refrigerant is absorbed by the gaseous refrigerant that flows through the cooling chamber 310 that is defined in the electrically powered motor 315 by convection as gaseous refrigerant flows from the inlet port 351 of the cooling chamber 310 that is defined in the electrically powered motor 315 to the outlet port 353 of the cooling chamber 310 that is defined in the electrically powered motor 315. Therefore, once the refrigerant flows through the cooling chamber 310 that is defined in the electrically powered motor 315, the refrigerant withdraws heat away from the at least one mechanical component 318 that is positioned within the cooling chamber 310 defined in the electrically powered motor 315. More specifically, as the refrigerant that is at high-speed, low pressure, and low temperature is received at the inlet port 351 of the cooling chamber 310 that is defined in the electrically powered motor 315 and flows through the cooling chamber 310 that is defined in the electrically powered motor 315, heat from the at least one mechanical component 318 that is positioned within the cooling chamber 310 of the electrically powered motor 315 and is submerged and in direct contact with the refrigerant is transferred to the refrigerant at low temperature. The transfer of heat from the at least one mechanical component 318 that is positioned within the cooling chamber 310 of the electrically powered motor 315 and is submerged and in direct contact with the refrigerant to the refrigerant at low temperature that flows through the cooling chamber 310 that is defined in the electrically powered motor 315 increases the temperature of the refrigerant to a higher temperature.

The refrigerant is therein channeled to the outlet port 353 of the cooling chamber 310 at the higher temperature than that of the refrigerant at the low pressure and the lower temperature that is received at the inlet port 351 of the cooling chamber 310 that is defined in the electrically powered motor 315. The outlet port 353 of the cooling chamber 310 that is defined in the electrically powered motor 315 is in flow communication with the inlet port 357 of the at least one cooling channel 310 that is defined within the heat exchanger 316 that contains oil at high temperature present in the cooling chamber 310 that is supplied from at least one of the gearbox (transmission) and the differential of the electrically powered vehicle.

In an exemplary embodiment, the directional valve 380 is in flow communication with the power train cooling circuit 313 and an electric battery heating circuit 319 respectively. The directional valve 380 comprises a third refrigerant flow path 302 that is in flow communication between the outlet port 359 of the at least one cooling channel 310 defined in the heat exchanger 316 and the inlet port 360 of the heating chamber 310 that is defined in the electric battery 317. When the directional valve 380 is oriented in the configuration that is depicted in FIG. 3, the third refrigerant flow path 302 channels the refrigerant at high temperature that flows from the outlet port 359 of the at least one cooling channel 310 that is defined within the heat exchanger 316 to the inlet port 360 of the heating chamber 310 that is defined in the electric battery 317 when it is required to heat the at least one cell 311 that is positioned within the heating chamber 310 that is defined in the electric battery 317. The first refrigerant flow path 386 and the second refrigerant flow path 387 that are each defined in the directional valve 380 are disengaged and are no longer in flow communication between the outlet port 359 of the at least one cooling channel 310 of the heat exchanger 316 and the inlet port 381 of the compressor 320, and between the second outlet port 365 of the expansion valve 340 and the inlet port 360 of the heating chamber 310 defined in the electric battery 317 respectively. Therefore, the first refrigerant flow path 386 and the second refrigerant flow path 387 do not transport refrigerant from the outlet port 359 of the at least one cooling channel 310 that is defined within the heat exchanger 316 to the inlet port 381 of the compressor 320, and from the second outlet port 365 of the expansion valve 340 to the inlet port 360 of the heating chamber 310 that is defined in the electric battery 317 respectively. Rather, gaseous refrigerant at high temperature that is channeled from the outlet port 359 of the at least one cooling channel 310 defined within the heat exchanger 316 to the inlet port 360 of the heating chamber 310 defined in the electric battery 317 heats the at least one cell 311 that is positioned within the electric battery 317, thereby increasing its temperature. Therefore, in the thermal management system 300 for regulating the temperature of at least one module 322 of the electrically powered vehicle that is in flow communication with the compressor 320, the condenser 330, and the expansion valve 340 that is depicted in FIG. 3, the refrigerant from the first outlet port 347 of the expansion valve 340 cools each of the plurality of modules of the power train cooling circuit 313 and heats the electric battery 317 of the electric battery heating circuit 319 that are in flow communication with one another respectively via the third refrigerant flow path 302 that is defined in the directional valve 380. The second outlet port 365 of the expansion valve 340 does not supply gaseous refrigerant as it is in the closed position. More specifically, the electronic control unit 312 controls the second outlet port 365 of the expansion valve 340 to the closed position in this embodiment of the invention.

A working of the thermal management system 300 for the at least one module 322 of the electrically powered vehicle is described as an example. In an exemplary embodiment, the refrigerant in the substantially liquid state is received within the at least one cooling channel 310 that is defined within the air conditioning unit 345 via the inlet port 321 of the at least one cooling channel 310 defined within the air conditioning unit 345 from the first outlet port 347 of the expansion valve 340. More specifically, the refrigerant in the substantially liquid state is received in the at least one cooling channel 310 that is defined within the air conditioning unit 345 via the first inlet valve 325. When the controller of the air conditioning unit 345/electronic control unit 312 determines that a temperature of the at least one mechanical component 318 that is positioned within the at least one cooling channel 310 defined within the air conditioning unit 345 is required to be decreased by means of the temperature sensor that is in thermal communication with the at least one mechanical component 318 that is positioned within the at least one cooling channel 310 defined in the air conditioning unit 345, the controller of the air conditioning unit 345/ electronic control unit 312 disengages the first inlet valve 325 to an open position. Liquid refrigerant at low temperature is channeled to at least one cooling channel 310 of the air conditioning unit 345 via the first inlet valve 325 to cool the at least one mechanical component 318 that is positioned within the at least one cooling channel 310 defined within the air conditioning unit 345. In an exemplary embodiment, the controller of the air conditioning unit 345/electronic control unit 312 is adapted to control the flow of refrigerant from the first outlet port 347 of the expansion valve 340 to the first inlet port 321 of the at least one cooling channel 310 that is defined within the air conditioning unit 345 via the control flow path 335 that is in electronic communication between the first inlet valve 325 and the electronic control unit 312/controller of the air conditioning unit 345. Once the liquid refrigerant is channeled within the at least one cooling channel 310 via the inlet port 321 of the at least one cooling channel 310 defined within the air conditioning unit 345, the liquid refrigerant is allowed to flow through the at least one cooling channel 310 that is defined within the air conditioning unit 345 to cool the at least one mechanical component 318 that is positioned within the at least one cooling channel 310 that is defined within the air conditioning unit 345. More specifically, once the liquid refrigerant flows through the inlet port 321 of the at least one cooling channel 310 defined within the air conditioning unit 345, the liquid refrigerant is channeled through the first cooling channel, through the second cooling channel that is in flow communication with the first cooling channel, through the third cooling channel that is in flow communication with the second cooling channel, through the fourth cooling channel that is in flow communication with the third cooling channel, and so on until the refrigerant is channeled through the outlet port 303 of the last cooling channel of the at least one cooling channel 310 that is in flow communication with the fourth cooling channel. The flow of liquid refrigerant through the first cooling channel, through the second cooling channel, through the third cooling channel, through the fourth cooling channel, and so on, and finally through the outlet port 303 of the last cooling channel of the at least one cooling channel 310 that is defined within the air conditioning unit 345 facilitates cooling the at least one mechanical component 318 that is positioned within the at least one cooling channel 310 that is defined within the air conditioning unit 345 of the electrically powered vehicle to the temperature that is within its acceptable operating temperature limits.

More specifically, as the liquid refrigerant flows through the first cooling channel, through the second cooling channel, through the third cooling channel, through the fourth cooling channel, and so on, and finally through the outlet port 303 of the last cooling channel of the at least one cooling channel 310 respectively, the liquid refrigerant absorbs heat from the at least one mechanical component 318 that is positioned within the at least one cooling channel 310 defined within the air conditioning unit 345 of the electrically powered vehicle and gets heated due to transfer of heat from the at least one mechanical component 318 that is positioned within the at least one cooling channel 310 defined within the air conditioning unit 345 of the electrically powered vehicle to the liquid refrigerant. More specifically, the liquid refrigerant gets heated due to the transfer of heat from the at least one mechanical component 318 that is positioned within the at least one cooling channel 310 defined within the air conditioning unit 345 to the liquid refrigerant by convection. The absorption of heat by the liquid refrigerant from the at least one mechanical component 318 that is positioned within the at least one cooling channel 310 defined within the air conditioning unit 345 of the electrically powered vehicle changes the phase of the refrigerant from the liquid phase to the substantially gaseous phase as refrigerant flows through the first cooling channel, through the second cooling channel, through the third cooling channel, through the fourth cooling channel, and so on until the outlet port 303 of the last cooling channel of the at least one cooling chamber 310 respectively. Therefore, when the liquid refrigerant enters the inlet port 321 of the first cooling channel of the at least one cooling channel 310, the liquid refrigerant is at low temperature and at low pressure. However, as the liquid refrigerant changes its phase to the substantially gaseous phase during the process of heat absorption from the at least one mechanical component 318 that is positioned within the at least one cooling channel 310 defined within the air conditioning unit 345 of the electrically powered vehicle as refrigerant flows through the first cooling channel, through the second cooling channel, through the third cooling channel, through the fourth cooling channel, and so on until the outlet port 303 of the last cooling channel of the at least one cooling channel 310 respectively, the refrigerant that exits from the outlet port 303 of the last cooling channel of the at least one cooling channel 310 is at higher temperature and at low pressure than at its inlet port 321. As heat flows from the at least one mechanical component 318 that is positioned within the at least one cooling channel 310 defined within the air conditioning unit 345 of the electrically powered vehicle to the liquid refrigerant that flows through the inlet port 321 of the at least one cooling channel 310, through the first cooling channel, through the second cooling channel, through the third cooling channel, through the fourth cooling channel, and so on until the outlet port 303 of the last cooling channel of the at least one cooling channel 310, and through the outlet port 303 of the at least one cooling channel 310, the at least one mechanical component 318 that is positioned within the at least one cooling channel 310 defined within the air conditioning unit 345 of the electrically powered vehicle is substantially cooled from the higher temperature to the lower temperature respectively. The temperature of the at least one mechanical component 318 is therefore reduced to the temperature that is within its acceptable operating temperature limits. The refrigerant that flows from the outlet port 303 of the at least one cooling channel 310 that is defined within the air conditioning unit 345 as well as from the first outlet port 347 of the expansion valve 340 is channeled to the inlet port 341 of the cooling chamber 310 that is defined in the electronic control unit 312.

When the electronic control unit 312/controller of the air conditioning unit 345 determines that the temperature of the at least one mechanical component 318 that is positioned within the at least one cooling channel 310 defined within the air conditioning unit 345 is not required to be decreased by means of the temperature sensor positioned within the air conditioning unit 345, the electronic control unit 312/controller of the air conditioning unit 345 controls the first inlet valve 325 to the closed position. Therefore, liquid refrigerant from the first outlet port 347 of the expansion valve 340 bypasses the air conditioning unit 345 and does not flow into the at least one cooling channel 310 defined in the air conditioning unit 345 due to the closure of the first inlet valve 325.

In an exemplary embodiment, the refrigerant in the substantially liquid state is received within the cooling chamber 310 that is defined in the electronic control unit 312 via the inlet port 341 of the cooling chamber 310 defined in the electronic control unit 312 from the outlet port 303 of the at least one cooling channel 310 defined within the air conditioning unit 345 as well as from the first outlet port 347 of the expansion valve 340. More specifically, the refrigerant in the substantially liquid state is received in the cooling chamber 310 that is defined in the electronic control unit 312 via the second inlet valve 375. When the electronic control unit 312 determines that a temperature of the at least one mechanical component 318 that is positioned within the cooling chamber 310 defined in the electronic control unit 312 is required to be decreased by means of the temperature sensor that is in thermal communication with the at least one mechanical component 318, the electronic control unit 312 disengages the second inlet valve 375 to an open position. Liquid refrigerant at low temperature is channeled to the electronic control unit 312 via the second inlet valve 375 to cool the at least one mechanical component 318 that is positioned within the cooling chamber 310 defined in the electronic control unit 312. In an exemplary embodiment, the electronic control unit 312 is adapted to control the flow of refrigerant from the outlet port 303 of the at least one cooling channel 310 defined in the air conditioning unit 345 as well as from the first outlet port 347 of the expansion valve 340 to the inlet port 341 of the cooling chamber 310 that is defined in the electronic control unit 312 via the control flow path 377 that is in electronic communication between the second inlet valve 375 and the electronic control unit 312. Once the liquid refrigerant is channeled within the cooling chamber 310 via the inlet port 341 of the cooling chamber 310 defined in the electronic control unit 312, the liquid refrigerant is allowed to flow through the cooling chamber 310 that is defined in the electronic control unit 312 to cool the electronic control unit 312 as well as the at least one mechanical component 318 that is positioned within the cooling chamber 310 that is defined in the electronic control unit 312. More specifically, once the substantially liquid refrigerant flows through the inlet port 341 of the cooling chamber 310 defined in the electronic control unit 312, the substantially liquid refrigerant is channeled through the cooling chamber 310 until the refrigerant is channeled through the outlet port 343 that is in flow communication with the cooling chamber 310 that is defined in the electronic control unit 312. The flow of substantially liquid refrigerant through the cooling chamber 310 and finally through the outlet port 343 of the cooling chamber 310 that is defined in the electronic control unit 312 facilitates cooling the electronic control unit 312 of the electrically powered vehicle and the at least one mechanical component 318 that is positioned within the cooling chamber 310 that is defined in the electronic control unit 312 of the electrically powered vehicle to the temperature that is within its acceptable operating temperature limits.

More specifically, as the liquid refrigerant flows through the cooling chamber 310, and finally through the outlet port 343 of the cooling chamber 310 respectively, the substantially liquid refrigerant absorbs heat from the at least one mechanical component 318 that is positioned within the cooling chamber 310 defined in the electronic control unit 312 of the electrically powered vehicle that submerges and is in mechanical contact with the at least one mechanical component 318 and gets heated due to transfer of heat from the at least one mechanical component 318 that is positioned within the cooling chamber 310 defined in the electronic control unit 312 of the electrically powered vehicle to the substantially liquid refrigerant. More specifically, the substantially liquid refrigerant gets heated due to the transfer of heat from the at least one mechanical component 318 to the substantially liquid refrigerant by convection. The absorption of heat by the substantially liquid refrigerant from the at least one mechanical component 318 that is positioned within the cooling chamber 310 defined in the electronic control unit 312 of the electrically powered vehicle changes the phase of the refrigerant from the substantially liquid phase to the substantially gaseous phase as refrigerant flows through the cooling chamber 310 until the outlet port 343 of the cooling chamber 310. Therefore, when the liquid refrigerant enters the inlet port 341 of the cooling chamber 310, the substantially liquid refrigerant is at low temperature and at low pressure. However, as the substantially liquid refrigerant changes its phase to the substantially gaseous phase during the process of heat absorption from the at least one mechanical component 318 that is positioned within the cooling chamber 310 that is defined in the electronic control unit 312 of the electrically powered vehicle as refrigerant flows through the cooling chamber 310 until the outlet port 343 of the cooling chamber 310 respectively, the refrigerant that exits from the outlet port 343 of the cooling chamber 310 is at higher temperature and at low pressure. As heat flows from the at least one mechanical component 318 that is positioned within the cooling chamber 310 defined in the electronic control unit 312 of the electrically powered vehicle to the refrigerant that flows through the inlet port 341 of the cooling chamber 310, through the cooling chamber 310 until the outlet port 343 of the cooling chamber 310, and through the outlet port 343 of the cooling chamber 310, the at least one mechanical component 318 that is positioned within the cooling chamber 310 defined in the electronic control unit 312 of the electrically powered vehicle is substantially cooled from the higher temperature to the lower temperature respectively. The temperature of the at least one mechanical component 318 is therefore reduced to the temperature that is within its acceptable operating temperature limits. The refrigerant that flows from the outlet port 343 of the cooling chamber 310 that is defined in the electronic control unit 312 is channeled to the inlet port 344 of the cooling chamber 310 that is defined in the power conversion system 308 that includes at least one of the onboard charger and the DC converter.

When the electronic control unit 312 determines that the temperature of the at least one mechanical component 318 that is positioned within the cooling chamber 310 defined in the electronic control unit 312 is not required to be decreased by means of the temperature sensor that is in thermal communication with the at least one mechanical component 318 that is positioned within the cooling chamber 310 defined in the electronic control unit 312, the electronic control unit 312 controls the second inlet valve 375 to the closed position. Therefore, substantially liquid refrigerant from the at least one cooling channel 310 defined in the air conditioning unit 345 and from the first outlet port 347 of the expansion valve 340 bypasses the electronic control unit 312 and does not flow into the cooling chamber 310 of the electronic control unit 312 due to the closure of the second inlet valve 375.

In an exemplary embodiment, the refrigerant in the substantially gaseous state is received within the cooling chamber 310 that is defined in the power conversion system 308 that includes at least one of the onboard charger and the DC converter via the inlet port 344 of the cooling chamber 310 that is defined in the power conversion system 308 that includes at least one of the onboard charger and the DC converter. Substantially gaseous refrigerant at low temperature is channeled to the power conversion system 308 that includes at least one of the onboard charger and the DC converter to cool the at least one mechanical component 318 that is positioned within the cooling chamber 310 defined in the onboard charger and the at least one mechanical component 318 that is positioned within the cooling chamber 310 defined in the DC converter.

Once the substantially gaseous refrigerant is channeled within the cooling chamber 310 that is defined in the power conversion system 308 that includes at least one of the onboard charger and the DC converter, the substantially gaseous refrigerant is allowed to flow through the cooling chamber 310 that is defined in the power conversion system 308 to facilitate cooling the power conversion system 308 and the at least one mechanical component 318 that is positioned within the cooling chamber 310 defined in the onboard charger and is submerged and in direct contact with the refrigerant as well as the at least one mechanical component 318 that is positioned within the cooling chamber 310 defined in the DC converter and is submerged and in direct contact with the refrigerant. More specifically, once the substantially gaseous refrigerant flows through the inlet port 344 of the cooling chamber 310 that is defined in the power conversion system 308 that includes at least one of the onboard charger and the DC converter, the refrigerant is channeled through the cooling chamber 310 until the refrigerant is channeled through the outlet port 329 of the cooling chamber 310 that is in flow communication with the cooling chamber 310. As the refrigerant flows through the cooling chamber 310 and finally through the outlet port 329 of the cooling chamber 310 that is defined in the power conversion system 308 that includes at least one of the onboard charger and the DC converter, the at least one mechanical component 318 that is submerged and in direct contact with the refrigerant is cooled from the higher temperature to the lower temperature. More specifically, the at least one mechanical component 318 that is positioned within the cooling chamber 310 defined in the onboard charger and is submerged and in direct contact with the refrigerant and the at least one mechanical component 318 that is positioned within the cooling chamber 310 defined in the DC converter and is submerged and in direct contact with the refrigerant of the electrically powered vehicle are cooled to temperatures that are within their acceptable operating temperature limits respectively.

More specifically, as the substantially gaseous refrigerant flows through the cooling chamber 310 and finally through the outlet port 329 of the cooling chamber 310, the substantially gaseous refrigerant absorbs heat from the at least one mechanical component 318 that is positioned within the cooling chamber 310 defined in the onboard charger and is submerged and in direct contact with the refrigerant and the at least one mechanical component 318 that is positioned within the cooling chamber 310 defined in the DC converter and is submerged and in direct contact with the refrigerant of the power conversion system 308 of the electrically powered vehicle and gets heated. This occurs due to the transfer of heat from the at least one mechanical component 318 that is positioned within the cooling chamber 310 defined in the onboard charger and is submerged and in direct contact with the refrigerant and the at least one mechanical component 318 that is positioned within the cooling chamber 310 defined in the DC converter and is submerged and in direct contact with the refrigerant that flows through the power conversion system 308 of the electrically powered vehicle to the substantially gaseous refrigerant. More specifically, the substantially gaseous refrigerant gets heated due to the transfer of heat from the at least one mechanical component 318 that is positioned within the cooling chamber 310 defined in the onboard charger and is submerged and in direct contact with the refrigerant and the at least one mechanical component 318 that is positioned within the cooling chamber 310 defined in the DC converter and is submerged and in direct contact with the refrigerant to the substantially gaseous refrigerant by convection. The absorption of heat by the substantially gaseous refrigerant from the at least one mechanical component 318 that is positioned within the cooling chamber 310 defined in the power conversion system 308 that includes at least one of the onboard charger and the DC converter of the electrically powered vehicle changes the phase of the refrigerant from the substantially gaseous phase to the gaseous phase as refrigerant flows through the cooling chamber 310 until the outlet port 329 of the cooling chamber 310. Therefore, when the substantially gaseous refrigerant enters the inlet port 344 of the cooling chamber 310, the substantially gaseous refrigerant is at low temperature and at low pressure. However, as the refrigerant absorbs heat from the at least one mechanical component 318 that is positioned within the cooling chamber 310 defined in the power conversion system 308 that includes at least one of the onboard charger and the DC converter of the electrically powered vehicle, the refrigerant that exits from the outlet port 329 of the cooling chamber 310 is at a higher temperature than at its inlet port 344 and at low pressure.

As heat flows from the at least one mechanical component 318 that is positioned within the cooling chamber 310 defined in the onboard charger and is submerged and in direct contact with the refrigerant and the at least one mechanical component 318 that is positioned within the cooling chamber 310 defined in the DC converter and is submerged and in direct contact with the refrigerant of the power conversion system 308 of the electrically powered vehicle to the refrigerant that flows through the inlet port 344 of the cooling chamber 310, until the outlet port 329 of the cooling chamber 310 via the cooling chamber 310, and through the outlet port 329 of the cooling chamber 310, the at least one mechanical component 318 that is positioned within the cooling chamber 310 defined in the onboard charger and the at least one mechanical component 318 that is positioned within the cooling chamber 310 defined in the DC converter are each substantially cooled from the higher temperature to the lower temperature respectively. The refrigerant that flows from the outlet port 329 of the cooling chamber 310 that is defined in the power conversion system 308 that includes at least one of the onboard charger and the DC converter is channeled to the inlet port 348 of the cooling chamber 310 that is defined in the inverter 314 of the electrically powered vehicle.

In an exemplary embodiment, the refrigerant in the gaseous state is received within the cooling chamber 310 that is defined in the inverter 314 via the inlet port 348 of the cooling chamber 310 defined in the inverter 314. Gaseous refrigerant at low temperature is channeled to the inverter 314 to cool the at least one mechanical component 318 that is positioned within the cooling chamber 310 defined in the inverter 314. Once the gaseous refrigerant is channeled within the cooling chamber 310 that is defined in the inverter 314 via the inlet port 348 of the cooling chamber 310 defined in the inverter 314, the gaseous refrigerant is allowed to flow through the cooling chamber 310 defined in the inverter 314 to facilitate cooling the inverter 314 and the at least one mechanical component 318 that is positioned within the cooling chamber 310 defined in the inverter 314 and is submerged and in direct contact with the refrigerant that is present in the cooling chamber 310 defined in the inverter 314. More specifically, once the gaseous refrigerant flows through the inlet port 348 of the cooling chamber 310 that is defined in the inverter 314, the gaseous refrigerant is channeled through the cooling chamber 310 until the refrigerant is channeled through the outlet port 349 of the cooling chamber 310 that is in flow communication with the cooling chamber 310. The flow of gaseous refrigerant through the cooling chamber 310, and finally through the outlet port 349 of the cooling chamber 310 that is defined in the inverter 314 facilitates cooling the inverter 314 of the electrically powered vehicle and the at least one mechanical component 318 that is positioned within the cooling chamber 310 defined in the inverter 314 of the electrically powered vehicle and is submerged and in direct contact with the refrigerant to temperatures that are within their respective acceptable operating temperature limits.

More specifically, as the gaseous refrigerant flows through the cooling chamber 310, and finally through the outlet port 349 of the cooling chamber 310 respectively, the gaseous refrigerant absorbs heat from the at least one mechanical component 318 that is positioned within the cooling chamber 310 defined in the inverter 314 of the electrically powered vehicle and is submerged and in direct contact with the refrigerant that is present in the cooling chamber 310 defined in the inverter 314. The gaseous refrigerant gets heated due to transfer of heat from the at least one mechanical component 318 that is positioned within the cooling chamber 310 defined in the inverter 314 of the electrically powered vehicle to the gaseous refrigerant. More specifically, the gaseous refrigerant gets heated due to the transfer of heat from the at least one mechanical component 318 that is positioned within the cooling chamber 310 defined in the inverter 314 and is submerged and in direct contact with the refrigerant to the gaseous refrigerant by convection. The absorption of heat by the gaseous refrigerant from the at least one mechanical component 318 that is positioned within the cooling chamber 310 defined in the inverter 314 of the electrically powered vehicle and is submerged and in direct contact with the refrigerant increases the temperature of the refrigerant as refrigerant flows through the cooling chamber 310 until the outlet port 349 of the cooling chamber 310 defined in the inverter 314. Therefore, when the gaseous refrigerant enters the inlet port 348 of the cooling chamber 310 of the inverter 314, the gaseous refrigerant is at low temperature and at low pressure. However, as the gaseous refrigerant absorbs heat from the at least one mechanical component 318 that is positioned within the cooling chamber 310 defined in the inverter 314 of the electrically powered vehicle as refrigerant flows through the cooling chamber 310 until the outlet port 349 of the cooling chamber 310 respectively, the refrigerant that exits from the outlet port 349 of the cooling chamber 310 defined in the inverter 314 is at higher temperature and at low pressure. As heat flows from the at least one mechanical component 318 that is positioned within the cooling chamber 310 defined in the inverter 314 of the electrically powered vehicle to the gaseous refrigerant that flows through the inlet port 348 of the cooling chamber 310, until the outlet port 349 of the cooling chamber 310, and through the outlet port 349 of the cooling chamber 310, the at least one mechanical component 318 that is positioned within the cooling chamber 310 defined in the inverter 314 is substantially cooled from the higher temperature to the lower temperature respectively. The refrigerant that flows from the outlet port 349 of the cooling chamber 310 that is defined in the inverter 314 is channeled to the inlet port 351 of the cooling chamber 310 that is defined in the electrically powered motor 315.

In an exemplary embodiment, the refrigerant in the gaseous state is received within the cooling chamber 310 that is defined in the electrically powered motor 315 via the inlet port 351 of the cooling chamber 310 defined in the electrically powered motor 315. Gaseous refrigerant at low temperature is channeled to the electrically powered motor 315 to cool the at least one mechanical component 318 that is positioned within the cooling chamber 310 defined in the electrically powered motor 315. More specifically, the gaseous refrigerant at low temperature is channeled to the heat exchanger 309 that is in thermal communication with the at least one mechanical component 318 that is positioned within the cooling chamber 310 defined in the electrically powered motor 315 and is submerged and in direct contact with the refrigerant. Once the gaseous refrigerant is channeled within the cooling chamber 310 that is defined in the electrically powered motor 315 via the inlet port 351 of the cooling chamber 310 that is defined in the electrically powered motor 315, the gaseous refrigerant is allowed to flow through the cooling chamber 310 that is defined in the electrically powered motor 315 to cool the electrically powered motor 315, and the at least one mechanical component 318 that is positioned within the cooling chamber 310 defined in the electrically powered motor 315 respectively. More specifically, once the gaseous refrigerant flows through the inlet port 351 of the cooling chamber 310 that is defined in the electrically powered motor 315, the gaseous refrigerant is channeled through the cooling chamber 310 until the refrigerant is channeled through the outlet port 353 that is in flow communication with the cooling chamber 310. The flow of gaseous refrigerant through the cooling chamber 310, and finally through the outlet port 353 of the cooling chamber 310 that is defined in the electrically powered motor 315 facilitates cooling the electrically powered motor 315 of the electrically powered vehicle and consequently the at least one mechanical component 318 that is positioned within the cooling chamber 310 defined in the electrically powered motor 315 of the electrically powered vehicle and is submerged and in direct contact with the refrigerant that is present in the cooling chamber 310 defined in the electrically powered motor 315 respectively. When it is required to heat the refrigerant further, electric power is supplied from one of the wall mounted electric socket and the electric battery 317 to the plurality of winding coils of the electrically powered motor 315 that are submerged and in direct contact with the refrigerant that is present in the cooling chamber 310 defined in the electrically powered motor 315. The heat from the plurality of winding coils of the electrically powered motor 315 that gets heated due to this electric power that is supplied therein is transferred to the gaseous refrigerant that is channeled through the cooling chamber 310 until the refrigerant is channeled through the outlet port 353 that is in flow communication with the cooling chamber 310 defined in the electrically powered motor 315.

In an exemplary embodiment, heat is transferred directly from the heated plurality of winding coils of the electrically powered motor 314 to the low temperature gaseous refrigerant that flows through the inlet port 351 of the cooling chamber 310 that is defined in the electrically powered motor 315 and that submerges and is in direct contact with the plurality of winding coils of the electrically powered motor 314 in an absence of a cooling medium such as but not limited to cooling oil.

More specifically, as the gaseous refrigerant flows through the cooling chamber 310, and finally through the outlet port 353 of the cooling chamber 310 respectively, the gaseous refrigerant absorbs heat from the at least one mechanical component 318 that is positioned within the cooling chamber 310 defined in the electrically powered motor 315 of the electrically powered vehicle and is submerged and in direct contact with the refrigerant, and gets heated due to transfer of heat from the at least one mechanical component 318 that is positioned within the cooling chamber 310 defined in the electrically powered motor 315 of the electrically powered vehicle to the gaseous refrigerant. More specifically, the gaseous refrigerant gets heated due to the transfer of heat from the at least one mechanical component 318 that is positioned within the cooling chamber 310 defined in the electrically powered motor 315 and is submerged and in direct contact with the refrigerant to the gaseous refrigerant by convection. The absorption of heat by the gaseous refrigerant from the at least one mechanical component 318 that is positioned within the cooling chamber 310 defined in the electrically powered motor 315 of the electrically powered vehicle and is submerged and in direct contact with the refrigerant increases the temperature of the refrigerant as refrigerant flows through the cooling chamber 310 until the outlet port 353 of the cooling chamber 310 respectively. Therefore, when the gaseous refrigerant flows through the inlet port 351 of the cooling chamber 310, the gaseous refrigerant is at low temperature and at low pressure. However, as the gaseous refrigerant absorbs heat from the at least one mechanical component 318 that is positioned within the cooling chamber 310 defined in the electrically powered motor 315 of the electrically powered vehicle as refrigerant flows through the cooling chamber 310 until the outlet port 353 of the cooling chamber 310 respectively, the refrigerant that exits from the outlet port 353 of the cooling chamber 310 that is defined in the electrically powered motor 315 is at higher temperature and at low pressure. As heat flows from the at least one mechanical component 318 that is positioned within the cooling chamber 310 defined in the electrically powered motor 315 of the electrically powered vehicle and is submerged and in direct contact with the refrigerant to the gaseous refrigerant that flows through the inlet port 351 of the cooling chamber 310, until the outlet port 353 of the cooling chamber 310 via the cooling chamber 310, and through the outlet port 353 of the cooling chamber 310, the at least one mechanical component 318 that is positioned within the cooling chamber 310 defined in the electrically powered motor 315 and is submerged and in direct contact with the refrigerant is substantially cooled from the higher temperature to the lower temperature respectively. The refrigerant that flows from the outlet port 353 of the cooling chamber 310 that is defined in the electrically powered motor 315 is channeled to the inlet port 357 of the at least one cooling channel 310 that is defined within the heat exchanger 316 containing oil at high temperature that is supplied from at least one of the gearbox (transmission) and the differential of the electrically powered vehicle.

In an exemplary embodiment, the refrigerant in the gaseous state is received in the at least one cooling channel 310 that is defined within the heat exchanger 316 containing oil at high temperature that is supplied from at least one of the gearbox (transmission) and the differential of the electrically powered vehicle via the inlet port 357 of the first cooling channel of the at least one cooling channel 310 that is defined within the heat exchanger 316. Gaseous refrigerant at low temperature is channeled to the heat exchanger 316 to cool the oil at high temperature that is supplied from at least one of the gearbox (transmission) and the differential of the electrically powered vehicle. Once the gaseous refrigerant is channeled through the at least one cooling channel 310 defined within the heat exchanger 316 via the inlet port 357 of the at least one cooling channel 310 defined within the heat exchanger 316, the gaseous refrigerant is allowed to flow through the at least one cooling channel 310 that is defined within the heat exchanger 316 to facilitate cooling the oil at high temperature that is supplied from at least one of the gearbox (transmission) and the differential of the electrically powered vehicle. More specifically, once the gaseous refrigerant flows through the inlet port 357 of the at least one cooling channel 310 that is defined within the heat exchanger 316, the gaseous refrigerant is channeled through the first cooling channel, through the second cooling channel that is in flow communication with the first cooling channel, through the third cooling channel that is in flow communication with the second cooling channel, through the fourth cooling channel that is in flow communication with the third cooling channel, and so on until the refrigerant is channeled through the outlet port 359 of the last cooling channel of the at least one cooling channel 310 that is in flow communication with the fourth cooling channel. The flow of gaseous refrigerant through the first cooling channel, through the second cooling channel, through the third cooling channel, through the fourth cooling channel, and so on, and finally through the outlet port 359 of the last cooling channel of the at least one cooling channel 310 that is defined within the heat exchanger 316 containing oil at high temperature that is supplied from at least one of the gearbox (transmission) and the differential of the electrically powered vehicle to the heat exchanger 316 facilitates cooling the oil at high temperature to the temperature that is within its acceptable operating temperature limits.

More specifically, as the gaseous refrigerant flows through the first cooling channel, through the second cooling channel, through the third cooling channel, through the fourth cooling channel, and so on, and finally through the outlet port 359 of the last cooling channel of the at least one cooling channel 310 respectively, the gaseous refrigerant absorbs heat from the oil at high temperature that is supplied from at least one of the gearbox (transmission) and the differential of the electrically powered vehicle and gets heated due to transfer of heat from the oil at high temperature to the gaseous refrigerant. More specifically, the gaseous refrigerant gets heated due to the transfer of heat from the oil at high temperature that flows through the heat exchanger to the gaseous refrigerant that flows through the at least one cooling channel 310 by convection. The absorption of heat by the gaseous refrigerant from the oil at high temperature increases the temperature of the refrigerant as refrigerant flows through the first cooling channel, through the second cooling channel, through the third cooling channel, through the fourth cooling channel, and so on until the outlet port 359 of the last cooling channel of the at least one cooling channel 310 respectively. Therefore, when the gaseous refrigerant flows through the inlet port 357 of the first cooling channel of the at least one cooling channel 310, the gaseous refrigerant is at low temperature and at low pressure. However, as the refrigerant absorbs heat from the oil at high temperature that is supplied from at least one of the gearbox (transmission) and the differential of the electrically powered vehicle to the heat exchanger 316 as refrigerant flows through the first cooling channel, through the second cooling channel, through the third cooling channel, through the fourth cooling channel, and so on until the outlet port 359 of the last cooling channel of the at least one cooling channel 310 respectively, the refrigerant that exits from the outlet port 359 of the last cooling channel of the at least one cooling channel 310 is at higher temperature and at low pressure. As heat flows from the oil at high temperature that is supplied from at least one of the gearbox (transmission) and the differential of the electrically powered vehicle to the refrigerant that flows through the inlet port 357 of the at least one cooling channel 310, through the first cooling channel, through the second cooling channel, through the third cooling channel, through the fourth cooling channel, and so on until the outlet port 359 of the at least one cooling channel 310, and through the outlet port 359 of the at least one cooling channel 310, the oil at high temperature present in the heat exchanger 316 is substantially cooled from the higher temperature to the lower temperature respectively. The gaseous refrigerant at high temperature that flows from the outlet port 359 of the at least one cooling channel 310 that is defined within the heat exchanger 316 is channeled to an inlet port of the third refrigerant flow path 302 that is defined in the directional valve 380.

The third refrigerant flow path 302 that is defined in the directional valve 380 is in flow communication between the outlet port 359 of the at least one cooling channel 310 that is defined within the heat exchanger 316 and the inlet port 360 of the heating chamber 310 that is defined in the electric battery 317. When the directional valve 380 is oriented in the configuration that is depicted in FIG. 3, the third refrigerant flow path 302 channels the gaseous refrigerant at high temperature that flows from the outlet port 359 of the at least one cooling channel 310 that is defined within the heat exchanger 316 to the inlet port 360 of the heating chamber 310 that is defined in the electric battery 317. When it is required to heat the at least one cell 311 that is positioned within the heating chamber 310 defined in the electric battery 317 and is submerged and in direct contact with the refrigerant during cold operating conditions of the electrically powered vehicle (e.g. in winter/snow conditions) in order to increase its operating efficiency, the gaseous refrigerant at high temperature that flows from the outlet port 359 of the at least one cooling channel 310 that is defined within the heat exchanger 316 is channeled to the inlet port 360 of the heating chamber 310 that is defined in the electric battery 317. More specifically, when the temperature sensor 306 that is in thermal communication with the at least one cell 311 of the electric battery 317 senses that the temperature of the at least one cell 311 that is submerged and in direct contact with the refrigerant is below a threshold operating temperature and requires to be heated in order to increase its operating efficiency, the temperature sensor 306 transmits an electronic signal to the electronic control unit 312 via the control flow path 305 indicating that the temperature of the at least one cell 311 that is positioned within the cooling chamber 310 of the electric battery 317 is below the threshold operating temperature. The electronic control unit 312 therein controls the orientation of the directional valve 380 from the orientation of the directional valve 280 that is depicted in FIG. 2 to the orientation of the directional valve 380 that is depicted in FIG. 3, where the third refrigerant flow path 302 that is defined in the directional valve 380 is in flow communication between the outlet port 359 of the at least one cooling channel 310 that is defined within the heat exchanger 316 and the inlet port 360 of the heating chamber 310 that is defined in the electric battery 317. The direction of orientation of the directional valve 380 is controlled by means of the electronic control unit 312 via the control flow path 307 that is in electronic communication between the directional valve 380 and the electronic control unit 312. More specifically, the electronic control unit 312 controls the direction of orientation of the directional valve 380 via the control flow path 307 to channel the refrigerant from the outlet port 359 of the at least one cooling channel 310 that is defined within the heat exchanger 316 to the inlet port 360 of the heating chamber 310 that is defined in the electric battery 317 via the third refrigerant flow path 302 that is defined in the directional valve 380. Thereby, gaseous refrigerant at high temperature from the outlet port 359 of the at least one cooling channel 310 that is defined within the heat exchanger 316 that was channeled to the inlet port 281 of the compressor 220 via the first refrigerant flow path 286 that is defined in the directional valve 280 in the orientation of the directional valve 280 that is depicted in FIG. 2 is channeled to the inlet port 360 of the heating chamber 310 that is defined in the electric battery 317 via the third refrigerant flow path 302 that is defined in the directional valve 380, in the orientation of the directional valve 380 that is depicted in FIG. 3.

In addition, the first refrigerant flow path 386 and the second refrigerant flow path 387 that are each defined in the directional valve 380 are disengaged and are no longer in flow communication with the inlet port 381 of the compressor 320 and with the second outlet port 365 of the expansion valve 340 respectively. Therefore, the first refrigerant flow path 386 and the second refrigerant flow path 387 do not transport refrigerant from the outlet port 359 of the at least one cooling channel 310 that is defined within the heat exchanger 316 to the inlet port 381 of the compressor 320, and from the second outlet port 365 of the expansion valve 340 to the inlet port 360 of the heating chamber 310 that is defined in the electric battery 317 respectively. Gaseous refrigerant at high temperature that is channeled from the outlet port 359 of the at least one cooling channel 310 that is defined within the heat exchanger 316 to the inlet port 360 of the heating chamber 310 that is defined in the electric battery 317 via the third refrigerant flow path 302 that is defined in the directional valve 380 heats the at least one cell 311 that is positioned within the heating chamber 310 defined in the electric battery 317 and is submerged and in direct contact with the refrigerant that is present in the heating chamber 310 that is defined in the electric battery 317. Therefore, in the thermal management system 300 for regulating the temperature of at least one module 322 of the electrically powered vehicle that is in flow communication with the compressor 320, with the condenser 330, and with the expansion valve 340 that is depicted in FIG. 3, the refrigerant from the first outlet port 347 of the expansion valve 340 cools each of the plurality of modules of the power train cooling circuit 313 and subsequently heats the electric battery 317 of the electric battery heating circuit 319 that is in flow communication with the power train cooling circuit 313 to each attain temperatures that are within their acceptable operating temperature limits respectively. Therefore, the overall longevity and operational life/each full charge of the electric battery 317 may be substantially increased by deploying the thermal management system 300 for regulating the temperature of at least one module 322 of the electrically powered vehicle.

In an exemplary embodiment, the refrigerant in the gaseous state at high temperature is received within the inlet port 360 of the heating chamber 310 that is defined in the electric battery 317 that includes at least one cell 311 that is positioned within the electric battery 317 and is submerged and in direct contact with the refrigerant that is present in the cooling chamber 310 defined in the electric battery 317. In an exemplary embodiment, once the refrigerant is received within the inlet port 360 of the heating chamber 310 that is defined in the electric battery 317, the inlet port 360 of the heating chamber 310 that is defined in the electric battery 317 channels refrigerant into the heating chamber 310 that is defined in the electric battery 317 such that the gaseous refrigerant at high temperature from the inlet port 360 of the heating chamber 310 is channeled through the heating channel 310. Within the heating chamber 310, at least one cell 311 is positioned therein that is submerged and in direct contact with the refrigerant, and absorbs heat from the refrigerant at high temperature that is channeled through the heating chamber 310 via its inlet port 360. The heating chamber 310 channels refrigerant to the outlet port 366 of the heating chamber 310 that is defined in the electric battery 317 after the refrigerant flows through the heating chamber 310 and absorbs heat from the at least one cell 311 that is positioned within the heating chamber 310 defined in the electric battery 317.

In an exemplary embodiment, gaseous refrigerant at high temperature is channeled to the electric battery 317 that includes at least one cell 311 at low temperature that is positioned within the heating chamber 310 defined in the electric battery 317 to heat the at least one cell 311 that is positioned within the heating chamber 310 defined in the electric battery 317. Once the gaseous refrigerant at high temperature is channeled within the heating chamber 310 via the inlet port 360 of the heating chamber 310 that is defined in the electric battery 317, the gaseous refrigerant at high temperature is allowed to flow through the inlet port 360 of the heating chamber 310 that is defined in the electric battery 317 to facilitate heating the at least one cell 311 at low temperature that is positioned within the heating chamber 310 that is defined in the electric battery 317 and is submerged and in direct contact with the refrigerant that flows through the heating chamber 310 that is defined in the electric battery 317. More specifically, once the gaseous refrigerant at high temperature flows through the inlet port 360 of the heating chamber 310 that is defined in the electric battery 317 to heat the at least one cell 311 at low temperature that is positioned within the heating chamber 310 that is defined in the electric battery 317 and is submerged and in direct contact with the refrigerant that is present in the heating chamber 310 that is defined in the electric battery 317, the refrigerant is channeled through the heating chamber 310 until the refrigerant is channeled through the outlet port 366 of the heating chamber 310. The flow of refrigerant through the heating chamber 310, and finally through the outlet port 366 of the heating chamber 310 that is defined in the electric battery 317 and is submerged and in direct contact with the refrigerant facilitates heating the electric battery 317 that includes at least one cell 311 at low temperature that is positioned within the heating chamber 310 that is defined in the electric battery 317, as well as the at least one cell 311 at low temperature that is positioned within the heating chamber 310 that is defined in the electric battery 317 to temperatures that are within their respective acceptable operating temperature limits.

More specifically, as the gaseous refrigerant at high temperature flows through the heating chamber 310 and finally through the outlet port 366 of the heating chamber 310 respectively, the gaseous refrigerant at high temperature discharges heat to the at least one cell 311 at low temperature that is positioned within the heating chamber 310 that is defined in the electric battery 317 of the electrically powered vehicle and is submerged and in direct contact with the refrigerant. The gaseous refrigerant consequently cools down due to the transfer of heat from the gaseous refrigerant at high temperature to the at least one cell 311 at low temperature that is positioned within the heating chamber 310 that is defined in the electric battery 317 of the electrically powered vehicle. More specifically, the gaseous refrigerant at high temperature cools down due to the transfer of heat to the at least one cell 311 at low temperature that is positioned within the heating chamber 310 that is defined in the electric battery 317 from the gaseous refrigerant at high temperature that flows through the inlet port 360 of the heating chamber 310 that is defined in the electric battery 317 by convection. The discharge of heat by the gaseous refrigerant at high temperature to the at least one cell 311 at low temperature that is positioned within the heating chamber 310 that is defined in the electric battery 317 of the electrically powered vehicle and is submerged and in direct contact with the refrigerant decreases the temperature of the refrigerant from the high temperature to the low temperature as refrigerant flows through the heating chamber 310 until the outlet port 366 of the heating chamber 310. Therefore, when the gaseous refrigerant at high temperature flows through the inlet port 360, the gaseous refrigerant is at high temperature and at low pressure. However, as the gaseous refrigerant discharges heat to the at least one cell 311 at low temperature that is positioned within the heating chamber 310 that is defined in the electric battery 317 of the electrically powered vehicle and is submerged and in direct contact with the refrigerant as refrigerant flows through the heating channel 310 until the outlet port 366 of the heating chamber 310 respectively, the gaseous refrigerant that exits from the outlet port 366 of the heating chamber 310 that is defined in the electric battery 317 is at lower temperature than at its inlet port 360 and at low pressure.

As heat flows to the at least one cell 311 at low temperature that is positioned within the heating chamber 310 that is defined in the electric battery 317 of the electrically powered vehicle from the refrigerant at high temperature that flows through the inlet port 360 of the heating chamber 310 until the outlet port 366 of the heating chamber 310 via the heating chamber 310, and through the outlet port 366 of the heating chamber 310 that is defined in the electric battery 317, the at least one cell 311 at low temperature that is positioned within the heating chamber 310 that is defined in the electric battery 317 and is submerged and in direct contact with the refrigerant is substantially heated from the lower temperature to the higher temperature. The refrigerant that flows from the outlet port 366 of the heating chamber 310 that is defined in the electric battery 317 that includes at least one cell 311 at low temperature that is positioned within the heating chamber 310 defined in the electric battery 317 is channeled to the inlet port 381 of the compressor 320.

The refrigerant that flows from the outlet port 366 of the heating chamber 310 that is defined in the electric battery 317 of the electrically powered vehicle is in the gaseous state at lower temperature due to discharge of heat from the gaseous refrigerant at higher temperature to the at least one cell 311 at low temperature that is positioned within the heating chamber 310 that is defined in the electric battery 317 and at low pressure is channeled to the inlet port 381 of the compressor 320. Once the gaseous refrigerant is received in the compressor 320 via its inlet port 381, the gaseous refrigerant is compressed in the compressor 320 from the pressure that is equal to the pressure of the gaseous refrigerant at the outlet port 366 of the heating chamber 310 that is defined in the electric battery 317 to a higher pressure that is required for the refrigerant to be circulated through the thermal management system 300 for the at least one module 322 of the electrically powered vehicle. Therefore, as the gaseous refrigerant at low temperature and at low pressure flows through the compressor 320 via its inlet port 381, the compressor 320 increases the pressure of the refrigerant from the low pressure to the high pressure with a corresponding large increase in temperature of the refrigerant. Therefore, at the outlet port 382 of the compressor 320, the gaseous refrigerant is at a higher temperature than the gaseous refrigerant that is channeled to the inlet port 381 of the compressor 320 from the outlet port 366 of the heating chamber 310 that is defined in the electric battery 317, and at a higher pressure than the gaseous refrigerant that is channeled to the inlet port 381 of the compressor 320 from the outlet port 366 of the heating chamber 310 that is defined in the electric battery 317.

The refrigerant at the outlet port 382 of the compressor 320 which is in the gaseous state at high temperature and at high pressure is channeled to the inlet port 331 of the condenser 330 via the bypass valve 350. Once the gaseous refrigerant is received within the condenser 330 via its inlet port 331, heat that is present in the gaseous refrigerant that was absorbed by the refrigerant that was channeled through the cooling chamber 310 that is defined in each module of the power train cooling circuit 313, subtracting the heat that was dissipated by the gaseous refrigerant that was channeled through the heating chamber 310 that is defined in the electric battery 317 of the electric battery heating circuit 319, and adding the heat that was absorbed by the gaseous refrigerant in the compressor 320 while the gaseous refrigerant was being compressed in the compressor 320 is substantially dissipated in the condenser 330. More specifically, the cooling fan 390 that is positioned proximate to the condenser 330 receives rotational torque from the electrically powered motor 315 that receives electric power from the external power source such as but not limited to the electric battery 317 and the wall mounted electric socket. Alternatively, the cooling fan 390 receives electric power from the electric battery 317 or the wall mounted electric socket via an electric motor (not shown) of the cooling fan 390 that is an integral mechanical unit of the cooling fan 390. Therein, the plurality of fan blades 393 of the cooling fan 390 that is positioned proximate to the condenser 330 rotates, thereby channeling high-speed cooling air to the outer surface of the condenser 330. The high-speed cooling air from the cooling fan 390 that impinges on the outer surface of the condenser 330 withdraws heat away from the gaseous refrigerant that flows through the plurality of coiled channels 304 that are defined in the condenser 330. More specifically, the plurality of coiled channels 304 are in flow communication with the inlet port 331 of the condenser 330 at its one end and in flow communication with the outlet port 384 of the condenser 330 at its opposite second end and channels gaseous refrigerant at high temperature and at high pressure through the condenser 330 to discharge heat from the gaseous refrigerant in the condenser 330. The coiled nature of the plurality of coiled channels 304 increases the length of travel of the gaseous refrigerant through the longitudinal length of the condenser 330 to facilitate discharging heat from the gaseous refrigerant in the condenser 330 effectively. Due to heat from the gaseous refrigerant that is channeled away by the cooling air that impinges on the outer surface of the condenser 330 and is discharged by the cooling fan 390, the temperature of the gaseous refrigerant that flows through the plurality of coiled channels 304 of the condenser 330 from the inlet port 331 of the condenser 330 to the outlet port 384 of the condenser 330 is substantially decreased from the higher temperature of the refrigerant at the inlet port 331 of the condenser 330 to the lower temperature at the outlet port 384 of the condenser 330 that is required for the refrigerant to be circulated through the thermal management system 300 for the at least one module 322 of the electrically powered vehicle.

In an exemplary embodiment, the electronic control unit 312 is adapted to control a speed of the cooling fan 390 that delivers the stream of cooling air to the condenser 330 to cool the refrigerant that is received in the condenser 330 from the first outlet port 332 of the bypass valve 350 via the control flow path 301 that is in electronic communication between the cooling fan 390 and the electronic control unit 312. The cooling fan 390 causes the rotation of the plurality of fan blades 393 that are coupled to the cooling fan 390 that is positioned proximate to the condenser 330 and delivers the stream of cooling air to the condenser 330 to cool the gaseous refrigerant that is received in the condenser 330. While the temperature of the gaseous refrigerant decreases from the temperature at the outlet port 382 of the compressor 320 to the lower temperature as the gaseous refrigerant flows through the plurality of coiled channels 304 of the condenser 330, the pressure of the refrigerant as refrigerant flows through the plurality of coiled channels 304 of the condenser 330 remains steady or decreases to a slightly lower pressure from the high pressure gaseous refrigerant that is channeled from the outlet port 382 of the compressor 320 to the inlet port 331 of the condenser 330 via the bypass valve 350. Therefore, at the outlet port 384 of the condenser 330, the gaseous refrigerant is at a relatively lower temperature than the gaseous refrigerant that is channeled to the inlet port 331 of the condenser 330 from the outlet port 382 of the compressor 320, and at a substantially same pressure or slightly lower pressure than that of the gaseous refrigerant that is channeled to the inlet port 331 of the condenser 330 from the outlet port 382 of the compressor 320 via the bypass valve 350. In addition, the electronic control unit 312 is in electronic communication with the pressure regulator (not shown) of the compressor 320 via the control flow path 373. More specifically, the electronic control unit 312 controls the opening percentage/opening of the pressure regulator of the compressor 320 by transmitting an electronic signal via the control flow path 373 to facilitate regulating the required mass flow rate of the refrigerant that is to flow from the outlet port 382 of the compressor 320 for the refrigerant to be circulated through the thermal management system 300 for at least one module 322 of the electrically powered vehicle.

In an alternate exemplary embodiment, when it is required to channel a higher temperature refrigerant through the power train cooling circuit 313, the electronic control unit 312 that is in electronic communication with the bypass valve 350 via the control flow path 399 controls the bypass valve 350 to channel the flow of gaseous refrigerant at high temperature from the outlet port 382 of the compressor 320 to the inlet port 385 of the bypass valve 350 and through the bypass flow path 334 by bypassing the condenser 330. This result is achieved by closing the first outlet port 332 of the bypass valve 350. Therefore, the gaseous refrigerant is not cooled in the condenser 330. More specifically, the refrigerant is channeled from the second outlet port 337 of the bypass valve 350 through the bypass flow path 334 via the inlet port 333 of the bypass flow path 334. Therefore, in this embodiment of the invention, the gaseous refrigerant is not cooled in the condenser 330. More specifically, the electronic control unit 312 is in electronic communication with the bypass valve 350 via the control flow path 399 and controls the flow of refrigerant that flows from the bypass valve 350 to one of the condenser 330 via the inlet port 331 of the condenser 330 and the bypass flow path 334 via the inlet port 333 of the bypass flow path 334 respectively depending on the temperature of the refrigerant that is required to be channeled through the power train cooling circuit 313.

The refrigerant at the outlet port 384 of the condenser 330 which is in the gaseous state at low temperature and at high pressure is channeled to the inlet port 383 of the expansion valve 340. In an alternate exemplary embodiment, the refrigerant at an outlet port 388 of the bypass flow path 334 which is in the gaseous state at high temperature and at high pressure from the second outlet port 337 of the bypass valve 350 is channeled to the inlet port 383 of the expansion valve 340 by bypassing the condenser 330. The expansion valve 340 is in flow communication with one of the outlet port 384 of the condenser 330 and the outlet port 388 of the bypass flow path 334 at its inlet port 383 and receives refrigerant that flows from one of the condenser 330 through the outlet port 384 of the condenser 330 and from the bypass flow path 334 through the outlet port 388 of the bypass flow path 334. Once the refrigerant is received at the inlet port 383 of the expansion valve 340 in the substantially gaseous state, the expansion valve 340 throttles the gaseous refrigerant, thereby decreasing the pressure of the refrigerant that exits from one of the outlet port 384 of the condenser 330 and the outlet port 388 of the bypass flow path 334 to a much lower pressure that exits from the first outlet port 347 of the expansion valve 340. Due to the decrease in the pressure of the refrigerant due to the throttling action of the expansion valve 340, the temperature of the refrigerant is decreased from the temperature of the refrigerant at the inlet port 383 of the expansion valve 340 to a relatively much lower temperature that exits from the first outlet port 347 of the expansion valve 340. The expansion valve 340 is in flow communication with the inlet port 321 of the at least one cooling channel 310 that is defined within the air conditioning unit 345 at its first outlet port 347. The expansion valve 340 controls the flow of refrigerant that flows through one of the outlet port 384 of the condenser 330 and the outlet port 388 of the bypass flow path 334 to the inlet port 321 of the at least one cooling channel 310 that is defined within the air conditioning unit 345 of the electrically powered vehicle. The expansion valve 340 is electronically controlled by means of the electronic control unit 312 that is in electronic communication with the expansion valve 340 via the control flow path 371. More specifically, the electronic control unit 312 controls the opening percentage/opening of the first outlet port 347 of the expansion valve 340 to facilitate regulating the required mass flow rate of the refrigerant that is to flow from one of the outlet port 384 of the condenser 330 and the outlet port 388 of the bypass flow path 334 to the inlet port 321 of the at least one cooling channel 310 that is defined within the air conditioning unit 345 of the electrically powered vehicle via the first outlet port 347 of the expansion valve 340.

As the pressure and the temperature of the refrigerant decreases from one of high pressure and low temperature at the outlet port 384 of the condenser 330 and high pressure and high temperature at the outlet port 388 of the bypass flow path 334 to low pressure and much lower temperature that is required for the refrigerant to be circulated through the thermal management system 300 for the at least one module 322 of the electrically powered vehicle, the refrigerant changes its phase to the substantially liquid phase/low temperature gaseous phase due to the decrease in the temperature of the refrigerant that flows through the first outlet port 347 of the expansion valve 340 to the inlet port 321 of the at least one cooling channel 310 that is defined within the air conditioning unit 345. The second outlet port 365 of the expansion valve 340 is closed by the electronic control unit 312 via the control flow path 371. Moreover, the throttling of the refrigerant that flows through one of the outlet port 384 of the condenser 330 and the outlet port 388 of the bypass flow path 334 to the inlet port 321 of the at least one cooling channel 310 that is defined within the air conditioning unit 345 via the first outlet port 347 of the expansion valve 340 that is controlled by the electronic control unit 312 via the control flow path 371 permits only the required mass flow rate of refrigerant to be channeled at high-speed through the inlet port 321 of the at least one cooling channel 310 that is defined within the air conditioning unit 345. Therefore, at the first outlet port 347 of the expansion valve 340, refrigerant is at lower pressure than the refrigerant that is channeled to the inlet port 383 of the expansion valve 340 from one of the outlet port 384 of the condenser 330 and the outlet port 388 of the bypass flow path 334 and is at a lower temperature than the refrigerant that is channeled to the inlet port 383 of the expansion valve 340 from one of the outlet port 384 of the condenser 330 and the outlet port 388 of the bypass flow path 334. In an exemplary embodiment, the inlet port 321 of the at least one cooling channel 310 defined within the air conditioning unit 345 of the electrically powered vehicle is in flow communication with the first outlet port 347 of the expansion valve 340 and receives high-speed liquid refrigerant at low temperature/gaseous refrigerant at low temperature and at low pressure therein. After the refrigerant in the substantially liquid state at low temperature/substantially gaseous state at low temperature and at low pressure is channeled to the inlet port 321 of the at least one cooling channel 310 that is defined within the air conditioning unit 345, the cycle is repeated with the flow of refrigerant through the power train cooling circuit 313 and through the electric battery heating circuit 319 subsequently to cool the at least one mechanical component 318 that is positioned within the cooling chamber/at least one cooling channel 310 that is defined in each of the plurality of modules of the power train cooling circuit 313 and to heat the at least one cell 311 that is positioned within the heating chamber 310 defined in the electric battery 317 of the electric battery heating circuit 319 of the electrically powered vehicle in the following cycle.

Figure 4:
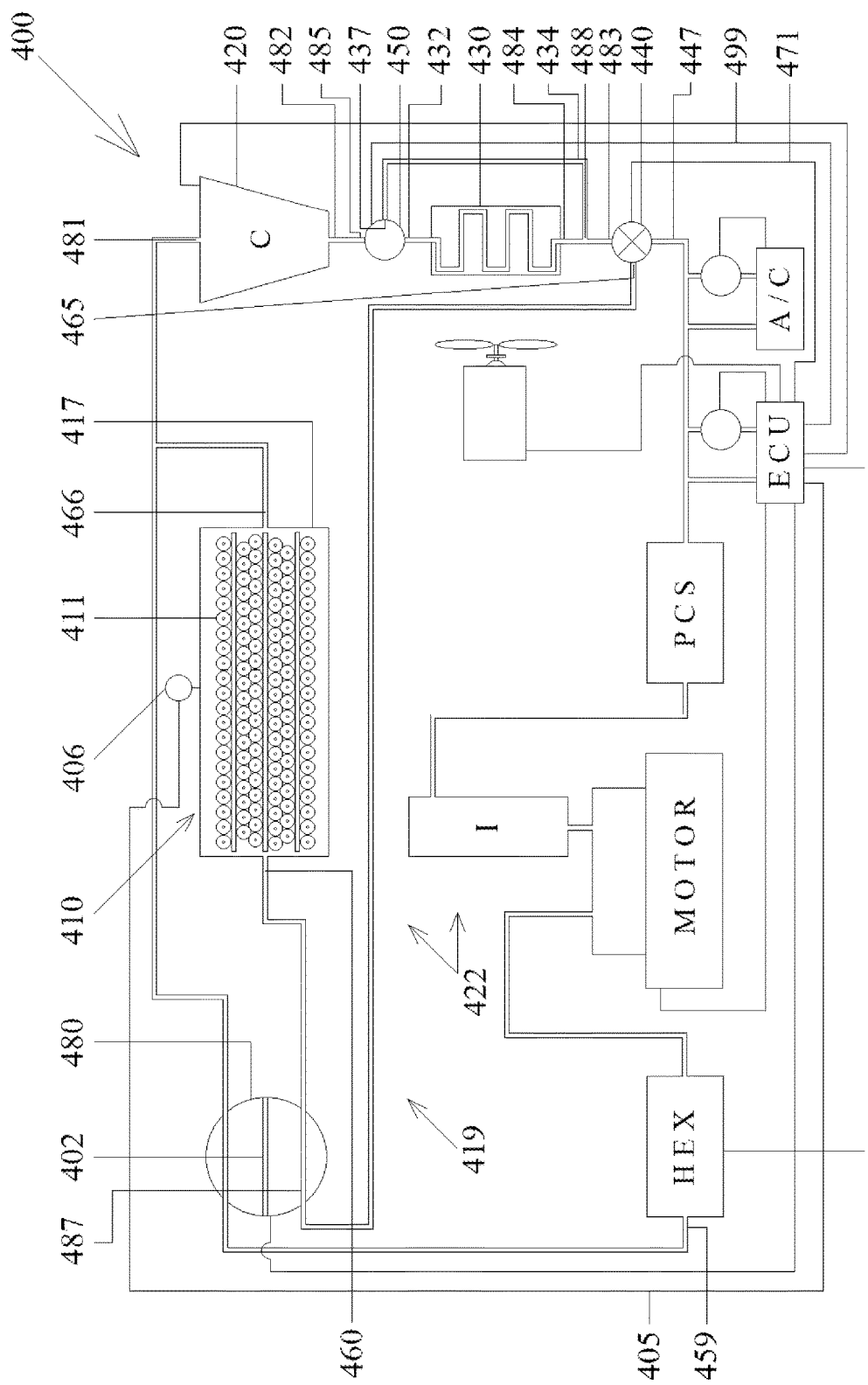
FIG. 4 is a schematic representation of the thermal management system for heating at least one module of the electrically powered vehicle that is in flow communication with the compressor, a bypass flow path, and the expansion valve in another embodiment of the invention.

FIG. 4 is a schematic representation of the thermal management system 400 for increasing a temperature of at least one module 422 of the electrically powered vehicle comprising the heating chamber 410 defined within at least one module 422 of the electrically powered vehicle that is in flow communication with the compressor 420, the condenser 430, and the expansion valve 440 in another embodiment of the invention. The thermal management system 400 for increasing the temperature of at least one module 422 of the electrically powered vehicle comprising the heating chamber 410 defined in the at least one module 422 of the electrically powered vehicle that is in flow communication with the compressor 420, the condenser 430, and the expansion valve 440 that is depicted in FIG. 4 is similar to the thermal management system 200 for increasing the temperature of at least one module 222 of the electrically powered vehicle comprising the cooling chamber 210 defined in the at least one module 222 of the electrically powered vehicle that is in flow communication with the compressor 220, the condenser 230, and the expansion valve 240 that is depicted in FIG. 2. The differences between the thermal management system 400 that is depicted in FIG. 4 and the thermal management system 200 that is depicted in FIG. 2 are described below.

In the embodiment that is depicted in FIG. 4, it is required to heat the at least one cell 411 that is positioned within the heating chamber 410 that is defined in the electric battery 417 during cold operating conditions of the electrically powered vehicle. The electronic control unit 412 is in electronic communication with the bypass valve 450 via the control flow path 499. When the electric battery 417 is required to be cooled, the refrigerant that flows through the outlet port 482 of the compressor 420 is channeled through the condenser 430 via the bypass valve 450 in order to cool the refrigerant. The cooled refrigerant from the outlet port 484 of the condenser 430 is then channeled through the inlet port 460 of the cooling chamber 410 that is defined in the electric battery 417. However, when it is required to heat the at least one cell 411 that is positioned within the electric battery 417 and is submerged and in direct contact with the refrigerant as is required in the present embodiment of the invention, the electronic control unit 412 opens the second outlet port 437 of the bypass valve 450 that is in flow communication with the bypass flow path 434 and closes the first outlet port 432 of the bypass valve 450 that is in flow communication with the condenser 430. Therein, refrigerant at high temperature from the outlet port 482 of the compressor 420 is channeled through the bypass flow path 434 via the second outlet port 437 of the bypass valve 450 and delivered to the inlet port 483 of the expansion valve 440 by bypassing the condenser 430. Therefore, the gaseous refrigerant at high temperature and at high pressure from the outlet port 482 of the compressor 420 is not cooled within the condenser 430. Rather, the gaseous refrigerant at high temperature and at high pressure that flows through the bypass flow path 434 to the inlet port 483 of the expansion valve 440 heats the at least one cell 411 that is positioned within the heating chamber 410 defined in the electric battery 417 and is submerged and in direct contact with the refrigerant during cold operating conditions of the electric battery 417 of the electrically powered vehicle.

In the exemplary embodiment, the second refrigerant flow path 487 of the directional valve 480 is in flow communication between the second outlet port 465 of the expansion valve 440 and the inlet port 460 of the heating chamber 410 defined in the electric battery 417. When the directional valve 480 is oriented in the configuration that is depicted in FIG. 4, the second refrigerant flow path 487 channels the gaseous refrigerant at high temperature that flows from the second outlet port 465 of the expansion valve 440 to the inlet port 460 of the heating chamber 410 that is defined in the electric battery 417. When it is required to heat the at least one cell 411 that is positioned within the heating chamber 410 defined in the electric battery 417 during cold operating conditions of the electric battery 417 of the electrically powered vehicle, the gaseous refrigerant at high temperature that flows from the second outlet port 465 of the expansion valve 440 is channeled to the inlet port 460 of the heating chamber 410 that is defined in the electric battery 417. More specifically, when the temperature sensor 406 that is in thermal communication with the at least one cell 411 positioned within the electric battery 417 senses that the temperature of the at least one cell 411 positioned within the electric battery 417 is below the threshold temperature that is pre-determined by the user and requires to be heated to the temperature that is within its acceptable operating temperature limits in order to increase the operating efficiency of the electric battery 417, the temperature sensor 406 transmits an electronic signal to the electronic control unit 412 indicating that the temperature of the at least one cell 411 positioned within the electric battery 417 is below the threshold temperature. The electronic control unit 412 therein controls an orientation of the directional valve 480 from the orientation of the directional valve 380 that is depicted in FIG. 3 to the orientation of the directional valve 480 that is depicted in FIG. 4, where the second refrigerant flow path 487 of the directional valve 480 is in flow communication between the second outlet port 465 of the expansion valve 440 and the inlet port 460 of the heating chamber 410 defined in the electric battery 417. Thereby, gaseous refrigerant at high temperature from the second outlet port 465 of the expansion valve 440 is channeled to the inlet port 460 of the heating chamber 410 that is defined in the electric battery 417 via the second refrigerant flow path 487 that is defined in the directional valve 480 in the orientation of the directional valve 480 that is depicted in FIG. 4.

A working of the thermal management system 400 for the at least one module 422 of the electrically powered vehicle is described as an example. The gaseous refrigerant at high temperature that flows from the second outlet port 465 of the expansion valve 440 is channeled to the inlet port of the second refrigerant flow path 487 defined in the directional valve 480. The electronic control unit 412 therein closes the first outlet port 447 of the expansion valve 440 such that gaseous refrigerant at high temperature is not allowed to flow through the power train cooling circuit 413. The second refrigerant flow path 487 defined in the directional valve 480 is in flow communication between the second outlet port 465 of the expansion valve 440 and the inlet port 460 of the heating chamber 410 defined in the electric battery 417. When the directional valve 480 is oriented in the configuration that is depicted in FIG. 4, the second refrigerant flow path 487 channels the gaseous refrigerant at high temperature that flows from the second outlet port 465 of the expansion valve 440 to the inlet port 460 of the heating chamber 410 that is defined in the electric battery 417. When it is required to heat the at least one cell 411 that is positioned within the heating chamber 410 defined in the electric battery 417 during cold operating temperature conditions of the electric battery 417, the gaseous refrigerant at high temperature that flows from the second outlet port 465 of the expansion valve 440 is channeled to the inlet port 460 of the heating chamber 410 that is defined in the electric battery 417. More specifically, when the temperature sensor 406 that is in thermal communication with the at least one cell 411 that is positioned within the heating chamber 410 that is defined in the electric battery 417 and is submerged and in direct contact with the refrigerant senses that the temperature of the at least one cell 411 of the electric battery 417 is below the threshold temperature and requires to be heated in order to increase the operating efficiency of the electric battery 417, the temperature sensor 406 transmits the electronic signal to the electronic control unit 412 indicating that the temperature of the at least one cell 411 that is positioned within the heating chamber 410 defined in the electric battery 417 and is submerged and in direct contact with the refrigerant is below the threshold temperature via the control flow path 405. The electronic control unit 412 therein controls the orientation of the directional valve 480 from the orientation of the directional valve 380 that is depicted in FIG. 3 to the orientation of the directional valve 480 that is depicted in FIG. 4, where the second refrigerant flow path 487 that is defined in the directional valve 480 is in flow communication between the second outlet port 465 of the expansion valve 440 and the inlet port 460 of the heating chamber 410 defined in the electric battery 417. Thereby, gaseous refrigerant at high temperature from the second outlet port 465 of the expansion valve 440 is channeled to the inlet port 460 of the heating chamber 410 that is defined in the electric battery 417 via the second refrigerant flow path 487 defined in the directional valve 480 in the orientation of the directional valve 480 that is depicted in FIG. 4.

In addition, the third refrigerant flow path 402 defined in the directional valve 480 is disengaged and is no longer in flow communication with the outlet port 459 of the at least one cooling channel 410 defined within the heat exchanger 416. Therefore, the third refrigerant flow path 402 does not transport refrigerant from the at least one cooling channel 410 that is defined within the heat exchanger 416 to the inlet port 460 of the heating chamber 410 that is defined in the electric battery 417. Gaseous refrigerant at high temperature that is channeled from the second outlet port 465 of the expansion valve 440 to the inlet port 460 of the heating chamber 410 that is defined in the electric battery 417 via the second refrigerant flow path 487 defined in the directional valve 480 heats the at least one cell 411 that is positioned within the heating chamber 410 defined in the electric battery 417 and is submerged and in direct contact with the refrigerant. Therefore, in the thermal management system 400 for increasing the temperature of at least one module 422 of the electrically powered vehicle that is in flow communication with the compressor 420, the condenser 430, and the expansion valve 440 that is depicted in FIG. 4, the refrigerant from the second outlet port 465 of the expansion valve 440 heats the at least one cell 411 that is positioned within the heating chamber 410 defined in the electric battery 417 of the electrically powered vehicle and is submerged and in direct contact with the refrigerant present in the heating chamber 410 defined in the electric battery 417.

In an exemplary embodiment, the refrigerant in the gaseous state at high temperature is received within the inlet port 460 of the heating chamber 410 that is defined in the electric battery 417 that includes at least one cell 411 at low temperature that is positioned within the heating chamber 410 defined in the electric battery 417 of the electric battery heating circuit 419. In an exemplary embodiment, once the refrigerant is received within the inlet port 460 of the heating chamber 410 that is defined in the electric battery 417, the inlet port 460 of the heating chamber 410 defined in the electric battery 417 channels the refrigerant into the heating chamber 410 defined in the electric battery 417 such that the gaseous refrigerant at high temperature is channeled through the heating chamber 410. At least one cell 411 is positioned within the heating chamber 410 that is defined in the electric battery 417 and absorbs heat from the refrigerant at high temperature that is channeled through the heating chamber 410 and that submerges and is in direct contact with the at least one cell 411 that is positioned within the heating chamber 410. The heating chamber 410 is in flow communication with the outlet port 466 of the heating chamber 410 that channels refrigerant that flows through the heating chamber 410. In an exemplary embodiment, gaseous refrigerant at high temperature is channeled to the electric battery 417 that includes at least one cell 411 at low temperature that is positioned within the heating chamber 410 defined in the electric battery 417 to heat the at least one cell 411 that is positioned within the heating chamber 410 defined in the electric battery 417 and is submerged and in direct contact with the gaseous refrigerant.

Once the gaseous refrigerant at high temperature is channeled within the heating chamber 410 via the inlet port 460 of the heating chamber 410 that is defined in the electric battery 417, the gaseous refrigerant at high temperature is allowed to flow through the heating chamber 410 that is defined in the electric battery 417 to facilitate heating the at least one cell 411 at low temperature that is positioned within the heating chamber 410 defined in the electric battery 417 and is submerged and in direct contact with the refrigerant. More specifically, once the gaseous refrigerant at high temperature flows through the inlet port 460 of the heating chamber 410 that is defined in the electric battery 417 to heat the at least one cell 411 at low temperature that is positioned within the heating chamber 410 defined in the electric battery 417, the refrigerant is channeled through the heating chamber 410 until the refrigerant is channeled through the outlet port 466 of the heating chamber 410. The flow of refrigerant through the heating chamber 410, and finally through the outlet port 466 of the heating chamber 410 that is defined in the electric battery 417 that includes at least one cell 411 at low temperature that is positioned within the heating chamber 410 defined in the electric battery 417 and is submerged and in direct contact with the refrigerant heats the electric battery 417, and the at least one cell 411 at low temperature that is positioned within the heating chamber 410 defined in the electric battery 417 and is submerged and in direct contact with the refrigerant respectively.

More specifically, as the gaseous refrigerant at high temperature flows through the heating chamber 410, and finally through the outlet port 466 of the heating chamber 410 respectively, the gaseous refrigerant at high temperature discharges heat to the at least one cell 411 at low temperature that is positioned within the heating chamber 410 defined in the electric battery 417 of the electrically powered vehicle and is submerged and in direct contact with the refrigerant, and consequently cools down due to transfer of heat to the at least one cell 411 at low temperature that is positioned within the heating chamber 410 defined in the electric battery 417 of the electrically powered vehicle. More specifically, the gaseous refrigerant at high temperature cools down due to the transfer of heat from the gaseous refrigerant at high temperature that flows from the inlet port 460 of the heating chamber 410 that is defined in the electric battery 417 to the at least one cell 411 at low temperature that is positioned within the heating chamber 410 defined in the electric battery and is submerged and in direct contact with the refrigerant by convection. The discharge of heat by the gaseous refrigerant at high temperature to the at least one cell 411 at low temperature that is positioned within the heating chamber 410 defined in the electric battery 417 of the electrically powered vehicle and is submerged and in direct contact with the refrigerant decreases the temperature of the refrigerant from the high temperature to the low temperature as refrigerant flows through the heating chamber 410 until the outlet port 466 of the heating chamber 410. Therefore, when the gaseous refrigerant enters through the inlet port 460, the gaseous refrigerant is at high temperature and at low pressure. However, as the refrigerant discharges heat to the at least one cell 411 at low temperature that is positioned within the heating chamber 410 defined in the electric battery 417 of the electrically powered vehicle and is submerged and in direct contact with the refrigerant as refrigerant flows through the heating chamber 410 until the outlet port 466 of the heating chamber 410, the gaseous refrigerant that exits from the outlet port 466 of the heating chamber 410 defined in the electric battery 417 is at a lower temperature than at the inlet port 460 of the heating chamber 410 defined in the electric battery 417 and at low pressure. As heat flows from the refrigerant at high temperature that flows through the inlet port 460 of the heating chamber 410 defined in the electric battery 417 to the at least one cell 411 at low temperature that is positioned within the heating chamber 410 defined in the electric battery 417 of the electrically powered vehicle and is submerged and in direct contact with the refrigerant until the outlet port 466 of the heating chamber 410, and through the outlet port 466 of the heating chamber 410 defined in the electric battery 417, the at least one cell 411 at low temperature that is positioned within the heating chamber 410 defined in the electric battery 417 and is submerged and in direct contact with the refrigerant is substantially heated from the lower temperature to the higher temperature that is within its acceptable operating temperature limits. The refrigerant that flows from the outlet port 466 of the heating chamber 410 defined in the electric battery 417 that includes at least one cell 411 at low temperature that is positioned within the heating chamber 410 defined in the electric battery 417 and is submerged and in direct contact with the refrigerant is channeled to the inlet port 481 of the compressor 420.

The refrigerant that flows from the outlet port 466 of the heating chamber 410 that is defined in the electric battery 417 of the electric battery heating circuit 419 in the gaseous state at low temperature and at low pressure is channeled to the inlet port 481 of the compressor 420. Once the gaseous refrigerant is received in the compressor 420, the gaseous refrigerant is compressed in the compressor 420 from the pressure that is equal to the pressure of the refrigerant at the outlet port 466 of the heating chamber 410 that is defined in the electric battery 417 to the higher pressure that is required for the refrigerant to be circulated through the thermal management system 400 for the at least one module 422 of the electrically powered vehicle. Therefore, as the gaseous refrigerant at low temperature and at low pressure flows through the compressor 420 via its inlet port 481, the compressor 420 increases the pressure of the refrigerant from the low pressure to the high pressure with a corresponding large increase in temperature of the refrigerant. Therefore, at the outlet port 482 of the compressor 420, the gaseous refrigerant is at a higher temperature than the gaseous refrigerant that is channeled to the inlet port 481 of the compressor 420 from the outlet port 466 of the heating chamber 410 that is defined in the electric battery 417, and at a higher pressure than the gaseous refrigerant that is channeled to the inlet port 481 of the compressor 420 from the outlet port 466 of the heating chamber 410 that is defined in the electric battery 417.

The refrigerant at the outlet port 482 of the compressor 420 which is in the gaseous state at high temperature and at high pressure is channeled to the inlet port 485 of the bypass valve 450. Once the gaseous refrigerant is received within the bypass valve 450, the gaseous refrigerant at high temperature and at high pressure is channeled from the outlet port 482 of the compressor 420 through the bypass flow path 434 via the second outlet port 437 of the bypass valve 450 by bypassing the condenser 430. More specifically, the first outlet port 432 of the bypass valve 450 is closed by the electronic control unit 412 via the control flow path 499. The refrigerant at the outlet port 488 of the bypass flow path 434 which is in the gaseous state at high temperature and at high pressure is channeled to the inlet port 483 of the expansion valve 440. The expansion valve 440 is in flow communication with the outlet port 488 of the bypass flow path 434 at its inlet port 483 and receives refrigerant that flows from the bypass flow path 434 through the outlet port 488 of the bypass flow path 434. Once the refrigerant is received at the inlet port 483 of the expansion valve 440 in the substantially gaseous state at high temperature and at high pressure via the bypass flow path 434, the expansion valve 440 throttles the gaseous refrigerant, thereby decreasing the pressure of the refrigerant that exits from the outlet port 488 of the bypass flow path 434 to the lower pressure that exits from the second outlet port 465 of the expansion valve 440. The first outlet port 447 of the expansion valve 440 is closed by the electronic control unit 412 via the control flow path 471, thereby preventing flow of refrigerant through the power train cooling circuit 413. Due to the decrease in the pressure of the refrigerant due to the throttling action of the expansion valve 440, the temperature of the refrigerant is decreased from the temperature at the inlet port 483 of the expansion valve 440 to a relatively much lower temperature that exits from the second outlet port 465 of the expansion valve 440. The expansion valve 440 is in flow communication with the inlet port of the second refrigerant flow path 487 defined in the directional valve 480 at its second outlet port 465. The expansion valve 440 controls the flow of refrigerant that flows through the outlet port 488 of the bypass flow path 434 to the inlet port of the second refrigerant flow path 487 that is defined in the directional valve 480 of the electrically powered vehicle. The expansion valve 440 is electronically controlled by means of the electronic control unit 412 that is in electronic communication with the expansion valve 440 via the control flow path 471. More specifically, the electronic control unit 412 controls the opening percentage/opening of the second outlet port 465 of the expansion valve 440 to facilitate regulating the required mass flow rate of the refrigerant at high temperature and at high pressure that is to flow from the outlet port 488 of the bypass flow path 434 to the inlet port of the second refrigerant flow path 487 that is defined in the directional valve 480 of the electrically powered vehicle via the second outlet port 465 of the expansion valve 440 for the refrigerant to be circulated through the thermal management system 400 for the at least one module 422 of the electrically powered vehicle.

As the pressure and the temperature of the refrigerant decreases from the high temperature and high pressure at the outlet port 488 of the bypass flow path 434 to low pressure and lower temperature that is required for the refrigerant to be circulated through the thermal management system 400 for the at least one module 422 of the electrically powered vehicle, the refrigerant retains its phase in the gaseous phase as the temperature of the refrigerant is not decreased in the condenser 430 prior to flowing through the second outlet port 465 of the expansion valve 440. The refrigerant retains its phase in the gaseous phase even through the temperature of the refrigerant decreases as the refrigerant flows through the second outlet port 465 of the expansion valve 440 due to the throttling action of the expansion valve 440 to the inlet port of the second refrigerant flow path 487 that is defined in the directional valve 480. Moreover, the throttling of the refrigerant that flows from the outlet port 488 of the bypass flow path 434 to the inlet port of the second refrigerant flow path 487 that is defined in the directional valve 480 via the second outlet port 465 of the expansion valve 440 that is controlled by the electronic control unit 412 via the control flow path 471 permits only the required mass flow rate of refrigerant to be channeled at high-speed through the inlet port of the second refrigerant flow path 487 that is defined in the directional valve 480.

Therefore, at the second outlet port 465 of the expansion valve 440, substantially gaseous refrigerant is at lower pressure than the refrigerant that is channeled to the inlet port 483 of the expansion valve 440 from the outlet port 488 of the bypass flow path 434, and is at lower temperature than the refrigerant that is channeled to the inlet port 483 of the expansion valve 440 from the outlet port 488 of the bypass flow path 434. In an exemplary embodiment, the inlet port of the second refrigerant flow path 487 that is defined in the directional valve 480 of the electrically powered vehicle is in flow communication with the second outlet port 465 of the expansion valve 440 and receives high-speed gaseous refrigerant at high temperature and at low pressure therein. After the refrigerant at high temperature and at low pressure is channeled to the inlet port of the second refrigerant flow path 487 that is defined in the directional valve 480, the cycle is repeated with the flow of gaseous refrigerant at high temperature and at low pressure through the heating chamber 410 defined in the electric battery 417 to heat the at least one cell 411 that is positioned within the heating chamber 410 defined in the electric battery 417 of the electric battery heating circuit 419 and that is submerged and in direct contact with the refrigerant in the following cycle.

Figure 5:
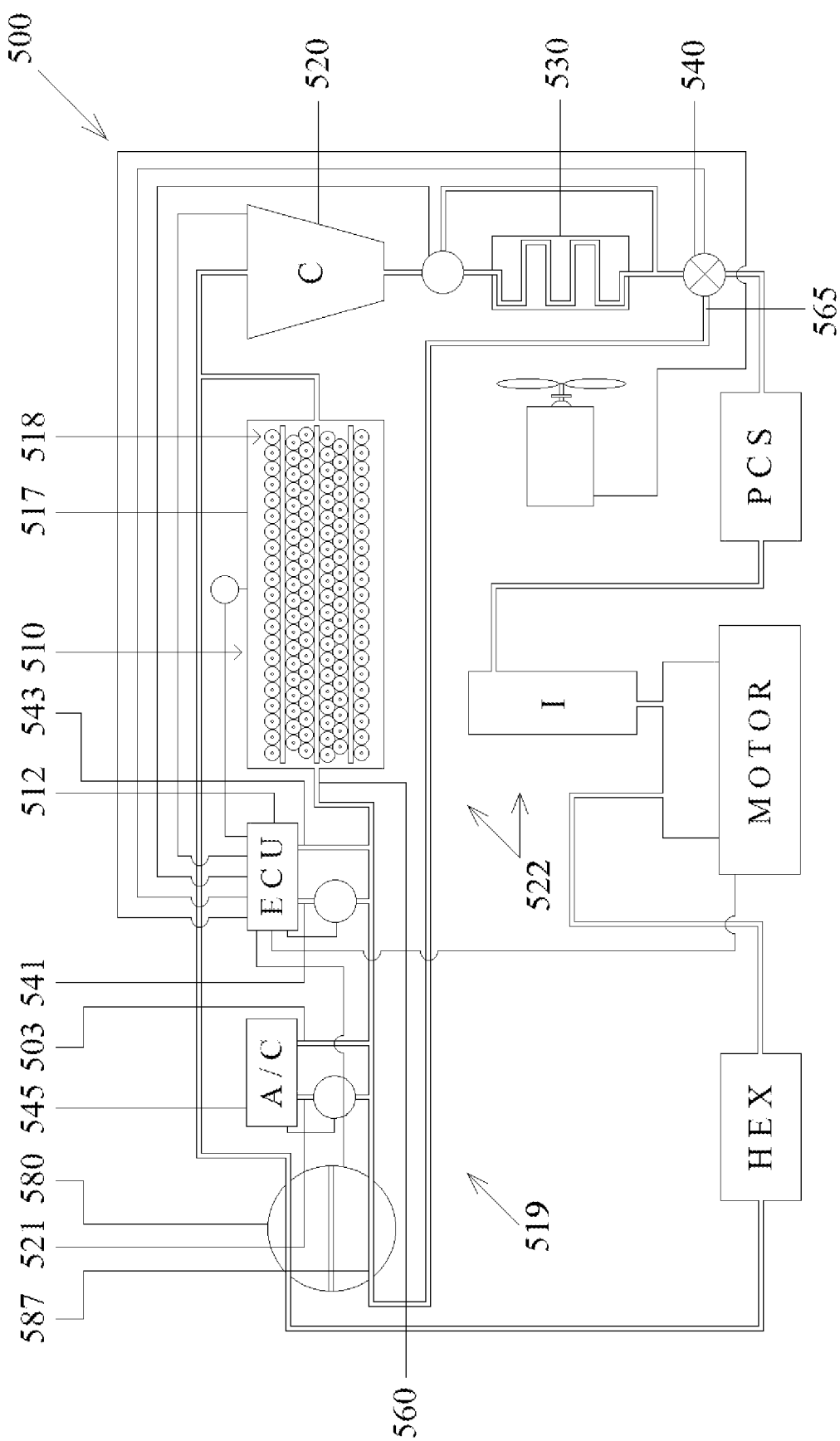
FIG. 5 is a schematic representation of the thermal management system for cooling at least one module of the electrically powered vehicle that is in flow communication with the compressor, the condenser, and the expansion valve in another embodiment of the invention.

FIG. 5 is a schematic representation of a thermal management system 500 for cooling at least one module 522 of an electrically powered vehicle that is in flow communication with the compressor 520, the condenser 530, and the expansion valve 540 in another embodiment of the invention. The thermal management system 500 for cooling the at least one module 522 of the electrically powered vehicle that is in flow communication with the compressor 520, the condenser 530, and the expansion valve 540 that is depicted in FIG. 5 is similar to the thermal management system 200 for cooling at least one module 222 of the electrically powered vehicle that is in flow communication with the compressor 220, the condenser 230, and the expansion valve 240 that is depicted in FIG. 2. The differences between the thermal management system 500 that is depicted in FIG. 5 and the thermal management system 200 that is depicted in FIG. 2 are described below.

The directional valve 580 channels the flow of refrigerant that flows through the second outlet port 565 of the expansion valve 540 to the electric battery cooling circuit 519. In an exemplary embodiment, the first cooling channel of the at least one cooling channel 510 that is defined within the air conditioning unit 545 (A/C) comprises the inlet port 521. More specifically, the inlet port 521 of the at least one cooling channel 510 that is defined within the air conditioning unit 545 is in flow communication with the second refrigerant flow path 587 that is defined in the directional valve 580 and receives refrigerant in the substantially liquid state. The refrigerant that flows past the at least one mechanical component 518 that is positioned within the at least one cooling channel 510 that is defined within the air conditioning unit 545 cools the at least one mechanical component 518 that is positioned within the at least one cooling channel 510 defined in the air conditioning unit 545. The refrigerant is therein channeled to the outlet port 503 of the at least one cooling channel 510 that is defined within the air conditioning unit 545 at higher temperature than that of the liquid refrigerant at low pressure and at lower temperature that is received at the inlet port 521 of the at least one cooling channel 510. The outlet port 503 of the at least one cooling channel 510 that is defined within the air conditioning unit 545 is in flow communication with the inlet port 541 of the cooling chamber 510 that is defined in the electronic control unit 512.

In an exemplary embodiment, the cooling chamber 510 that is defined in the electronic control unit (ECU) 512 comprises the inlet port 541. More specifically, the inlet port 541 of the cooling chamber 510 that is defined in the electronic control unit 512 is in flow communication with the outlet port 503 of the at least one cooling channel 510 defined in the air conditioning unit 545 as well as the second outlet port 565 of the expansion valve 540 and receives refrigerant in the substantially liquid state. The refrigerant that flows past the at least one mechanical component 518 that is positioned within the cooling chamber 510 defined in the electronic control unit 512 and is submerged and in direct contact with the refrigerant cools the at least one mechanical component 518 that is positioned within the cooling chamber 510 defined in the electronic control unit 512. The refrigerant is therein channeled to the outlet port 543 of the cooling chamber 510 that is defined in the electronic control unit 512 at higher temperature than that of the substantially liquid refrigerant at low pressure and at lower temperature that is received at the inlet port 541 of the cooling chamber 510. The outlet port 543 of the cooling chamber 510 that is defined in the electronic control unit 512 is in flow communication with the inlet port 560 of the cooling chamber 510 that is defined in the electric battery 517. The flow of liquid refrigerant through the air conditioning unit 545 and subsequently to the electronic control unit 512 that is depicted in FIG. 5 to cool the air conditioning unit 545 and the electronic control unit 512 respectively is the same as the flow of liquid refrigerant through the air conditioning unit 245 and subsequently to the electronic control unit 212 that is depicted in FIG. 2 to cool the air conditioning unit 245 and the electronic control unit 212 respectively.

Figure 6:
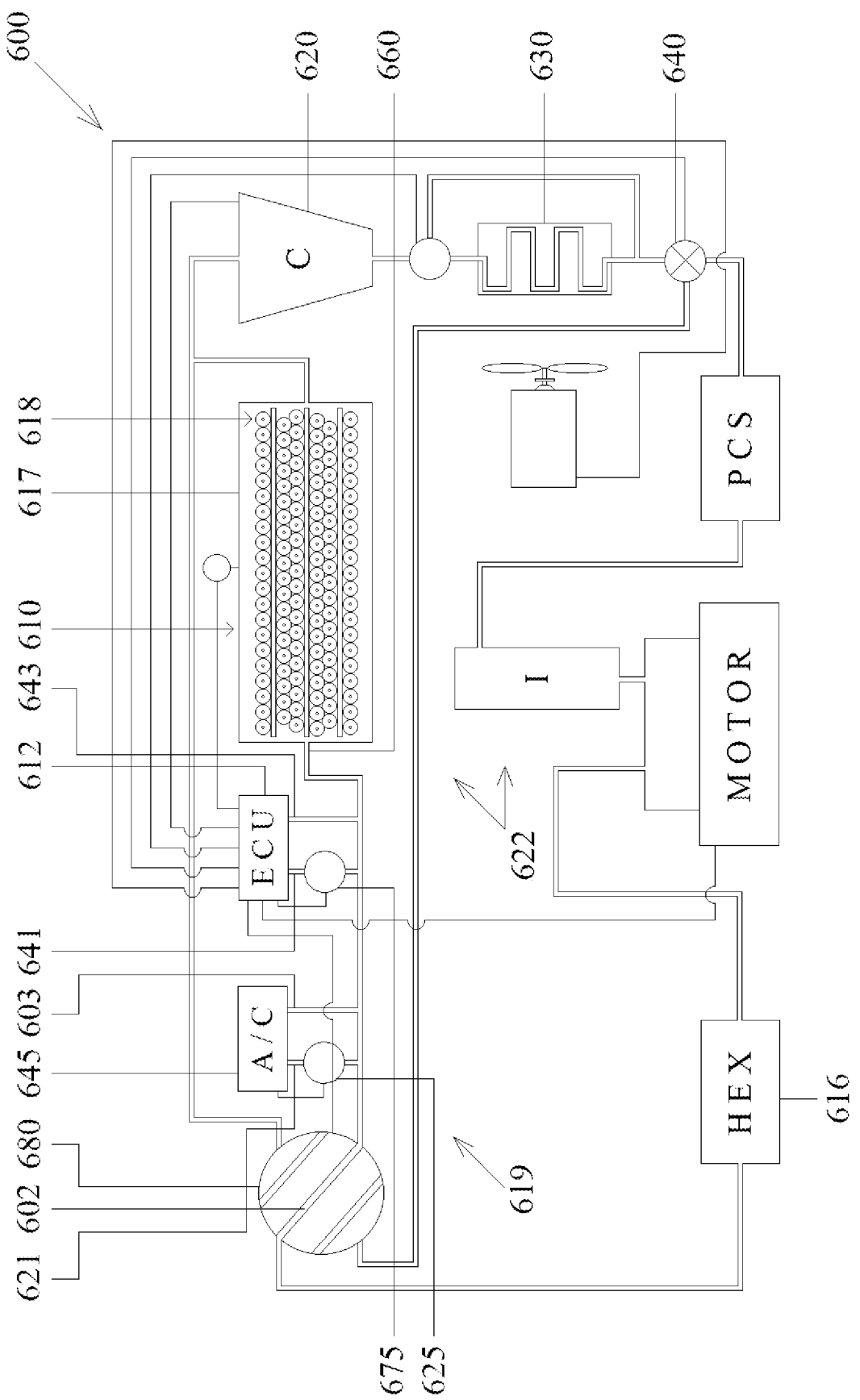
FIG. 6 is a schematic representation of the thermal management system for regulating the temperature of at least one module of the electrically powered vehicle that is in flow communication with the compressor, the bypass valve, and the expansion valve in another embodiment of the invention.

FIG. 6 is a schematic representation of a thermal management system 600 for regulating the temperature of at least one module 622 of an electrically powered vehicle that is in flow communication with the compressor 620, the condenser 630, and the expansion valve 640 in another embodiment of the invention. The thermal management system 600 for regulating the temperature of at least one module 622 of the electrically powered vehicle that is in flow communication with the compressor 620, the condenser 630, and the expansion valve 640 that is depicted in FIG. 6 is similar to the thermal management system 300 for regulating the temperature of at least one module 322 of the electrically powered vehicle that is in flow communication with the compressor 320, the condenser 330, and the expansion valve 340 that is depicted in FIG. 3. The differences between the thermal management system 600 that is depicted in FIG. 6 and the thermal management system 300 that is depicted in FIG. 3 are described below.

The directional valve 680 channels the flow of refrigerant that flows through the at least one cooling channel 610 that is defined within the heat exchanger 616 to the electric battery heating circuit 619. In an exemplary embodiment, the first heating channel of the at least one heating channel 610 that is defined within the air conditioning unit 645 (A/C) comprises the inlet port 621. More specifically, the inlet port 621 of the at least one heating channel 610 that is defined within the air conditioning unit 645 is in flow communication with the third refrigerant flow path 602 defined in the directional valve 680 and receives refrigerant in the gaseous state at high temperature. The refrigerant that flows past the at least one mechanical component 618 that is positioned within the at least one heating channel 610 that is defined within the air conditioning unit 645 heats the at least one mechanical component 618 that is positioned within the at least one heating channel 610 defined within the air conditioning unit 645. The refrigerant is therein channeled to the outlet port 603 of the at least one heating channel 610 that is defined within the air conditioning unit 645 at a lower temperature than that of the refrigerant at the higher temperature that is received at the inlet port 621 of the at least one heating channel 610 and is at low pressure. The outlet port 603 of the at least one heating channel 610 defined within the air conditioning unit 645 is in flow communication with the inlet port 660 of the heating chamber 610 that is defined in the electric battery 617. When no refrigerant is required to be channeled to the air conditioning unit 645, the first inlet valve 625 of the air conditioning unit 645 is closed by the controller of the air conditioning unit 645/electronic control unit 612. Therein, the refrigerant at high temperature from the third refrigerant flow path 602 that is defined in the directional valve 680 is channeled to the inlet port 641 of the heating chamber 610 that is defined in the electronic control unit 612 by bypassing the air conditioning unit 645.

In an exemplary embodiment, the heating chamber 610 that is defined in the electronic control unit (ECU) 612 comprises the inlet port 641. More specifically, the inlet port 641 of the heating chamber 610 that is defined in the electronic control unit 612 is in flow communication with the outlet port 603 of the at least one heating channel 610 that is defined within the air conditioning unit 645 as well as the third refrigerant flow path 602 of the directional valve 680 and receives refrigerant in the substantially gaseous state. The refrigerant that flows past the at least one mechanical component 618 that is positioned within the electronic control unit 612 heats the at least one mechanical component 618 that is positioned within the heating chamber 610 defined in the electronic control unit 612. The refrigerant is therein channeled to the outlet port 643 of the heating chamber 610 at lower temperature than that of the refrigerant at the higher temperature that is received at the inlet port 641 of the heating chamber 610 defined in the electronic control unit 612 and is at low pressure. The outlet port 643 of the heating chamber 610 defined in the electronic control unit 612 is in flow communication with the inlet port 660 of the heating chamber 610 that is defined in the electric battery 617. When no refrigerant is required to be channeled to the electronic control unit 612, the second inlet valve 675 of the electronic control unit 612 is closed by the electronic control unit 612. Therein, the refrigerant at high temperature from the third refrigerant flow path 602 that is defined in the directional valve 680 is channeled to the inlet port 660 of the heating chamber 610 that is defined in the electric battery 617 by bypassing the electronic control unit 612. This occurs when the first inlet valve 625 of the air conditioning unit 645 is also closed.

Figure 7:
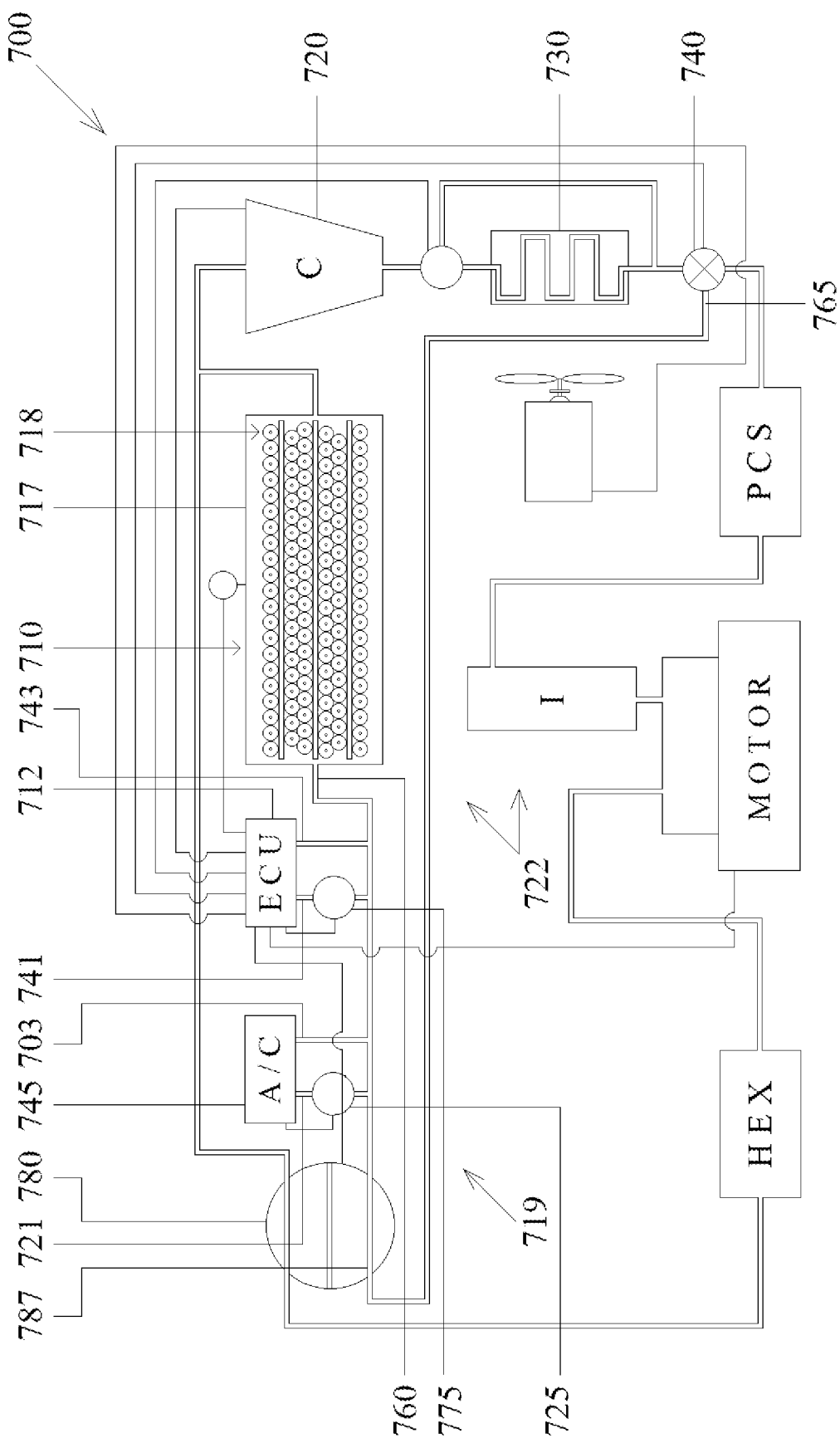
FIG. 7 is a schematic representation of the thermal management system for heating at least one module of the electrically powered vehicle that is in flow communication with the compressor, the bypass flow path, and the expansion valve in another embodiment of the invention.

FIG. 7 is a schematic representation of a thermal management system 700 for increasing the temperature of at least one module 722 of an electrically powered vehicle that is in flow communication with the compressor 720, the condenser 730, and the expansion valve 740 in another embodiment of the invention. The thermal management system 700 for regulating the temperature of at least one module 722 of the electrically powered vehicle that is in flow communication with the compressor 720, the condenser 730, and the expansion valve 740 that is depicted in FIG. 7 is similar to the thermal management system 400 for increasing the temperature of at least one module 422 of the electrically powered vehicle that is in flow communication with the compressor 420, the condenser 430, and the expansion valve 440 that is depicted in FIG. 4. The differences between the thermal management system 700 that is depicted in FIG. 7 and the thermal management system 400 that is depicted in FIG. 4 are described below.

The directional valve 780 channels the flow of refrigerant that flows through the second outlet port 765 of the expansion valve 740 to the electric battery heating circuit 719. In an exemplary embodiment, the first heating channel of the at least one heating channel 710 that is defined within the air conditioning unit 745 (A/C) comprises the inlet port 721.

More specifically, the inlet port 721 of the at least one heating channel 710 that is defined within the air conditioning unit 745 is in flow communication with the second refrigerant flow path 787 that is defined in the directional valve 780 and receives refrigerant at high temperature in the substantially gaseous state. The refrigerant that flows past the at least one mechanical component 718 that is positioned within the at least one heating channel 710 defined within the air conditioning unit 745 heats the at least one mechanical component 718 that is positioned within the at least one heating channel 710 defined within the air conditioning unit 745. The refrigerant is therein channeled to the outlet port 703 of the at least one heating channel 710 at lower temperature than that of the gaseous refrigerant at the higher temperature that is received at the inlet port 721 of the at least one heating channel 710 defined within the air conditioning unit 745 and is at low pressure. The outlet port 703 of the at least one heating channel 710 that is defined within the air conditioning unit 745 and the second refrigerant flow path 787 of the directional valve 780 is in flow communication with the inlet port 741 of the heating chamber 710 that is defined in the electronic control unit 712. When no refrigerant is required to be channeled to the air conditioning unit 745, the first inlet valve 725 of the air conditioning unit 745 is closed by the electronic control unit 712. Therein, the refrigerant at high temperature from the second refrigerant flow path 787 that is defined in the directional valve 780 is channeled to the inlet port 741 of the heating chamber 710 that is defined in the electronic control unit 712 by bypassing the air conditioning unit 745.

In an exemplary embodiment, the heating chamber 710 that is defined in the electronic control unit (ECU) 712 comprises the inlet port 741. More specifically, the inlet port 741 of the heating chamber 710 that is defined in the electronic control unit 712 is in flow communication with the second refrigerant flow path 787 that is defined in the directional valve 780 and the outlet port 703 of the at least one heating channel 710 defined within the air conditioning unit 745 and receives refrigerant at high temperature in the substantially gaseous state. The refrigerant that flows past the at least one mechanical component 718 that is positioned within the heating chamber 710 defined in the electronic control unit 712 heats the at least one mechanical component 718 that is positioned within the heating chamber 710 defined in the electronic control unit 712. The refrigerant is therein channeled to the outlet port 743 of the heating chamber 710 at a lower temperature than that of the gaseous refrigerant at the higher temperature that is received at the inlet port 741 of the heating chamber 710 defined in the electronic control unit 712 and is at low pressure. The outlet port 743 of the heating chamber 710 that is defined in the electronic control unit 712 is in flow communication with the inlet port 760 of the heating chamber 710 that is defined in the electric battery 717. When no refrigerant is required to be channeled to the electronic control unit 712, the second inlet valve 775 of the electronic control unit 712 is closed by the electronic control unit 712. Therein, the refrigerant at high temperature from the second refrigerant flow path 787 that is defined in the directional valve 780 and/or from the outlet port 703 of the at least one heating channel 710 defined within the air conditioning unit 745 is channeled to the inlet port 760 of the heating chamber 710 that is defined in the electric battery 717 by bypassing the electronic control unit 712.

In another exemplary embodiment, the module 222 of the electrically powered vehicle is described. The module 222 comprises a housing, and a temperature regulating chamber that is defined in the housing of the module 222 of the electrically powered vehicle. The module 222 receives the refrigerant therein that substantially fills the temperature regulating chamber and submerges and is in direct mechanical contact with inner walls of the temperature regulating chamber 210. The refrigerant that is received within the temperature regulating chamber 210 flows through the temperature regulating chamber 210 that is defined in the housing of the module 222 of the electrically powered vehicle to regulate a temperature of the module 222 of the electrically powered vehicle. The module 222 of the electrically powered vehicle comprises one of the air conditioning unit 245, the electronic control unit 212, the power conversion system 208 that includes at least one of the onboard charger and the DC converter, the inverter 214, the electrically powered motor 215, the heat exchanger 216 containing oil that is supplied from at least one of the gearbox (transmission) and the differential of the electrically powered vehicle, and the electric battery 217 containing at least one cell 211.

The advantages of the thermal management system 200 for the at least one module 222 of the electrically powered vehicle are described below for the understanding of a reader. Since a low mass flow rate of refrigerant is required to be channeled through the cooling chamber 210 that is defined in the at least one module 222 of the electrically powered vehicle to regulate the temperature of the at least one module 222 of the electrically powered vehicle in contrast to the high mass flow rate of liquid coolant that is required to be channeled through the cooling chamber 210 that is defined in the at least one module 222 of the electrically powered vehicle to regulate the temperature of the at least one module 222 of the electrically powered vehicle, the total amount of electrical energy that is required to be expended for operating the compressor 220 to compress refrigerant flowing from the outlet port of the cooling chamber 210 that is defined in the at least one module 222 of the electrically powered vehicle and delivering the compressed refrigerant from the outlet port 282 of the compressor 220 to the inlet port 231 of the condenser 230, for channeling refrigerant through the condenser 230, for channeling refrigerant through the expansion valve 240, and finally for channeling the refrigerant through the cooling chamber 210 that is defined in the at least one module 222 of the electrically powered vehicle is much lower in contrast to the total amount of electrical energy that is required to be expended for operating the electric pump for channeling liquid coolant from the electric pump through the radiator, for channeling liquid coolant flowing from the radiator through the cooling chamber 210 that is defined in the at least one module 222 of the electrically powered vehicle, for channeling the liquid coolant flowing from the cooling chamber 210 that is defined in the at least one module 222 of the electrically powered vehicle through the coolant tank, and channeling liquid coolant flowing from the coolant tank through the electric pump in a closed loop cooling circuit. Therefore, since the low mass flow rate of refrigerant is required to be channeled through the cooling chamber 210 that is defined in the at least one module 222 of the electrically powered vehicle to directly cool the at least one module 222 of the electrically powered vehicle by decreasing the first temperature of the at least one module 222 of the electrically powered vehicle to the second temperature in contrast to the high mass flow rate of liquid coolant that is required to be channeled through the cooling chamber 210 that is defined in the at least one module 222 of the electrically powered vehicle to cool the at least one module 222 of the electrically powered vehicle by decreasing the first temperature of the at least one module 222 of the electrically powered vehicle to the second temperature, the total amount of energy that is required to be supplied to the compressor 220 for compressing and discharging the refrigerant through the cooling system 200 for the at least one module 222 of the electrically powered vehicle is much lesser than the total amount of energy that is required for channeling the liquid coolant through the cooling system 200 for the at least one module 222 of the electrically powered vehicle. Moreover, as refrigerant is a non-electrolyte in contrast to the liquid coolant which is a good electrolyte, the refrigerant as a medium that submerges the at least one mechanical component 218 within the cooling chamber 210 and is in direct contact with the at least one mechanical component 218 does not allow for passage of negatively charged electrons between negative and positive terminals of the at least one mechanical component 218 via the refrigerant. Therefore, a power conversion efficiency of the at least one module 222 of the electrically powered vehicle such as but not limited to the electric battery 217 that contains at least one cell 211 that is submerged and in direct contact with the refrigerant may be substantially increased in contrast to the electric battery 217 that contains at least one cell 211 that is submerged and in direct contact with the liquid coolant.

In addition, since the low viscosity gaseous refrigerant at a corresponding low inertia is required to be channeled through the cooling chamber 210 that is defined in the at least one module 222 of the electrically powered vehicle to cool the at least one module 222 of the electrically powered vehicle in contrast to the high viscosity liquid coolant at a corresponding high inertia that is required to be channeled through the cooling chamber 210 that is defined in the at least one module 222 of the electrically powered vehicle to cool the at least one module 222 of the electrically powered vehicle, a total amount of energy that is required to be expended for channeling the refrigerant having low inertia through the cooling system 200 for the at least one module 222 of the electrically powered vehicle is much lesser than the total amount of energy that is required to be expended for channeling the liquid coolant having high inertia through the cooling system 200 for the at least one module 222 of the electrically powered vehicle. Therefore, since the viscosity of the refrigerant that is required to be channeled through the cooling chamber 210 that is defined in the at least one module 222 of the electrically powered vehicle to regulate the temperature of the at least one module 222 of the electrically powered vehicle is low, the total amount of energy that is required to be supplied to the compressor 220 for operating the compressor 220 and circulating the refrigerant having low inertia through the cooling system 200 for the at least one module 222 of the electrically powered vehicle is much lesser than the total amount of energy that is required for operating the electric pump for circulating the liquid coolant having high inertia through the cooling system 200 for the at least one module 222 of the electrically powered vehicle to decrease the temperature of the at least one module 222 of the electrically powered vehicle to the temperature that is within its acceptable operating temperature limits.

Further, material cost savings associated with utilizing the liquid refrigerant for cooling the at least one module 222 of the electrically powered vehicle that does not require to be replaced over an entire lifespan of the electrically powered vehicle is much higher than utilizing the liquid coolant that is currently being deployed for cooling the at least one module 222 of the electrically powered vehicle that requires to be replaced several times over the entire lifespan of the electrically powered vehicle. In addition, a maintenance cost associated with maintaining the proposed thermal management system 200 for the at least one module 222 of the electrically powered vehicle utilizing the liquid refrigerant that requires minimal service and mechanical maintenance is much lower than the maintenance cost associated with maintaining the current thermal management system 200 for the at least one module 222 of the electrically powered vehicle utilizing the liquid coolant that requires frequent maintenance and service. Therefore, the overall benefits associated with deploying the proposed liquid refrigerant that is to be circulated through the thermal management system 200 for the at least one module 222 of the electrically powered vehicle to cool the at least one module 222 of the electrically powered vehicle is much better than the overall benefits associated with deploying the liquid coolant that is currently being circulated through the thermal management system 200 for the at least one module 222 of the electrically powered vehicle.

Furthermore, the cooling chamber 210 that is defined in the at least one module 222 of the electrically powered vehicle extends around the entire surface area of the at least one module 222 of the electrically powered vehicle, thereby enabling the most efficient absorption of heat by the refrigerant flowing through the cooling chamber 210 from the entire surface area of the of the at least one module 222 of the electrically powered vehicle as well as from the at least one mechanical component 218 that is positioned within the cooling chamber 210 that is defined in the at least one module 222 of the electrically powered vehicle and is submerged and in direct contact with the refrigerant. Therefore, the cooling chamber 210 that is defined in the at least one module 222 of the electrically powered vehicle that extends around the entire surface area of the at least one module 222 of the electrically powered vehicle facilitates absorbing the maximum amount of heat from the entire surface area of the at least one module 222 of the electrically powered vehicle as well as from the at least one mechanical component 218 that is positioned within the cooling chamber 210 defined in the at least one module 222 of the electrically powered vehicle and is submerged and in direct contact with the refrigerant effectively, thereby regulating their respective temperatures to be within their acceptable operating temperature limits.

In an exemplary embodiment, the refrigerant is partially filled within the cooling chamber 210 defined in the at least one module 222 of the electrically powered vehicle and partially submerges and is in direct contact with the at least one mechanical component 218 therein. Alternatively, the refrigerant is completely filled within the cooling chamber 210 defined in the at least one module 222 of the electrically powered vehicle and completely submerges and is in direct contact with the at least one mechanical component 218 therein. In these two exemplary embodiments, in the embodiment of the invention where the refrigerant is partially filled within the cooling chamber 210 defined in the at least one module 222 of the electrically powered vehicle, and in the embodiment of the invention where the refrigerant is completely filled within the cooling chamber 210 defined in the at least one module 222 of the electrically powered vehicle, the refrigerant is in direct contact with the at least one mechanical component 218. Therefore, due to direct physical contact that exists between the at least one mechanical component 218 and the refrigerant, heat is transferred away from/transferred to the at least one mechanical component 218 by the refrigerant far more effectively than by deploying a plurality of cooling channels that are positioned between the at least one mechanical component 218 and the refrigerant that flows through the plurality of cooling channels, and that transfers heat away from/transfers heat to the at least one mechanical component 218. Similarly, due to direct mechanical contact that exists between the at least one mechanical component 218 and the refrigerant, heat is transferred away from/transferred to the at least one mechanical component by the refrigerant far more effectively than by deploying a plurality of cooling channels that are positioned between the at least one mechanical component 218 and the refrigerant that flows through the plurality of cooling channels, and that transfers heat away from/transferred to the at least one mechanical component 218. Therefore, the direct refrigerant submersion/immersion technique for cooling the at least one mechanical component 218 is a much better alternative than the indirect refrigerant based cooling technique where refrigerant is allowed to flow through a plurality of cooling channels 210 that are each in mechanical contact with the at least one mechanical component 218 for cooling the at least one mechanical component 218 of the electrically powered vehicle. In addition, it is an assumed throughout this manuscript that heat losses that occur during the flow of refrigerant between a first module and a second module of the plurality of modules of the electrically powered vehicle is negligible and is therefore not taken into consideration. Further, the term 'submerged' should be construed by the reader as complete submersion or partial submersion of the at least one mechanical component 218 within the refrigerant that flows through the at least one module 222 of the electrically powered vehicle.

Exemplary embodiments of a thermal management system 200 for at least one module 222 of the electrically powered vehicle for regulating the temperature of the at least one module 222 of the electrically powered vehicle is described above in detail. The systems are not limited to the specific embodiments described herein, but rather, components of each sub-system may be utilized separately and independently from other components described herein.

While the invention has been described in terms of various specific embodiments, those skilled in the art will recognize that the invention can be practiced with modifications within the spirit and scope of the claims.

What is claimed is:

1. A thermal management system for at least one module of an electrically powered vehicle, said thermal management system comprising:
   a cooling chamber defined in said at least one module of said electrically powered vehicle and receives a refrigerant therein, the refrigerant fills the cooling chamber and is in direct contact with at least one inner wall of the cooling chamber, wherein the refrigerant that is received within the cooling chamber and that fills the cooling chamber and in direct contact with at least one inner wall of the cooling chamber flows through the cooling chamber that is defined in said at least one module of said electrically powered vehicle to directly cool the at least one inner wall of the cooling chamber that is defined in said at least one module of said electrically powered vehicle;
   a compressor in flow communication with an outlet of the cooling chamber defined in said at least one module of said electrically powered vehicle at its inlet, said compressor receives the refrigerant that flows through the outlet of the cooling chamber that is defined in said at least one module of said electrically powered vehicle, said compressor compresses the refrigerant that is received in said compressor;
   a condenser in flow communication with an outlet of said compressor at its inlet and receives the refrigerant that flows through the outlet of said compressor, said condenser discharges heat from the refrigerant that is received in said condenser; and
   an expansion valve in flow communication with an outlet of said condenser at its inlet and receives the refrigerant that flows through the outlet of said condenser, said expansion valve in flow communication with an inlet of the cooling chamber defined in said at least one module of said electrically powered vehicle at its outlet, said expansion valve controls a flow of refrigerant that flows through the outlet of said condenser to the inlet of the cooling chamber that is defined in said at least one module of said electrically powered vehicle to directly cool the at least one inner wall of the cooling chamber that is defined in said at least one module of said electrically powered vehicle, and wherein said expansion valve that controls the flow of refrigerant that flows through the outlet of said condenser controls the flow of refrigerant from a first outlet of the outlet of said expansion valve to the inlet of the cooling chamber that is defined in an electric battery containing a plurality of cells for cooling said plurality of cells of said electric battery, the outlet of the cooling chamber defined in said electric battery in flow communication with the inlet of said compressor.

2. A thermal management system for at least one module of an electrically powered vehicle in accordance with claim 1, wherein said at least one module of said electrically powered vehicle comprises at least one of an air conditioning unit, an electronic control unit, a power conversion system that includes an onboard charger and a DC converter, an inverter for converting DC current to AC current, an electrically powered motor, and a heat exchanger containing oil that is supplied from at least one of a gearbox and a differential of said electrically powered vehicle.

3. A thermal management system for at least one module of an electrically powered vehicle in accordance with claim 1, wherein said at least one module of said electrically powered vehicle comprises an electric battery containing a plurality of cells.

4. A thermal management system for at least one module of an electrically powered vehicle in accordance with claim 1, wherein said expansion valve controls the flow of refrigerant that flows through the outlet of said condenser to
   a power train cooling circuit that comprises an inlet of at least one cooling channel defined within an air conditioning unit, an outlet of the at least one cooling channel defined within said air conditioning unit in flow communication with an inlet of a cooling chamber defined in an electronic control unit, an outlet of the cooling chamber defined in said electronic control unit in flow communication with an inlet of a cooling chamber defined in a power conversion system that includes at least one of an onboard charger and a DC converter, an outlet of the cooling chamber defined in said power conversion system in flow communication with an inlet of a cooling chamber defined in an inverter, an outlet of the cooling chamber defined in said inverter in flow communication with an inlet of a cooling chamber defined in an electrically powered motor, an outlet of the cooling chamber defined in said electrically powered motor in flow communication with an inlet of at least one cooling channel defined within a heat exchanger containing oil that is supplied from at least one of a gearbox and a differential of said electrically powered vehicle, an outlet of the at least one cooling channel defined within said heat exchanger in flow communication with the inlet of said compressor, via a first second outlet of the outlet of said expansion valve for cooling said power train cooling circuit.

5. A thermal management system for at least one module of an electrically powered vehicle in accordance with claim 4, further comprising a first inlet valve in flow communication between the second outlet of the outlet of said expansion valve and the inlet of the at least one cooling channel defined within said air conditioning unit and controls the flow of refrigerant from the second outlet of the outlet of said expansion valve to the inlet of the at least one cooling channel that is defined within said air conditioning unit for cooling said air conditioning unit.

6. A thermal management system for at least one module of an electrically powered vehicle in accordance with claim 5, further comprising a second inlet valve in flow communication between the outlet of the at least one cooling channel defined within said air conditioning unit as well as the second outlet of the outlet of said expansion valve and the inlet of the cooling chamber defined in said electronic control unit, and controls the flow of refrigerant from the outlet of the at least one cooling channel defined within said air conditioning unit as well as from the second outlet of said expansion valve to the inlet of the cooling chamber that is defined in said electronic control unit for cooling said electronic control unit.

7. A thermal management system for at least one module of an electrically powered vehicle in accordance with claim 6, further comprising a directional valve that includes:
   a first refrigerant flow path defined in said directional valve in flow communication between the outlet of the at least one cooling channel defined within said heat exchanger and the inlet of said compressor, the first refrigerant flow path channels the refrigerant from the outlet of the at least one cooling channel that is defined within said heat exchanger to the inlet of said compressor; and
   a second refrigerant flow path defined in said directional valve in flow communication between the second outlet of the outlet of said expansion valve and the inlet of the cooling chamber defined in said electric battery, the second refrigerant flow path channels the refrigerant from the second outlet of the outlet of said expansion valve to the inlet of the cooling chamber that is defined in said electric battery for cooling said plurality of cells that are contained within said electric battery.

8. A thermal management system for at least one module of an electrically powered vehicle in accordance with claim 7, further comprising a cooling fan positioned proximate to said condenser and receives electric power from one of said at least one module of said electrically powered vehicle and an external power source, said cooling fan delivers a stream of cooling air to said condenser to cool refrigerant that is received in said condenser from the outlet of said compressor.

9. A thermal management system for at least one module of an electrically powered vehicle in accordance with claim 8, wherein said electronic control unit is adapted to:
   control the flow of refrigerant from the second outlet of the outlet of said expansion valve to the inlet of the at least one cooling channel that is defined within said air conditioning unit via a first control flow path that is in electronic communication between said first inlet valve and said electronic control unit;
   control the flow of refrigerant from the outlet of the at least one cooling channel that is defined within said air conditioning unit and the second outlet of said expansion valve to the inlet of the cooling chamber that is defined in said electronic control unit via a second control flow path that is in electronic communication between said second inlet valve and said electronic control unit;
   control said cooling fan that delivers the stream of cooling air to said condenser to cool the refrigerant that is received in said condenser from the outlet of said compressor via a third control flow path that is in electronic communication between said cooling fan and said electronic control unit;
   control the flow of refrigerant from said expansion valve to at least one of the inlet of the at least one cooling channel that is defined within said air conditioning unit and the inlet of the cooling chamber that is defined in said electric battery via a fourth control flow path that is in electronic communication between said expansion valve and said electronic control unit;
   control a pressure regulator of said compressor that delivers pressurized refrigerant to said condenser via a fifth control flow path that is in electronic communication between said pressure regulator of said compressor and said electronic control unit;
   receive a temperature signal that is indicative of an operating temperature of said plurality of cells that are contained within said electric battery from a temperature sensor that is in thermal communication with said plurality of cells that are contained within said electric battery via a sixth control flow path that is in electronic communication between said temperature sensor and said electronic control unit;
   control a direction of orientation of said directional valve to channel the refrigerant from the outlet of the at least one cooling channel that is defined within said heat exchanger to the inlet of said compressor via the first refrigerant flow path that is defined in said directional valve, and from the second outlet of the outlet of said expansion valve to the inlet of the cooling chamber that is defined in said electric battery via the second refrigerant flow path that is defined in said directional valve via a seventh control flow path that is in electronic communication between said directional valve and said electronic control unit; and
   control an autopilot mode of said electronic control unit to operate said electrically powered vehicle in the autopilot mode.

10. A thermal management system for at least one module of an electrically powered vehicle in accordance with claim 1, further comprising at least one mechanical component positioned within the cooling chamber defined in said at least one module of said electrically powered vehicle and is one of partially and fully submerged and in direct contact with the refrigerant that fills the cooling chamber, wherein the refrigerant that flows through the cooling chamber that is defined in said at least one module of said electrically powered vehicle and that fills the cooling chamber and one of partially and fully submerges said at least one mechanical component and being in direct contact with said at least one mechanical component directly cools said at least one mechanical component by withdrawing heat away from said at least one mechanical component that is positioned within the cooling chamber defined in said at least one module of said electrically powered vehicle.

11. A thermal management system for at least one module of an electrically powered vehicle in accordance with claim 10, wherein said at least one mechanical component positioned within the cooling chamber comprises at least one of an entity in an automobile cabin, a circuit board of an electronic control unit, an onboard charger, a DC converter, a plurality of winding coils of an electrically powered motor, a plurality of winding coils of an inverter, and at least one cell of an electric battery.

12. A thermal management system for at least one module of an electrically powered vehicle in accordance with claim 1, wherein at least one inner wall of the cooling chamber defined in said at least one module of said electrically powered vehicle is of a material that can withstand pressurized refrigerant, and wherein at least one inner wall of the cooling chamber defined in said at least one module of said electrically powered vehicle is of a leak resistant material to ensure containment of gaseous refrigerant within the cooling chamber that is defined in said at least one module of said electrically powered vehicle.

13. A thermal management system for at least one module of an electrically powered vehicle in accordance with claim 1, wherein the refrigerant that flows through the cooling chamber that is defined in said at least one module of said electrically powered vehicle to directly cool the at least one inner wall of the cooling chamber that is defined in said at least one module is of a specific heat absorption capacity/unit mass of refrigerant that is lesser than a specific heat absorption capacity/unit mass of liquid coolant, and allowing for a first mass flow rate of refrigerant to be channeled through the cooling chamber that is defined in said at least one module of said electrically powered vehicle to decrease a first temperature of the at least one inner wall of the cooling chamber that is defined in said at least one module to a second temperature in contrast to a second mass flow rate of liquid coolant that is greater than the first mass flow rate of refrigerant to be channeled through the cooling chamber that is defined in said at least one module of said electrically powered vehicle to decrease the first temperature of the at least one inner wall of the cooling chamber that is defined in said at least one module to the second temperature.

14. A thermal management system for at least one module of an electrically powered vehicle in accordance with claim 1, wherein a total amount of energy that is required to operate said compressor for compressing the refrigerant, for channeling the refrigerant through said condenser, for channeling the refrigerant through said expansion valve, and for channeling the refrigerant through the cooling chamber that is defined in said at least one module of said electrically powered vehicle is lesser than a total amount of energy that is required to operate an electric coolant pump for circulating liquid coolant, for channeling liquid coolant through a radiator, for channeling liquid coolant through the cooling chamber that is defined in said at least one module of said electrically powered vehicle, and for channeling liquid coolant through a coolant tank because at least one of:
  a first mass flow rate of the refrigerant is required to be channeled through the cooling chamber that is defined in said at least one module of said electrically powered vehicle to decrease a first temperature of the at least one inner wall of the cooling chamber that is defined in said at least one module to a second temperature in contrast to a second mass flow rate of liquid coolant that is greater than the first mass flow rate of the refrigerant that is required to be channeled through the cooling chamber that is defined in said at least one module of said electrically powered vehicle to decrease the first temperature of the at least one inner wall of the cooling chamber that is defined in said at least one module to the second temperature; and
  a first viscosity gaseous refrigerant is required to be channeled through the cooling chamber that is defined in said at least one module of said electrically powered vehicle to decrease the first temperature of the at least one inner wall of the cooling chamber that is defined in said at least one module to the second temperature in contrast to a second viscosity liquid coolant that is greater than the first viscosity gaseous refrigerant that is required to be channeled through the cooling chamber that is defined in said at least one module of said electrically powered vehicle to decrease the first temperature of the at least one inner wall of the cooling chamber that is defined in said at least one module to the second temperature.

15. A thermal management system for at least one module of an electrically powered vehicle, said thermal management system comprising:
  a temperature regulating chamber defined in said at least one module of said electrically powered vehicle and receives a refrigerant therein, the refrigerant fills the temperature regulating chamber and is in direct contact with at least one inner wall of the temperature regulating chamber, wherein the refrigerant that is received within the temperature regulating chamber and that fills the temperature regulating chamber and in direct contact with at least one inner wall of the temperature regulating chamber flows through the temperature regulating chamber that is defined in said at least one module of said electrically powered vehicle to directly regulate a temperature of the at least one inner wall of the temperature regulating chamber that is defined in said at least one module of said electrically powered vehicle, wherein the refrigerant that flows through the temperature regulating chamber that is defined in said at least one module of said electrically powered vehicle to directly regulate the temperature of the at least one inner wall of the temperature regulating chamber that is defined in said at least one module is of a specific heat absorption capacity/unit mass of refrigerant that is lesser than a specific heat absorption capacity/unit mass of liquid coolant, and allowing for a first mass flow rate of refrigerant to be channeled through the temperature regulating chamber that is defined in said at least one module of said electrically powered vehicle to regulate a first temperature of the at least one inner wall of the temperature regulating chamber that is defined in said at least one module to a second temperature in contrast to a second mass flow rate of liquid coolant that is greater than the first mass flow rate of refrigerant to be channeled through the temperature regulating chamber that is defined in said at least one module of said electrically powered vehicle to regulate the first temperature of the at least one inner wall of the temperature regulating chamber that is defined in said at least one module to the second temperature;
  a compressor in flow communication with an outlet of the temperature regulating chamber defined in said at least one module of said electrically powered vehicle at its inlet, said compressor receives the refrigerant that flows through the outlet of the temperature regulating chamber that is defined in said at least one module of said electrically powered vehicle, said compressor compresses the refrigerant that is received in said compressor; and an expansion valve in flow communication with an outlet of said compressor at its inlet and receives the refrigerant that flows through the outlet of said compressor, said expansion valve in flow communication with an inlet of the temperature regulating chamber defined in said at least one module of said electrically powered vehicle at its outlet, said expansion valve controls a flow of refrigerant that flows through the outlet of said compressor to the inlet of the temperature regulating chamber that is defined in said at least one module of said electrically powered vehicle to directly regulate the temperature of the at least one inner wall of the temperature regulating chamber that is defined in said at least one module of said electrically powered vehicle.

16. A thermal management system for at least one module of an electrically powered vehicle in accordance with claim 15, wherein said at least one module of said electrically powered vehicle comprises at least one of an air conditioning unit, an electronic control unit, a power conversion system that includes an onboard charger and a DC converter, an inverter for converting DC current to AC current, an electrically powered motor, a heat exchanger containing oil that is supplied from at least one of a gearbox and a differential of said electrically powered vehicle, and an electric battery containing a plurality of cells.

17. A thermal management system for at least one module of an electrically powered vehicle in accordance with claim 15, further comprising a bypass valve in flow communication with the outlet of said compressor and receives refrigerant that flows through the outlet of said compressor, said bypass valve controls the flow of refrigerant to one of:

a condenser in flow communication with a first outlet of said bypass valve at its inlet and receives the refrigerant that flows through the first outlet of said bypass valve, said condenser in flow communication with the inlet of said expansion valve at its outlet and channels the refrigerant to said expansion valve, said condenser discharges heat from the refrigerant that is received in said condenser; and a bypass flow path in flow communication with a second outlet of said bypass valve at its inlet and receives the refrigerant that flows through the second outlet of said bypass valve, said bypass flow path in flow communication with the inlet of said expansion valve at its outlet and channels the refrigerant to said expansion valve by bypassing said condenser.

18. A thermal management system for at least one module of an electrically powered vehicle in accordance with claim 17, wherein said expansion valve controls the flow of refrigerant that flows through one of the outlet of said condenser and the outlet of said bypass flow path to a power train cooling circuit and to an electric battery heating circuit that comprises an inlet of at least one cooling channel defined within an air conditioning unit, an outlet of the at least one cooling channel defined within said air conditioning unit in flow communication with an inlet of a cooling chamber defined in an electronic control unit, an outlet of the cooling chamber defined in said electronic control unit in flow communication with an inlet of a cooling chamber defined in a power conversion system that includes at least one of an onboard charger and a DC converter, an outlet of the cooling chamber defined in said power conversion system in flow communication with an inlet of a cooling chamber defined in an inverter, an outlet of the cooling chamber defined in said inverter in flow communication with an inlet of a cooling chamber defined in an electrically powered motor, an outlet of the cooling chamber defined in said electrically powered motor in flow communication with an inlet of at least one cooling channel defined within a heat exchanger containing oil that is supplied from at least one of a gearbox and a differential of said electrically powered vehicle, an outlet of the at least one cooling channel defined within said heat exchanger in flow communication with an inlet of a heating chamber defined in an electric battery containing a plurality of cells, an outlet of the heating chamber defined in said electric battery in flow communication with the inlet of said compressor, via the outlet of said expansion valve for regulating a temperature of said power train cooling circuit and said electric battery heating circuit.

19. A thermal management system for at least one module of an electrically powered vehicle in accordance with claim 18, further comprising a first inlet valve in flow communication between the outlet of said expansion valve and the inlet of the at least one cooling channel defined within said air conditioning unit and controls the flow of refrigerant from the outlet of said expansion valve to the inlet of the at least one cooling channel that is defined within said air conditioning unit for cooling said air conditioning unit.

20. A thermal management system for at least one module of an electrically powered vehicle in accordance with claim 19, further comprising a second inlet valve in flow communication between the outlet of the at least one cooling channel defined within said air conditioning unit as well as the outlet of said expansion valve and the inlet of the cooling chamber defined in said electronic control unit and controls the flow of refrigerant from the outlet of the at least one cooling channel defined within said air conditioning unit as well as the outlet of said expansion valve to the inlet of the cooling chamber that is defined in said electronic control unit for cooling said electronic control unit.

21. A thermal management system for at least one module of an electrically powered vehicle in accordance with claim 20, further comprising a directional valve that includes a refrigerant flow path defined in said directional valve in flow communication between the outlet of the at least one cooling channel defined within said heat exchanger and the inlet of the heating chamber defined in said electric battery, the refrigerant flow path channels the refrigerant from the outlet of the at least one cooling channel that is defined within said heat exchanger to the inlet of the heating chamber that is defined in said electric battery for heating said plurality of cells that are contained within said electric battery.

22. A thermal management system for at least one module of an electrically powered vehicle in accordance with claim 21, further comprising a cooling fan positioned proximate to said condenser and receives electric power from one of said at least one module of said electrically powered vehicle and an external power source, said cooling fan delivers a stream of cooling air to said condenser to cool the refrigerant that is received in said condenser from the first outlet of said bypass valve.

23. A thermal management system for at least one module of an electrically powered vehicle in accordance with claim 22, wherein said electronic control unit is adapted to:

control the flow of refrigerant from the outlet of said expansion valve to the inlet of the at least one cooling channel that is defined within said air conditioning unit via a first control flow path that is in electronic communication between said first inlet valve and said electronic control unit;

control the flow of refrigerant from the outlet of the at least one cooling channel that is defined within said air conditioning unit and the first outlet of said expansion valve to the inlet of the cooling chamber that is defined in said electronic control unit via a second control flow path that is in electronic communication between said second inlet valve and said electronic control unit;

control said cooling fan that delivers the stream of cooling air to said condenser to cool the refrigerant that is received in said condenser from the first outlet of said bypass valve via a third control flow path that is in electronic communication between said cooling fan and said electronic control unit;

control the flow of refrigerant from said expansion valve to the inlet of the at least one cooling channel that is defined within said air conditioning unit via a fourth control flow path that is in electronic communication between said expansion valve and said electronic control unit;

control the flow of refrigerant from said bypass valve to one of said condenser and said bypass flow path via a fifth control flow path that is in electronic communication between said bypass valve and said electronic control unit;

control a pressure regulator of said compressor that delivers pressurized refrigerant at high temperature to said expansion valve via a sixth control flow path that is in electronic communication between said pressure regulator of said compressor and said electronic control unit;

receive a temperature signal that is indicative of an operating temperature of said plurality of cells that are contained within said electric battery from a temperature sensor that is in thermal communication with said plurality of cells that are contained within said electric battery via a seventh control flow path that is in electronic communication between said temperature sensor and said electronic control unit;

control a direction of orientation of said directional valve to channel the refrigerant from the outlet of the at least one cooling channel that is defined within said heat exchanger to the inlet of the heating chamber that is defined in said electric battery via the refrigerant flow path of said directional valve via an eighth control flow path that is in electronic communication between said directional valve and said electronic control unit;

control a quantity of heat that is supplied by said electrically powered motor to heat the refrigerant that flows from the outlet of the cooling chamber that is defined in said inverter to the inlet of the cooling chamber that is defined in said electrically powered motor via a nineth control flow path that is in electronic communication between said electrically powered motor and said electronic control unit; and control an autopilot mode of said electronic control unit to operate said electrically powered vehicle in the autopilot mode.

24. A thermal management system for at least one module of an electrically powered vehicle in accordance with claim 15, further comprising at least one mechanical component positioned within the temperature regulating chamber defined in said at least one module of said electrically powered vehicle and is one of partially and fully submerged and in direct contact with the refrigerant that fills the temperature regulating chamber, wherein the refrigerant that flows through the temperature regulating chamber that is defined in said at least one module of said electrically powered vehicle and that fills the temperature regulating chamber and one of partially and fully submerges said at least one mechanical component and being in direct contact with said at least one mechanical component directly regulates a temperature of said at least one mechanical component by one of withdrawing heat away from and supplying heat to said at least one mechanical component that is positioned within the temperature regulating chamber defined in said at least one module of said electrically powered vehicle.

25. A thermal management system for at least one module of an electrically powered vehicle in accordance with claim 24, wherein said at least one mechanical component that is positioned within the temperature regulating chamber comprises at least one of a high temperature an entity in an automobile cabin, a circuit board of an electronic control unit, an onboard charger, a DC converter, a plurality of winding coils of an electrically powered motor, a plurality of winding coils of an inverter, and at least one cell of an electric battery.

26. A thermal management system for at least one module of an electrically powered vehicle in accordance with claim 15, wherein at least one inner wall of the temperature regulating chamber defined in said at least one module of said electrically powered vehicle is of a material that can withstand pressurized refrigerant, and wherein at least one inner wall of the temperature regulating chamber defined in said at least one module of said electrically powered vehicle is of a leak resistant material to ensure containment of gaseous refrigerant within the temperature regulating chamber that is defined in said at least one module of said electrically powered vehicle.

27. A thermal management system for at least one module of an electrically powered vehicle in accordance with claim 15, wherein a total amount of energy that is required to operate said compressor for compressing the refrigerant, for channeling the refrigerant through said expansion valve, and for channeling the refrigerant through the temperature regulating chamber that is defined in said at least one module of said electrically powered vehicle is lesser than a total amount of energy that is required to operate an electric coolant pump for circulating liquid coolant, for channeling liquid coolant through a radiator, for channeling liquid coolant through the temperature regulating chamber that is defined in said at least one module of said electrically powered vehicle, and for channeling the liquid coolant through a coolant tank because at least one of:

a first mass flow rate of the refrigerant is required to be channeled through the temperature regulating chamber that is defined in said at least one module of said electrically powered vehicle to regulate a first temperature of the at least one inner wall of the temperature regulating chamber that is defined in said at least one module to a second temperature in contrast to a high second mass flow rate of liquid coolant that is greater than the first mass flow rate of the refrigerant that is required to be channeled through the temperature regulating chamber that is defined in said at least one module of said electrically powered vehicle to regulate the first temperature of the at least one inner wall of the temperature regulating chamber that is defined in said at least one module to the second temperature; and a first viscosity gaseous refrigerant is required to be channeled through the temperature regulating chamber that is defined in said at least one module of said electrically powered vehicle to regulate the first temperature of the at least one inner wall of the temperature regulating chamber that is defined in said at least one module to the second temperature in contrast to a second viscosity liquid coolant that is greater than the first viscosity gaseous refrigerant that is required to be channeled through the temperature regulating chamber that is defined in said at least one module of said electrically powered vehicle to regulate the first temperature of the at least one inner wall of the temperature regulating chamber that is defined in said at least one module to the second temperature.

28. A thermal management system for at least one module of an electrically powered vehicle, said thermal management system comprising:
   a heating chamber defined in said at least one module of said electrically powered vehicle and receives a refrigerant therein, the refrigerant fills the heating chamber and is in direct contact with at least one inner wall of the heating chamber, wherein the refrigerant that is received within the heating chamber and that fills the heating chamber and in direct contact with at least one inner wall of the heating chamber flows through the heating chamber that is defined in said at least one module of said electrically powered vehicle to directly heat the at least one inner wall of the heating chamber that is defined in said at least one module of said electrically powered vehicle;
   a compressor in flow communication with an outlet of the heating chamber defined in said at least one module of said electrically powered vehicle at its inlet, said compressor receives the refrigerant that flows through the outlet of the heating chamber that is defined in said at least one module of said electrically powered vehicle, said compressor compresses the refrigerant that is received in said compressor;
   an expansion valve in flow communication with an outlet of said compressor at its inlet and receives the refrigerant that flows through the outlet of said compressor, said expansion valve in flow communication with an inlet of the heating chamber defined in said at least one module of said electrically powered vehicle at its outlet, said expansion valve controls a flow of refrigerant that flows through the outlet of said compressor to the inlet of the heating chamber that is defined in said at least one module of said electrically powered vehicle to directly heat the at least one inner wall of the heating chamber that is defined in said at least one module of said electrically powered vehicle;
   a bypass valve in flow communication with the outlet of said compressor and receives refrigerant that flows through the outlet of said compressor, said bypass valve controls the flow of refrigerant to one of:
      a condenser in flow communication with a first outlet of said bypass valve at its inlet and receives the refrigerant that flows through the first outlet of said bypass valve, said condenser in flow communication with the inlet of said expansion valve at its outlet and channels the refrigerant to said expansion valve, said condenser discharges heat from the refrigerant that is received in said condenser; and
      a bypass flow path in flow communication with a second outlet of said bypass valve at its inlet and receives the refrigerant that flows through the second outlet of said bypass valve, said bypass flow path in flow communication with the inlet of said expansion valve at its outlet and channels the refrigerant to said expansion valve by bypassing said condenser;
   and wherein said expansion valve controls the flow of refrigerant that flows through one of the outlet of said condenser and the outlet of said bypass flow path to an electric battery heating circuit that comprises an inlet of a heating chamber defined in an electric battery containing a plurality of cells, an outlet of the heating chamber defined in said electric battery in flow communication with the inlet of said compressor, via the outlet of said expansion valve for heating said electric battery heating circuit.

29. A thermal management system for at least one module of an electrically powered vehicle in accordance with claim 28, wherein said at least one module of said electrically powered vehicle comprises an electric battery containing a plurality of cells.

30. A thermal management system for at least one module of an electrically powered vehicle in accordance with claim 28, further comprising a directional valve that includes a refrigerant flow path defined in said directional valve in flow communication between the outlet of said expansion valve and the inlet of the heating chamber defined in said electric battery, the refrigerant flow path channels the refrigerant from the outlet of said expansion valve to the inlet of the heating chamber that is defined in said electric battery for heating said plurality of cells that are contained within said electric battery.

31. A thermal management system for at least one module of an electrically powered vehicle in accordance with claim 30 further comprising an electronic control unit, wherein said electronic control unit is adapted to:
   control the flow of refrigerant from the outlet of said expansion valve to the inlet of the heating chamber that is defined in said electric battery via a first control flow path that is in electronic communication between said expansion valve and said electronic control unit;
   control the flow of refrigerant from said bypass valve to one of said condenser and said bypass flow path via a second control flow path that is in electronic communication between said bypass valve and said electronic control unit;
   control a pressure regulator of said compressor that delivers pressurized refrigerant to said expansion valve via a third control flow path that is in electronic communication between said pressure regulator of said compressor and said electronic control unit;
   receive a temperature signal that is indicative of an operating temperature of said plurality of cells that are contained within said electric battery from a temperature sensor that is in thermal communication with said plurality of cells that are contained within said electric battery via a fourth control flow path that is in electronic communication between said temperature sensor and said electronic control unit;
   control a direction of orientation of said directional valve to channel the refrigerant from the outlet of said expansion valve to the inlet of the heating chamber that is defined in said electric battery via the refrigerant flow path that is defined in said directional valve via a fifth control flow path that is in electronic communication between said directional valve and said electronic control unit; and
   control an autopilot mode of said electronic control unit to operate said electrically powered vehicle in the autopilot mode.

32. A thermal management system for at least one module of an electrically powered vehicle in accordance with claim 28, further comprising at least one mechanical component positioned within the heating chamber defined in said at least one module of said electrically powered vehicle and is one of partially and fully submerged and in direct contact with the refrigerant that fills the heating chamber, wherein the refrigerant that flows through the heating chamber that is defined in said at least one module of said electrically powered vehicle and that fills the heating chamber and one of partially and fully submerges said at least one mechanical component and being in direct contact with said at least one mechanical component directly heats said at least one mechanical component by supplying heat to said at least one mechanical component that is positioned within the heating chamber defined in said at least one module of said electrically powered vehicle.

33. A thermal management system for at least one module of an electrically powered vehicle in accordance with claim 32, wherein said at least one mechanical component positioned within the heating chamber comprises at least one cell of an electric battery.

34. A module of an electrically powered vehicle, said module comprising:
 a housing; and
 a temperature regulating chamber defined in said housing of said module of said electrically powered vehicle and receives a refrigerant therein from an expansion valve that controls a flow of refrigerant to the temperature regulating chamber, wherein the refrigerant that is received within the temperature regulating chamber flows through the temperature regulating chamber that is defined in said housing of said module of said electrically powered vehicle to directly regulate a temperature of at least one inner wall of the temperature regulating chamber that is defined in said housing of said module of said electrically powered vehicle, the temperature regulating chamber defined in said housing of said module of said electrically powered vehicle contains a plurality of electric battery cells whose temperature is regulated by the refrigerant, an outlet of the temperature regulating chamber defined in said housing of said module of said electrically powered vehicle in flow communication with an inlet of a compressor.

35. A module of an electrically powered vehicle in accordance with claim 34, wherein said module of said electrically powered vehicle comprises one of an air conditioning unit, an electronic control unit, a power conversion system that includes at least one of an onboard charger and a DC converter, an inverter, an electrically powered motor, a heat exchanger containing oil that is supplied from at least one of a gearbox and a differential of said electrically powered vehicle, and an electric battery containing a plurality of cells.

\* \* \* \* \*